United States Patent
Miyachi et al.

(10) Patent No.: US 6,922,222 B2
(45) Date of Patent: Jul. 26, 2005

(54) LIQUID CRYSTAL DISPLAY APPARATUS

(75) Inventors: Koichi Miyachi, Soraku-gun (JP); Motohiro Yamahara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 232 days.

(21) Appl. No.: 09/866,797

(22) Filed: May 30, 2001

(65) Prior Publication Data

US 2001/0048497 A1 Dec. 6, 2001

(30) Foreign Application Priority Data

May 31, 2000 (JP) .................................... 2000-163236
Apr. 27, 2001 (JP) .................................... 2001-133547

(51) Int. Cl.[7] ............................................ G02F 1/1335
(52) U.S. Cl. ...................... 349/118; 349/96; 349/98; 349/119
(58) Field of Search ............................ 349/96, 98, 118, 349/119

(56) References Cited

U.S. PATENT DOCUMENTS 5,966,242 A * 10/1999 Yamanaka ................... 359/618
6,552,767 B1 * 4/2003 Kaneko ....................... 349/119

FOREIGN PATENT DOCUMENTS

| JP | 5-113561 A | 5/1993 |
| JP | 11-109391 A | 4/1999 |
| JP | 11-258605 A | 9/1999 |
| JP | 2000-47217 A | 2/2000 |
| JP | 2003114325 | * 4/2003 |

* cited by examiner

Primary Examiner—Tarifur R. Chowdhury
Assistant Examiner—Hoan Chau Nguyen
(74) Attorney, Agent, or Firm—Nixon & Vanderhye, P.C.

(57) ABSTRACT

A liquid crystal display apparatus, provided with liquid crystal compensation plates and λ/4 plates on both sides of a liquid crystal cell, in a sequence that the liquid crystal compensation plates, then the λ/4 plates. Further provided is Rth compensation film between the λ/4 plate and linear polarization film. Set substantially at zero is a retardation Rth1 in a perpendicular direction in a range from the linear polarization films to the λ/4 plates, excluding the λ/4 plates. This gives a retardation (in a perpendicular direction) for optically compensating the liquid crystal cell a closer position to the liquid crystal cell. As a result, a broad angle of visibility can be maintained, without losing a balance between viewing angle characteristics from the above position (or the bottom position) and those from the right position (or the left position), while it is possible to prevent contrast ratio in a front direction from being lowered. Therefore, an LCD having good display quality can be realized.

66 Claims, 38 Drawing Sheets

FIG. 2
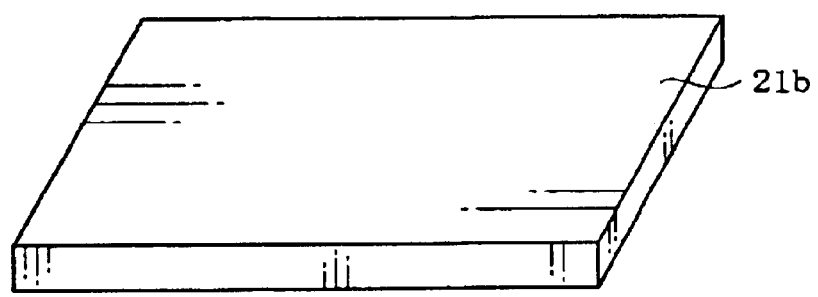
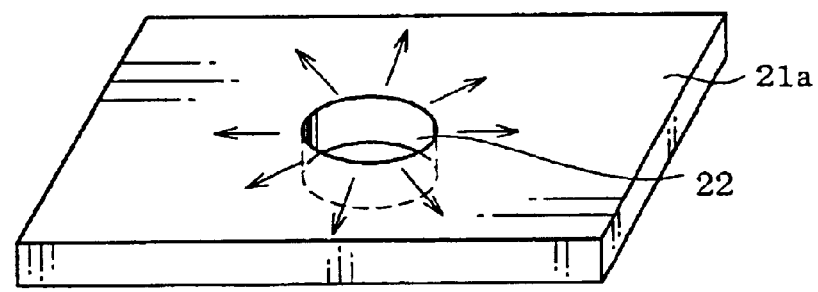

F I G. 4
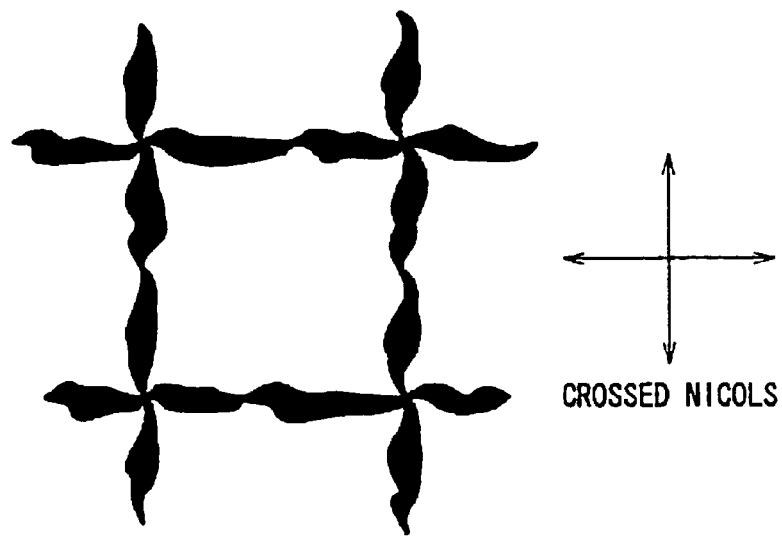
F I G. 5
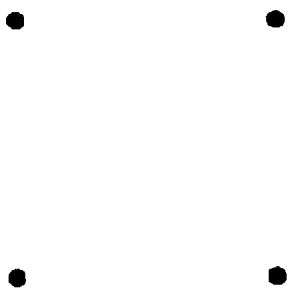

FIG. 6
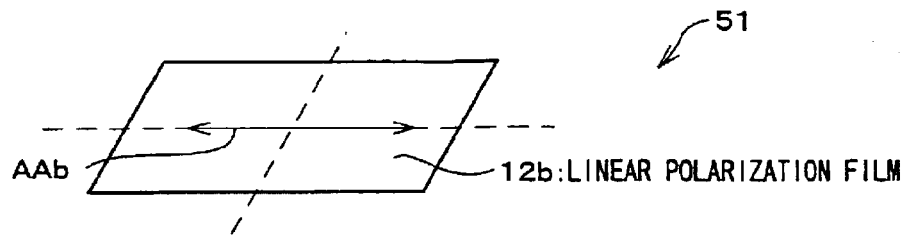
AAb — 12b:LINEAR POLARIZATION FILM
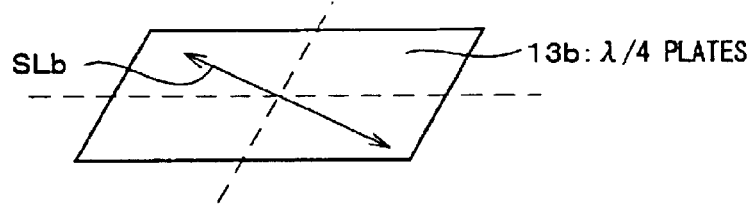
SLb — 13b: λ/4 PLATES
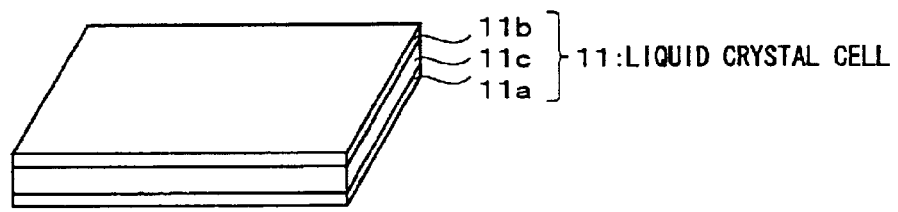
11b, 11c, 11a — 11:LIQUID CRYSTAL CELL
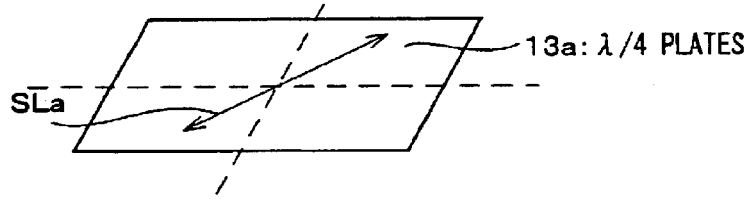
SLa — 13a: λ/4 PLATES
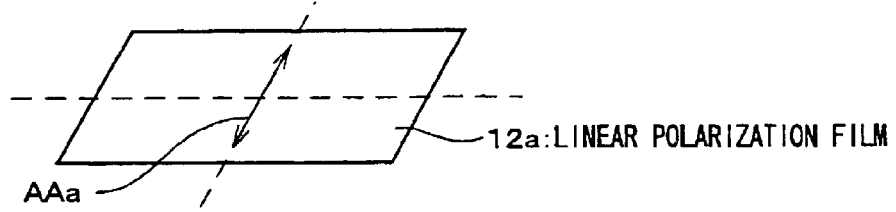
AAa — 12a:LINEAR POLARIZATION FILM F I G. 7
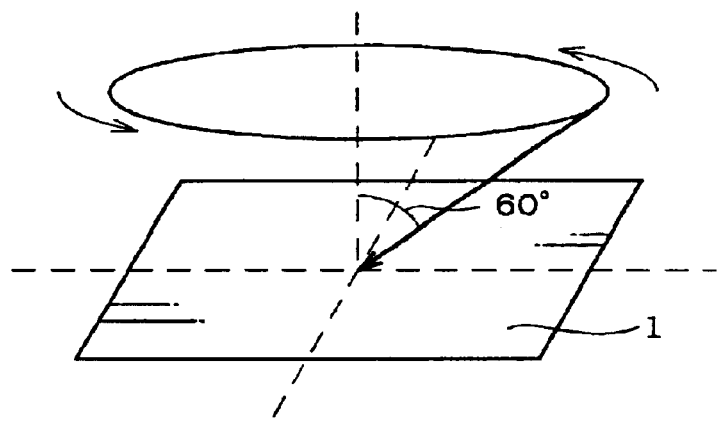

F I G. 1 4
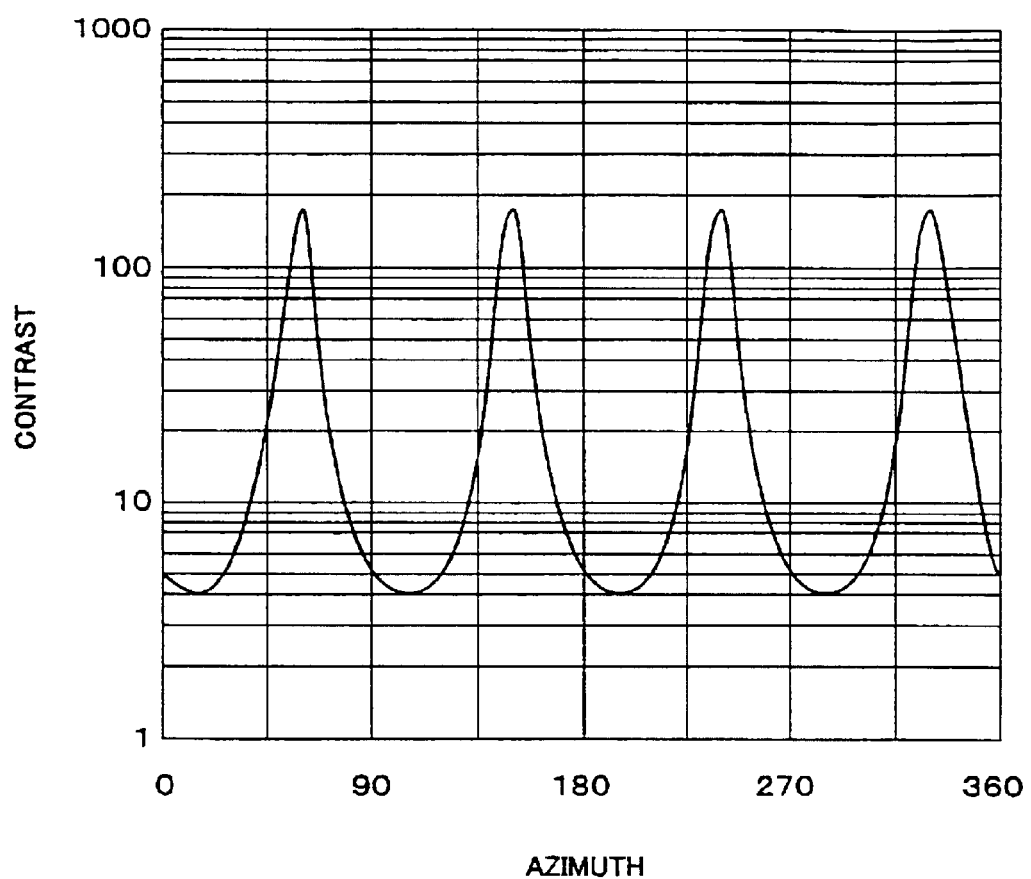

F I G. 16
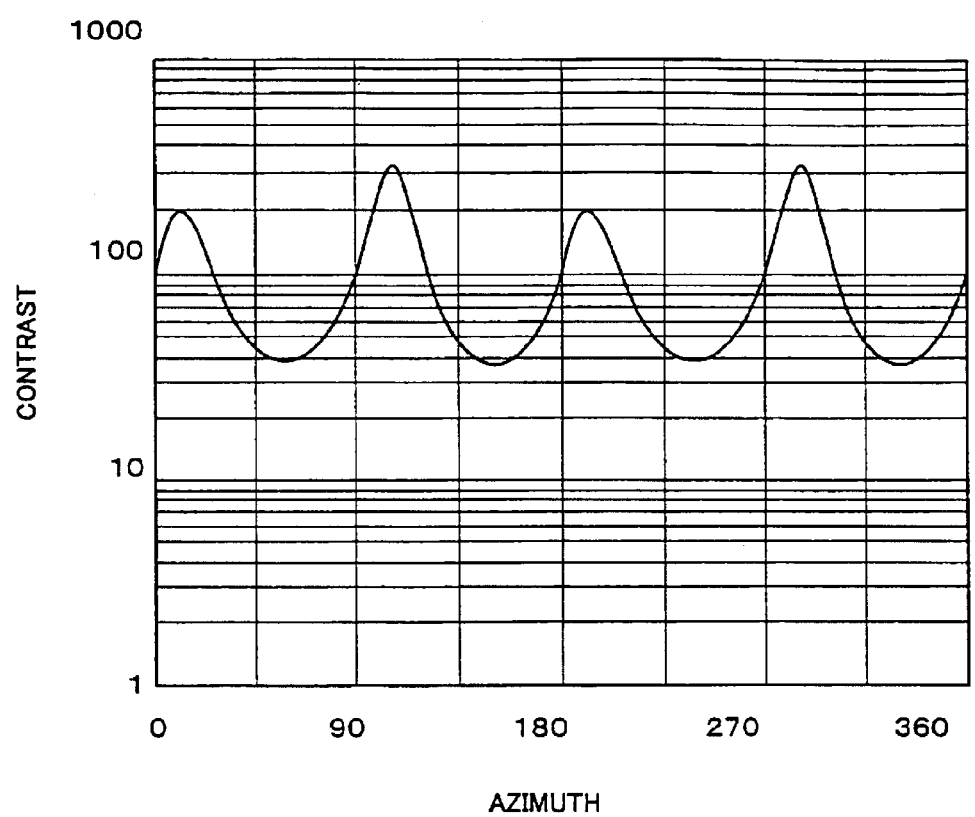

F I G. 3 7
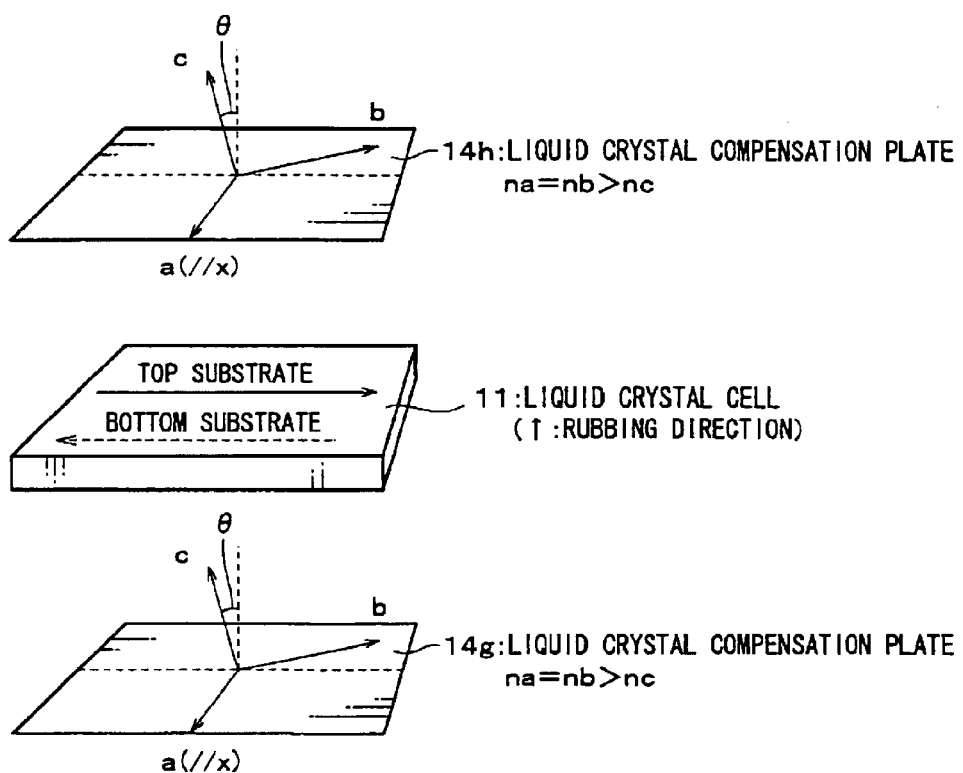

FIG. 39
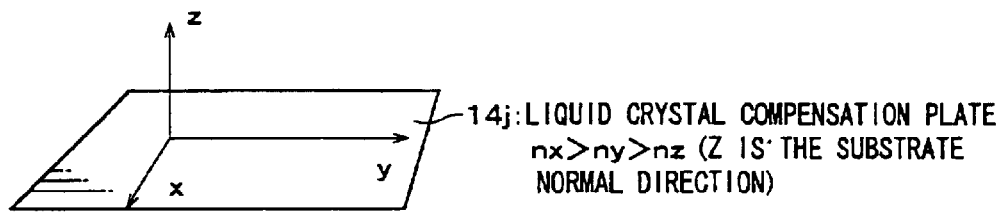
14j: LIQUID CRYSTAL COMPENSATION PLATE
nx>ny>nz (Z IS THE SUBSTRATE NORMAL DIRECTION)
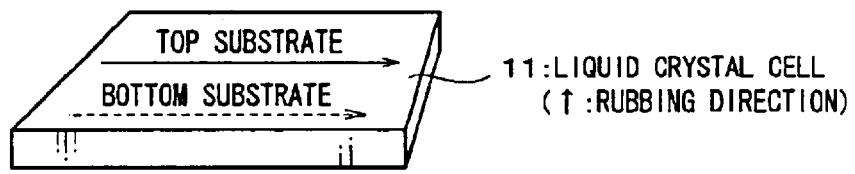
11: LIQUID CRYSTAL CELL
(↑: RUBBING DIRECTION)
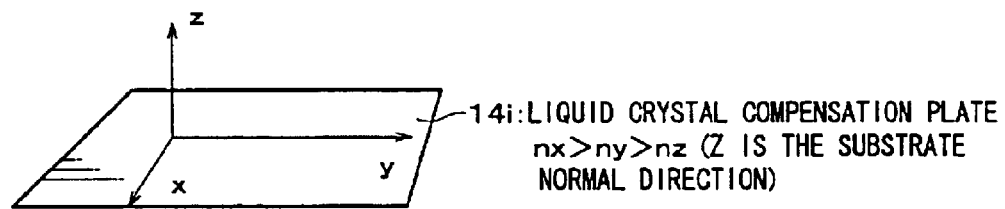
14i: LIQUID CRYSTAL COMPENSATION PLATE
nx>ny>nz (Z IS THE SUBSTRATE NORMAL DIRECTION)

F I G. 4 1
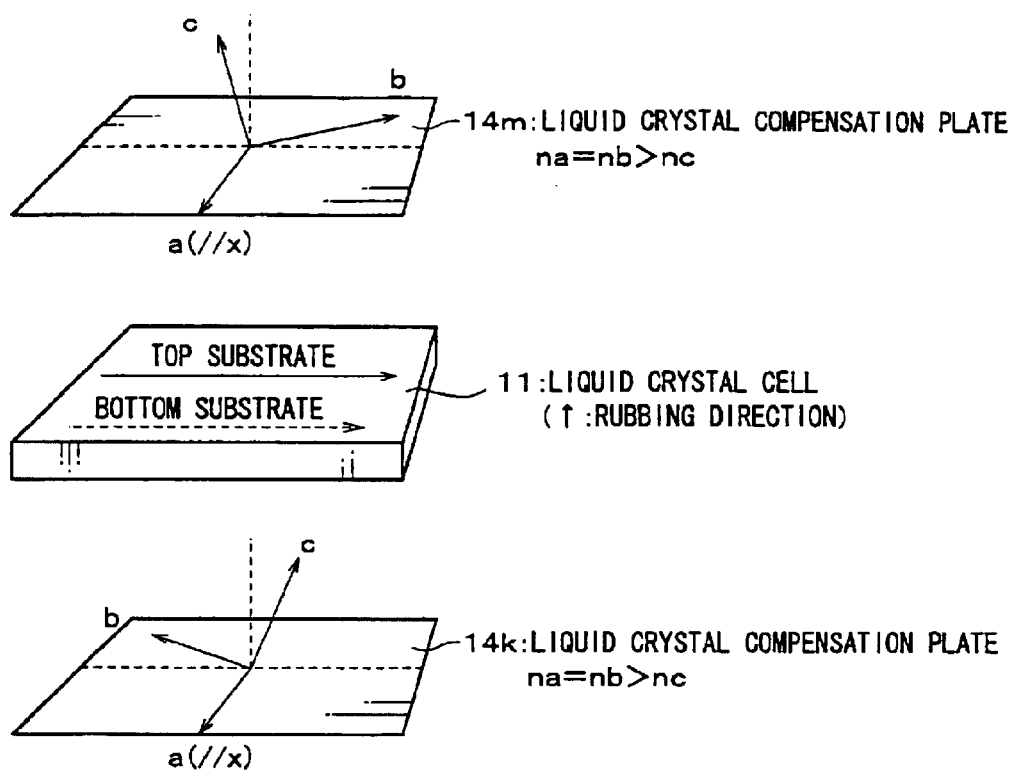

LIQUID CRYSTAL DISPLAY APPARATUS

FIELD OF THE INVENTION

The present invention relates to a liquid crystal display apparatus provided with a polarizer and a quarter wavelength layer.

BACKGROUND OF THE INVENTION

For instance, a liquid crystal display apparatus (an LCD), which is used as a display screen in a notebook-sized personal computer or a word processor, has a tendency to have a deteriorated display quality when it is viewed from a diagonal direction, because its optical anisotropy gives the LCD a narrower angle of visibility, compared to other display apparatus, such as CRT. Hence, for example, an LCD 501 described in Japanese Un-Examined Patent Publication Tokukaihei No. 5-113561 (published on May 7, 1993) is equipped with, as shown in FIG. 42, a liquid crystal cell 511, a liquid crystal compensation plate 514, which is disposed adjacent to the liquid crystal cell 511 for optically compensating the liquid crystal cell 511, λ/4 plates 513c and 513d, which are placed to sandwich the liquid crystal cell 511 and the liquid crystal compensation plate 514, and linear polarization films 512a and 512b, which are mounted to have both the λ/4 plates 513c and 513d in between. The respective λ/4 plates 513c and 513d have a retardation in an in-plane direction that are set at a quarter of transmitted light. The λ/4 plate 513c is prepared from a uniaxial material having a negative optical activity, while the λ/4 plate 513d is made from a uniaxial material having a positive optical activity.

In the above arrangement, light transmitted thorough the linear polarizing film 512a is converted into a circularly polarized light by the λ/4 plate 513c, then is introduced into the liquid crystal cell 511 via the liquid crystal compensation plate 514. Here, the liquid crystal cell 511 has a nematic liquid crystal which is aligned substantially vertically with respect to a substrate where no charge is applied therein. Therefore, the liquid crystal cell 511 has emitting light that is circularly polarized, which is substantially equal to the light introduced. The emitted light is converted into a linearly polarized light by the λ/4 plate 513d. Here, because both the linear polarization films 512a and 512b are placed so that absorption axes of the respective linear polarization films 512a and 512b cross each other at a right angle, the linearly polarized light is absorbed by the linear polarization film 512b, resulting in a black display. Moreover, even when the liquid crystal cell 511 gives a phase difference to the transmitted light coming from a direction angled from a substrate normal direction during the black display, the optical activity of the liquid crystal compensation plate 514, which is reverse to that of the liquid crystal cell 511, enables the liquid crystal compensation plate 514 to cancel out the phase difference, thereby extending an angle of visibility.

On the other hand, application of a charge causes liquid crystal molecules to incline horizontally with respect to the substrate, so that the emitted light from the liquid crystal cell 511 is elliptically polarized. Accordingly, the emitted light out of the λ/4 plate 513d is not entirely absorbed by the linear polarization film 512b, thus showing a white display.

However, in the above arrangement, both the λ/4 plates 513c and 513d require different manufacturing processes, respectively, by reason that their optical activities are different: one is positive and the other is negative. Thus, it is a problem for the above arrangement that it is difficult to uniform their in-plane retardation.

Here, if a difference is caused between their retardations, for example, by lack of uniformity between their respective manufacturing processes, a light leakage in a front direction is generated during the black display, thus deteriorating a contrast ratio in a front direction.

Furthermore, in the above arrangement, when a contrast ratio of a predetermined angle from the normal direction is measured for every in-plane directions, a peak of the contrast ratio often shows unevenness, thus making it hard to balance between viewing angle characteristics from an above position (or a bottom position) and those from a right position (or a left position).

SUMMARY OF THE INVENTION

The present invention has an object to offer an LCD with an ability to maintain a broad angle of visibility without losing a balance between viewing angle characteristics from an above position (or a bottom position) and those from a right position (or a left position), and further having an ability to prevent a deterioration of contrast ratio in a front direction.

A liquid crystal display apparatus of the present invention, in order to attain the above object, is provided with a liquid crystal cell, polarizers provided on both sides of the liquid crystal cell, quarter wavelength layers, provided between the respective polarizers and the liquid crystal cell, each of the quarter wavelength layers having a retardation in an in-plane direction that is substantially set at a quarter wavelength of a wavelength of transmitted light, a phase difference layer, provided between at least one of the quarter wavelength layers and the liquid crystal cell, which has a retardation in a perpendicular direction, and optically compensates the liquid crystal cell, a compensation layer provided at least between the polarizer and the quarter wavelength layer on the side of the phase difference layer, wherein the compensation layer has a retardation in a perpendicular direction whose sign is reverse to a sum of the retardations in the perpendicular direction from the polarizer to the quarter wavelength layer, but excluding the compensation layer.

In the above arrangement, light, which has transmitted through the polarizer and quarter wavelength layer, strikes into the liquid crystal cell. Thus, the liquid crystal cell receives substantially circularly polarized light, while light emitted out of the liquid crystal cell is given a phase difference of a substantially quarter wavelength by the quarter wavelength layer before being emitted via the polarizer.

When a pixel electrode and an opposite electrode have a predetermined voltage between them, for example, when a voltage is applied, or when they are in an initial alignment condition with no voltage applied, the liquid crystal cell gives the transmitted light the phase difference suitable for an alignment condition of liquid crystal molecules, whereby the circularly polarized light is converted into an elliptically polarized light. Therefore, the linear polarization will not be restored even after transmission through the quarter wavelength layer, thus a part of the emitted light from the quarter wavelength layer is emitted out of the polarizer. As a result, a quantity of the emitted light from the polarizer can be controlled in accordance with the applied voltage, so that a gradient display is attained.

Moreover, the introduction of the substantially circularly polarized light maintains a high light utilization rate, because the liquid crystal molecules can give the phase difference to the transmitted light, even if the alignment of the liquid crystal molecules is disordered, as long as the transmitted light shows no accordance with the alignment direction of the liquid crystal molecules in terms of in-plane composition and a substrate normal direction.

On the other hand, when the liquid crystal molecules of the liquid crystal cell is aligned in the substrate normal direction (a vertical direction), the liquid crystal cell cannot give the phase difference to the transmitted light. As a result, the transmitted light is emitted out with the substantially circularly polarized light maintained. The emitted light is converted into a linearly polarized light via the quarter wavelength layer, then is inputted into the polarizer so that the transmission of the light is prevented. Accordingly, the LCD can perform a black display.

However, even if the liquid crystal molecules are aligned vertically, the alignment direction of the liquid crystal molecules and the direction of the transmitted light are not able to be accorded with each other when the LCD is viewed from a direction tilted at a poler angle with respect to the substrate normal direction, whereby the liquid crystal cell gives the transmitted light a phase difference in accordance with the poler angle. But, in the respective arrangements mentioned above, provided is a phase difference layer with a retardation in a perpendicular direction, so that the phase difference layer can perform an optical compensation. Thereby, a wide angle of visibility can be maintained.

Furthermore, in the above arrangement, provided is a compensation layer, which has a sign reverse to the quarter wavelength and the phase difference layer, between the polarizer and the quarter wavelength layer. Therefore, for example, even if a section, which has an optical activity of the same type as the phase difference layer, such as a supporter of the polarizer, is provided in-between the polarizer and the quarter wavelength layer, or if the quarter wavelength layer has a retardation in a perpendicular direction, the retardation in those sections can be cancelled out by the compensation layer.

As a result, even if the sum of the retardation in the perpendicular direction from the polarizer to the liquid crystal cell and from the liquid crystal cell to the polarizer is constant, it is possible to reduce an absolute value of the retardation in a perpendicular direction in a range from the polarizer to the quarter wavelength layer that is included in the range, the retardation (in a perpendicular direction) for compensating the liquid crystal cell can be given a position closer to the liquid crystal cell, compared to the case where no compensation layer is provided. Thereby, light leakage during the black display can be prevented, and a good black display can be achieved. In addition, not like a case where quarter wavelength layers of positive and negative optical activities are used together, the quarter wavelength layer of the same type can be used so that the retardations in both the quarter wavelength layers can be easily uniformed in an in-plane direction, whereby a contract ratio in the front direction can be improved.

Moreover, the retardation in a perpendicular direction (the absolute value) within the range can be decreased. Therefore, when a contrast ratio of a predetermined angle from the normal direction is measured for every in-plane directions, peaks of the contrast ratio can be maintained at the same level, whereby it is easy to balance the viewing angle characteristics from the above position (or the bottom position) and those from the right position (or the left position).

Furthermore, instead of providing the compensation layer in the respective arrangements, it is possible to use a quarter wavelength layer, in which $(nx4+ny4)/2$ is substantially $nz4$, where main refraction indexes in in-plane directions are $nx4$ and $ny4$ while a main refraction index in the normal direction is $nz4$, as the quarter wavelength layer mentioned above.

In the present arrangement, a retardation in a perpendicular direction of the quarter wavelength layer is suppressed substantially at zero. Therefore, just like the cases of the respective LCDs, the retardation in a perpendicular direction in a range from the polarizer and the quarter wavelength layer, where the quarter wavelength layer is included, can be reduced, even if the sum of the retardations in the perpendicular direction from the polarizer to the liquid crystal cell and from the liquid crystal cell to the polarizer is constant. This can give the retardation (in the perpendicular direction) for compensating the liquid crystal cell a position closer to the liquid crystal cell. As a result, just as the case where the compensation layer is provided, it is possible to realize an LCD which can maintain a wide angle of visibility without losing the balance between the viewing angle characteristics from the above position (or the bottom position) and those from the left position (or the right position), further which can prevent the contrast ratio in the front direction from decreasing.

Furthermore, it is also preferable to set the respective absolute values of the retardations in a perpendicular direction within the range from the polarizer to the quarter wavelength layer at less than one eight of the wavelength of the transmitted light, in which the quarter wavelength layer is included, whether the quarter wavelength layer substantially satisfies $nz4=(nx4+ny4)/2$, or not, or whether the compensation layer is provided, or not.

In the arrangement, just like the cases of the respective LCDs mentioned above, the retardation (in the perpendicular direction) for compensating the liquid crystal cell, can be given the position closer to the liquid crystal cell. Therefore, just like the case of the respective LCDs, it is possible to realize the LCD which can maintain a wide angle of visibility without losing the balance between the viewing angle characteristics from the above position (or the bottom position) and those from the left position (or the right position), further which can prevent the contrast ratio in the front direction from decreasing.

For a fuller understanding of the nature and advantages of the invention, reference should be made to the ensuing detailed description taken in conjunction with the accompanying drawings.

BRIEF DESCRIPTION OF THE DRAWINGS

FIG. 2, illustrating a constitutional example of the LCD, is a perspective view showing a pixel electrode and an opposite electrode.

FIG. 4 is an explanatory view showing an example of a display by the LCD.

FIG. 5 is an explanatory view illustrating an example of a display by the LCD of the embodiment.

FIG. 6, explaining another comparative example of the present invention, is a schematic view showing an arrangement of main sections of an LCD.

FIG. 7 is an explanatory view illustrating an evaluation method of a contrast ratio, in the LCD.

FIG. 14 is a graph showing the a contrast ratio of the LCD of the yet another comparative example.

FIG. 16 is a graph showing the a contrast ratio of the LCD of the still another comparative example.

FIG. 37, illustrating a modification example of the LCD, is a schematic diagram showing an arrangement of main sections of the LCD.

FIG. 39, illustrating a yet further constitutional example, is a schematic diagram showing an arrangement of main sections of the LCD.

FIG. 41, illustrating a modification example of the LCD, is a schematic diagram showing an arrangement of main sections of the LCD.

DESCRIPTION OF THE EMBODIMENTS

[First Embodiment]

Explained below is a first embodiment of the present invention, with reference to FIGS. 1 to 16. It should be noted that, the present invention can be employed for liquid crystal cells of other types, as it will be explained later, but described below is a liquid crystal cell, in which liquid crystal molecules have different alignment directions from each other in a pixel, for example, radiate and inclined alignment (that is, the alignment is in a radiated manner in terms of in-plane directions and is inclined with respect to the perpendicular direction) or multi domain alignment, as a suitable example.

Figure 1:
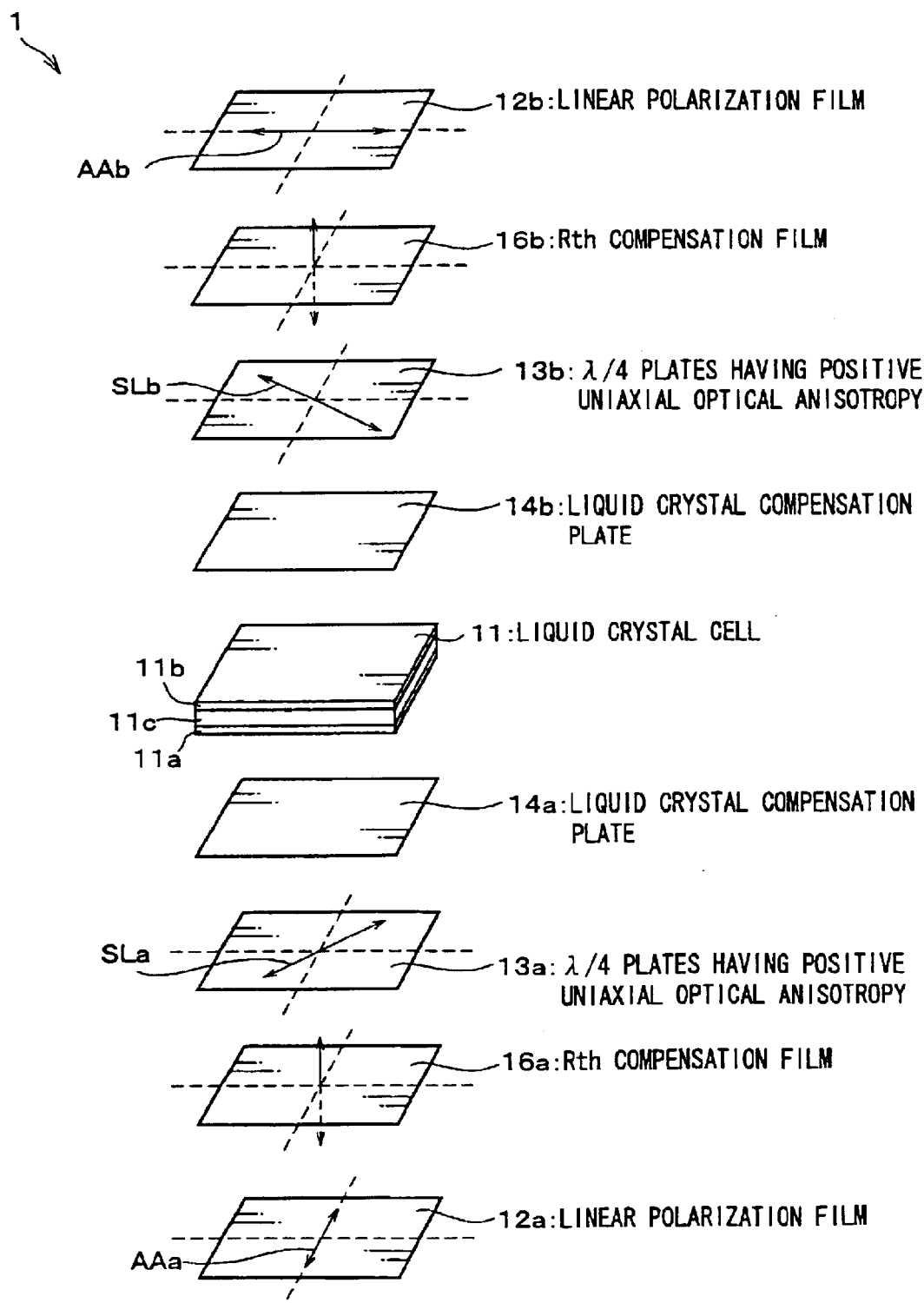
FIG. 1, illustrating an embodiment of the present invention, is a schematic diagram showing an arrangement of main sections of an LCD.

An LCD 1 of the present embodiment, as shown in FIG. 1, including a liquid crystal cell 11, linear polarization films (polarizers) 12a and 12b which are disposed on both sides of the liquid crystal cell 11, is characterized by having the following arrangement, namely: the liquid crystal cell 11 is provided with a TFT substrate 11a (a first substrate), an opposite substrate 11b (a second substrate), and a liquid crystal layer 11c that is disposed in-between the respective substrates 11a and 11b. The substrate 11a includes a pixel electrode 21a (see FIG. 2), which corresponds to a pixel, while the substrate 11b has an opposite electrode 21b (see FIG. 2). Further, the liquid crystal layer 11c is controlled so that liquid crystal molecules are aligned in different directions in the pixel, for example as describe by arrows in FIG. 2, at least when a voltage between the pixel electrode 21a and the opposite electrode 21b is a predetermined voltage.

In addition, as shown in FIG. 1, the LCD 1 is provided with λ/4 plates (quarter wavelength layers) 13a and 13b, liquid crystal compensation plates (phase difference layers; negative films) 14a and 14b, and Rth compensation films (compensation layers) 16a and 16b. The λ/4 plates 13a and 13b are respectively placed between the liquid crystal cell 11 and the respective linear polarization films 12a and 12b. The liquid crystal compensation plates 14a and 14b are positioned between the liquid crystal cell 11 and at least one of (here, each of) the λ/4 plates 13a and 13b, in which a main refraction index nz1 is the lowest among main refraction indexes nx1, ny1 and nz1, where main refraction indexes in in-plane directions are nx1 and ny1, while a main refraction index in a normal direction is nz1. The Rth compensation films 16a and 16b are disposed at least either of positions between the linear polarization film 12a and the λ/4 plate 13a, or between the linear polarization film 12b and the λ/4 plate 13b. Here, the Rth compensation films 16a and 16b are provided in both the positions. In the Rth compensation films 16a and 16b, a main refraction index nz2 is the highest among main refraction indexes nx2, ny2 and nz2, where main refraction indexes in in-plane directions are nx2 and ny2, while a main refraction index in a normal direction is nz2.

Here, in the λ/4 plate 13a (13b), a retardation in an in-plane direction is set at a quarter wavelength of a wavelength of transmitted light. The λ/4 plates 13a and 13b respectively have lag phase axes SLa and SLb crossing each other at a right angle. The lag phase axes SLa and SLb are set to make an angle of 45 degrees with absorption axes AAa and AAb of the linear polarization films 12a and 12b, which are located adjacent to the λ/4 plates 13a and 13b, respectively.

In the LCD 1 of the above arrangement, for example when light is introduced via the linear polarization film 12a, the light, which transmits through the linear polarization film 12a and the λ/4 plate 13a, strikes into the liquid crystal cell 11. Thus, circularly polarized light is introduced into the liquid crystal cell 11, and light emitted from the liquid crystal cell 11 is give a phase difference of a quarter wavelength by the λ/4 plate 13b, then emitted out via the linear polarization film 12b.

In case that the voltage between the pixel electrode 21a and the opposite electrode 21b is at a predetermined voltage, for example, in case that a voltage is applied, or in case of an initial alignment condition with no voltage applied, the liquid crystal molecules are controlled to have different alignment directions from each other. In this condition, the liquid crystal cell 11 gives the transmitted light a phase difference suitable for the alignment direction, whereby the circularly polarized light is converted into elliptically polarized light. Therefore, the light transmitted through the liquid crystal cell 11 will not be converted back into the linearly polarized light even by passing though the λ/4 plates 13b, and a part of the emitted light from the λ/4 plate 13b is emitted out of the linear polarization film 12b. As a result, it is possible to control the quantity of the emitted light from the linear polarization film 12b in accordance with the applied voltage, so that a gradation display can be attained.

Moreover, because the alignment directions of the respective liquid crystal molecules differ from each others in the pixel, regions having liquid crystal molecules with different alignment directions from each other are allowed to optically compensate each other. As a result, the angle of visibility can be enlarged by improving the display quality when the LCD is viewed from a diagonal direction.

In the liquid crystal cell 11, disorder of the alignment condition is often caused as the result of controlling in the pixel the alignment directions of the liquid crystal molecules to be different from each other for the sake of maintaining the broader angle of visibility. Therefore, in case of a conventional LCD where linearly polarized light is introduced into a liquid crystal cell, and emitted light of the liquid crystal cell is introduced into a light analyzer, the alignments of the liquid crystal molecules are disordered, whereby the liquid crystal molecules cannot give the transmitted light the phase difference, regardless of subtract normal direction component, when in-plane components of the alignment directions are identical with the absorption axis of the polarizer. Thus, the regions in which such liquid crystal molecules exist cannot contribute to improvement of brightness, but causes roughness in a display. Moreover, a light utilization rate (an effective aperture rate) is reduced because the liquid crystal molecules, in which the in-plane components of the alignment directions are identical with the absorption axis of the light analyzer, cannot contribute to the brightness. As a result, this makes it harder to maintain the contrast ratio, and to increase gradation varieties (that is, to display much more gradations).

On the contrary, in the LCD 1 of the present embodiment, where the substantially circularly polarized light is introduced into the liquid crystal cell 11, anisotropy of the alignment direction in the liquid crystal cell 11 will never be generated. Thus, the liquid crystal molecules can give the transmitted light the phase difference, except when the alignment directions of the liquid crystal molecules are accorded with the transmitted light in terms of both the in-plane component and the substrate normal direction. Thereby, the brightness can be improved, even though high occurrence of disorder of the alignment condition is resulted from the controlling of the alignment directions of the liquid crystal molecules to be different from each other in the pixel for the sake of maintaining the broad angle of visibility, except when the disturbed alignment directions of the liquid crystal molecules are accorded with the viewing angle. As the result, a high light utilization rate can be ensured with the broad angle of visibility maintained.

On the other hand, when the liquid crystal molecules of the liquid crystal cell 11 are aligned in the substrate normal direction (the vertical direction), the liquid crystal cell 11 cannot give the phase difference to the transmitted light. As the result, the transmitted light is emitted out with the substantially circularly polarized light maintained. The emitted light is converted into the linearly polarized light by the λ/4 plate 13b, then is inputted into the linear polarization film 12b, so that its transmission is limited. Thus, the LCD 1 can perform the black display.

However, even though the liquid crystal molecules are vertically aligned, the alignment direction of the liquid crystal molecules and the direction of the transmitted light do not match each other, when the LCD is viewed from a direction tilted from the substrate normal direction at the polar angle. As the result, the liquid crystal cell 11 gives the transmission light a phase difference in accordance with the polar angle. But, the liquid crystal compensation plates 14a and 14b, which have the main refraction index nz1 smaller than the nx1 and ny1, are capable to give a phase difference opposite to the phase difference given by the liquid crystal cell 11.

Moreover, in the above arrangement, the Rth compensation films 16a and 16b are respectively provided between the linear polarization films 12a (12b) and the λ/4 plates 13a (13b) The Rth compensation films 16a and 16b have an opposite sign retardation in a perpendicular direction, compared to the liquid crystal compensation plates 14a and 14b. Therefore, for example, when a section, which has a function to act as a negative film, such as supporters of the linear polarization films 12a and 12b, are provided in-between the polarizer and the quarter wavelength layers, or if the quarter wavelength layer has a retardation in a perpendicular direction, the retardations in those sections are cancelled out by the compensation layer. Note that, the negative film is a phase difference layer having a negative Rth value, when the retardation Rth in a perpendicular direction is defined by an equation: Rth={nz−(nz+ny)/2}·d, where main refraction indexes in in-plane directions are nx and ny, a main refraction index in a normal direction is nz, and thickness is d.

As the result, the retardation in a perpendicular direction in the range from the linear polarization film 12a (12b) to the λ/4 plate 13a (13b), in which included is the λ/4 plate 13a (13b), can be reduced, even when the sum of the retardations in a perpendicular direction from the linear polarization film 12a to the liquid crystal cell 11 and from the liquid crystal cell 11 to the linear polarization film 12b is constant. This can give the retardation (in the perpendicular direction) for compensating the liquid crystal cell 11 a position closer to the liquid crystal cell 11, compared to the case where no Rth compensation film 16a (16b) is provided. Thereby, the light leakage during the black display can be prevented and a good black display can be achieved.

Those arrangements result in realization of an LCD, in which a high contrast ratio can be maintained with a broad angle of visibility, even when high occurrence of the disorder of the alignment condition is caused by controlling the alignment directions of the liquid crystal molecules in the pixel to be different from each other for the sake of maintaining the broad angle of visibility.

Detailed explanation on concrete constitutional examples and effects of the respective sections is provided below, comparing the constitutional examples with comparative examples. The liquid crystal cell 11 is a liquid crystal cell of a vertical alignment (VA) method, where liquid crystal molecules are aligned vertically with respect to a substrate when no voltage is applied, while application of a voltage gives the liquid crystal molecules a radiate and inclined alignment in which alignment directions are continuously varied. The liquid crystal cell 11 is produced by (1) applying vertical alignment films (not shown) on both of a thin film transistor (TFT) substrate 11a, in which a thin film transistor element (not shown) and a pixel electrode 21a are aligned in a matrix manner, and an opposite substrate 11b provided with an opposite electrode 21b, then (2) affixing both the substrates, further (3) filling a gap between the respective substrates with nematic liquid crystal having a negative dielectric constant anisotropy. This allows the liquid crystal cell 11c to have liquid crystal molecules having a substantially vertical alignment when no voltage is applied, while the liquid crystal molecules are tilted and aligned horizontally when the voltage is applied.

In the present embodiment, as an example, the liquid crystal has an refraction index anisotropy Δn of 0.1, while cell thickness is set at 3 μm. In this case, the retardation in the perpendicular direction is 300 nm. Note that, in the present embodiment, the refraction index anisotropy Δn is, for example, attained by using a material having an ordinary light refraction index no=1.5, and an extraordinary light refraction index ne=1.6.

Moreover, in the liquid crystal cell 11 of the present embodiment, as shown in FIG. 2, the respective pixel electrodes 21a, which are provided on the TFT substrate 11a, are provided with a circular slit 22. Because of this, within a top surface of the pixel electrode 21a, a region just above the slit 22 is kept out of an electrical field that is strong enough to incline the liquid crystal molecules, when the voltage is applied. Therefore, the liquid crystal molecules have the vertical alignment in the region, even when the voltage is applied. On the other hand, in a region in a vicinity of the slit 22 within the top surface of the pixel electrode 21a, the electrical field is spread in a tilted manner as it is closer to the slit 22 in the perpendicular direction, whereby the electrical field is kept off from the slit 22. In the vicinity of the slit 22, the liquid crystal molecules are tilted in a manner that its major axis is inclined in a vertical direction. Thus, because of the continuity of the liquid crystal, the liquid crystal molecules distant from the slit 22 are aligned in the same manner as the major axis of the liquid crystal molecules. Therefore, when a voltage is applied onto the pixel electrode 21a, the respective liquid crystal molecules can be aligned in a manner that in-plane components of the alignment directions are spread radiately centered with respect to the slit 22, as indicated by arrows shown in FIG. 2. In other words, the liquid crystal molecules can have an axis-symmetric alignment centered with respect to the slit 22 as an axis. Here, the incline of the electrical field is varied in accordance with the applied voltage. Thus, the substrate normal direction component (an incline angle) of the alignment directions of the liquid crystal molecules can be controlled by using the applied voltage. Furthermore, an increase in the applied voltage can enlarge the incline angle with respect to the substrate normal direction, whereby the respective liquid crystal molecules are aligned substantially horizontally with respect to the display screen, and radiately in the in-plane directions.

In addition, when a liquid crystal television of a large size, for example, of 40 inches, is produced, the pixels have a large size, as large as 1 mm square. This may cause instability in the alignment when the alignment cannot be sufficiently controlled by providing the pixel electrode 21a with only one slit 22. Therefore, it is preferable to equip the respective electrode 21a with a plurality of slits 22, where more control of the alignment is required.

On the other hand, in FIG. 1, the λ/4 plate 13a (13b) has a positive uniaxial optical anisotropy, for example, by producing it from a uniaxial oriented polymer film. Because the film has double refraction anisotropy, linearly polarized light, which has a 45-degree polarization direction with respect to the lag phase axis SLa, can be converted into the circularly polarized light by setting thickness (a length in the substrate normal direction) so that the optical path difference between the ordinary light and the extraordinary light is a quarter wavelength of the incident light. Further, when the circularly polarized light is introduced, the circularly polarized light can be converted into linearly polarized light having polarization direction of 45 degrees with respect to the lag phase axis SLb of the λ/4 plate 13b. In the present embodiment, it is arranged that each retardation in the in-plane direction of the respective λ/4 plates 13a and 13b is 137.5 nm at 550 nm wavelength. As an example, in the present embodiment, a uniaxial oriented film in which nx=1.501375, ny=nz=1.5, and thickness d=100 μm, where refraction indexes in the in-plane directions are nx and ny, respectively, and the main refraction index in the normal direction is nz. In this case, the retardation in an in-plane direction is 137.5 nm with respect to the light of 550 nm wavelength, while the retardation in a perpendicular direction is −68.75 nm, because it is a uniaxial oriented film.

In addition, at the formation of the liquid crystal layer 11c, it is preferable to shift the optical path difference of the λ/4 plate 13a (13b) from the quarter wavelength, in accordance with a twist angle of the liquid crystal cell 11, where the light utilization rate and the color balance at the white display are optimized by addition of a chiral dopant to make the twist angle of 90°, just like in an LCD apparatus recited in Japanese Un-examined Patent Publication Tokukaihei No. 2000-47217 (published on Feb. 18, 2000) and in a TN mode LCD.

Moreover, the LCD 1 of the present embodiment is, as shown in FIG. 1, the absorption axis AAa of the linear polarization film 12a and the absorption axis AAb of the linear polarization film 12b are disposed to cross each other at a right angle, while the lag phase axes SLa and SLb of both of the λ/4 plates 13a and 13b are disposed to cross each other at a right angle. Furthermore, the λ/4 plate 13a and the linear polarization film 12a are adjacent to each other, and make a 45° angle between their lag phase axis SLa and absorption axis AAa. Meanwhile the λ/4 plate 13b and the linear polarization film 12b are positioned in the same manner.

Further, the liquid crystal compensation plates 14a and 14b are produced from a film that satisfies nx =ny>nz, where the main refraction indexes in the in-plane directions are nx and ny, while the main refraction index in the normal direction is nz. The retardation in a perpendicular direction of the film Rth can be defined by an equation: Rth=d·{nz−(nx +ny)/2}, where the thickness is d. Thus, materials and thickness of the film are selected so that each retardation Rth in a perpendicular direction of the respective liquid crystal compensation plates 14a and 14b is −100 nm. For example, in the present embodiment, such a retardation Rth is attained by giving the thickness of d=50 μm to the film that satisfies nx=ny=1.502 and nz=1.5.

On the other hand, the Rth compensation films 16a and 16b are respectively given the retardation Rth of 68.75 nm in a perpendicular direction so as to cancel out the retardations in the perpendicular direction of the λ/4 plates 13a and 13b. In the present embodiment, as an example, the respective Rth compensation films 16a and 16b are structured with a film having characteristics that can be described by a uniaxial refraction index ellipsoid, which satisfies nx=ny<nz, where the main refraction indexes in the in-plane directions are nx and ny, while the main refraction index in the perpendicular direction is nz. It is set that the respective Rth compensation films have thickness d=100 μm, the main refraction indexes in the in-plane directions nx=ny=1.5, the main refraction index in the normal direction nz=1.5006875. Note that, the in-plane retardation Re is 0 nm because nx=ny.

In the above arrangement, the liquid crystal molecules of the liquid crystal cell 11 are vertically aligned while no voltage is applied between the pixel electrode 21a and the opposite electrode 21b. In this state, that is, when no voltage is applied, the incident light into the LCD 1 is passed through the linear polarization film 12a, so that the light is converted into linearly polarized light having the polarization direction at 45° with respect to the lag phase axis SLa of the λ/4 plate 13a. Further, the linearly polarized light is converted into the circularly polarized light by passing through the λ/4 plate 13a.

Here, the liquid crystal molecules do not give the phase difference to the light introduced in a direction parallel to the alignment direction. Therefore, the liquid crystal cell 11, which cannot give the phase difference to the light that is introduced in a vertical direction, have almost no double refraction characteristics. As a result, the circularly polarized light, which is emitted out of the λ/4 plate 13a, passes through the liquid crystal cell 11 with its polarization state maintained, then is introduced into the λ/4 plate 13b. When the circularly polarized light passes through the λ/4 plate 13b, the circularly polarized light is converted into linearly polarized light having a polarization direction at 45° with respect to the lag phase axis SLa of the λ/4 plate 13b, that is, along with the absorption axis AAb of the linear polarization film 12b. Therefore, the linearly polarized light is absorbed in the linear polarization film 12b, so that the LCD 1 can perform the black display when no voltage is applied.

On the contrary, when a voltage is applied between the pixel electrode 21a and the opposite electrode 21b, the liquid crystal molecules in the liquid crystal cell 11 have a radiate and inclined alignment centered on the slit 22 as the center axis. Even in this state, the conversion of the polarization is carried out until the liquid crystal cell 11, in the same way as the case where no voltage is applied. Thus, the circularly polarized light is introduced into the liquid crystal cell 11.

However, the alignment direction of the liquid crystal molecules are varied to the radiate and inclined alignment, while the voltage is applied. Here, the liquid crystal molecules give no phase difference to the light that is introduced in the direction parallel to the alignment. Meanwhile, when the alignment direction and the incident direction are different, the liquid crystal molecules can give a phase difference to the transmitted light in accordance with the angle between the directions.

As a result, in case of the light vertically introduced into the liquid crystal cell 11, for example, the liquid crystal cell 11 can give the phase difference to the transmitted light so that the polarization of the transmitted light is changed, with the exception of a small region in which the liquid crystal molecules are aligned along the substrate normal direction even when the voltage is applied, such as the region just above the slit 22. Accordingly, the emitted light from the liquid crystal cell 11 is varied generally to the elliptically polarized light. The elliptically polarized light will not be converted into the linearly polarized light even by passing through the λ/4 plate 13b, not like the case that no voltage is applied. Therefore, a part of the light, which is given to the linear polarization film 12b from the liquid crystal cell 11 via the λ/4 plate 13b, can transmit through the linear polarization film 12b. Here, the quantity of the polarized light, which transmits through the linear polarization film 12b, depends on the magnitude of the phase difference given by the liquid crystal cell 11. Therefore, the quantity of the emitted light from each pixel of the LCD 1 can be changed by adjusting the alignment direction of the liquid crystal molecules by controlling the voltage applied onto the pixel electrode 21a, thereby attaining the gradient display.

With the above arrangement, because of the liquid crystal molecules of the liquid crystal cell 11 having the radiate and inclined alignment, each liquid crystal molecule optically compensates each other. Therefore, when the LCD 1 is viewed from a certain in-plane direction, compared to cases where the LCD 1 is viewed from the other in-plane directions, some of the liquid crystal molecules reduces the quantity of the light transmitted through some liquid crystal molecules, while other liquid crystal molecules, which have alignment directions different from the former liquid crystal molecules, increase the quantity. As a result, the phase differences, which are given to the transmitted light, are substantially identical as regards all the liquid crystal molecules that relates to a display of a certain pixel. In this way, in each pixel, the respective regions, which have liquid crystal molecules of different pixel alignment directions, compensate each other. Therefore, it is possible to enlarge the angle of visibility by improving the display quality for a diagonal view, compared to the case all the liquid crystal molecules, which relate to the display of the pixel, have an inclined alignment in a specific direction.

Figure 3:
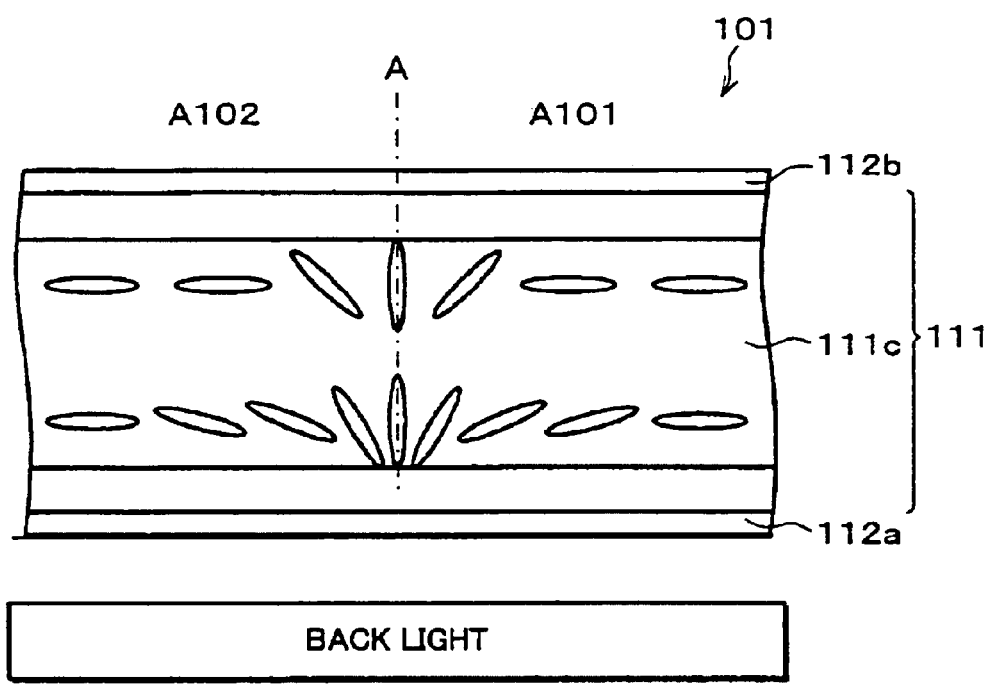
FIG. 3, explaining a comparative example of the present invention, is a schematic diagram showing an arrangement of main sections of an LCD.
Figure 8:
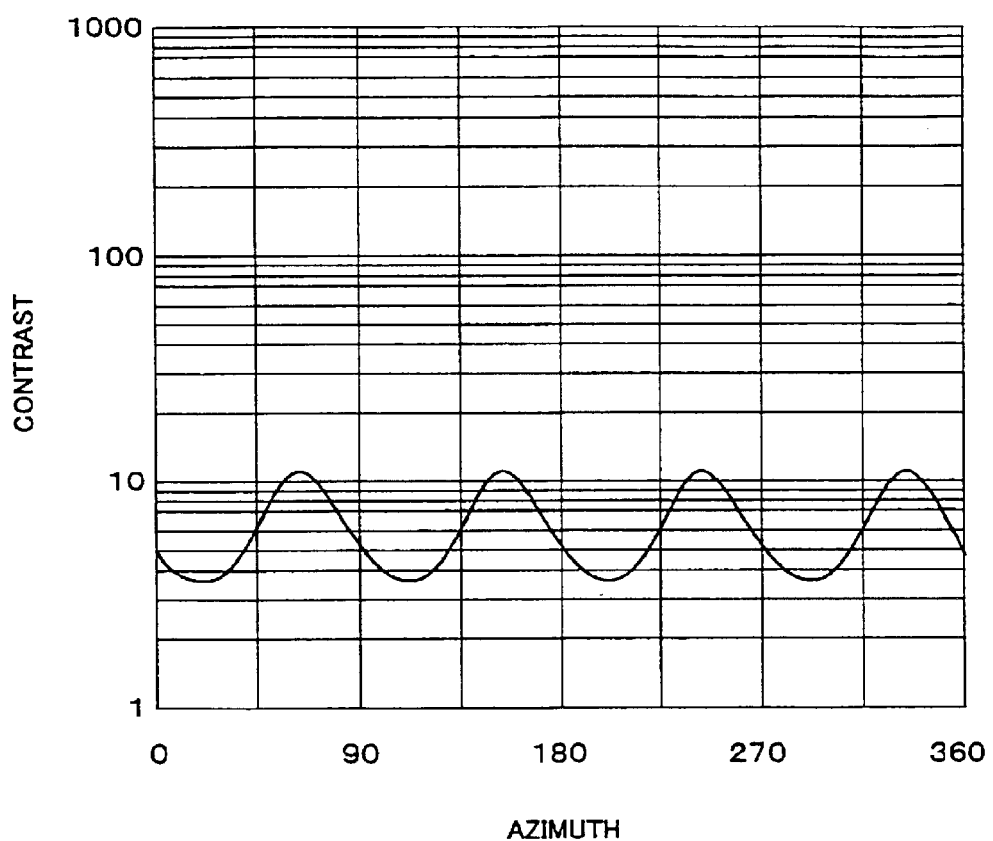
FIG. 8 is a graph showing the contrast ratio of the LCD of the comparative example.

In an LCD 101, which is shown in FIG. 3 as a comparative example, it is arranged that the liquid crystal molecules in the liquid crystal cell 111 have the radiate and inclined alignment, so that a broad angle of visibility is ensured. However, in this case where the linearly polarized light is introduced into the liquid crystal cell 111, there are liquid crystal molecules having an alignment inclined in a direction so as to accord an in-plane component of the alignment direction with the direction of the linear polarization. Here, those liquid crystal molecules are not able to give the phase difference to the transmitted light, regardless of the normal direction component of the alignment directions. Thus, the light, which are transmitted through the liquid crystal molecules, are absorbed in a linear polarization film 112b, which is disposed on the emission side, just like the case of the vertical alignment.

As the result, the transmittance is lowered in the region along the linear polarization centered with respect to the position of a slit, and in the region just above the position of the slit. Therefore, a large fall in the transmittance may visualize a black shadow along the directions (crossed Nicols) of absorption axes of the linear polarization films 112a and 112b, for example, during the white display, as shown in FIG. 4.

Especially, in the LCD 101, the alignment has a tendency to be disturbed when the alignment directions of the respective pixels are controlled independently. Thus, the disturbance of the alignment is caused by insignificant factor, such as an external electrical field from a source signal line or a gate signal line, which is not a problem when there is only one alignment direction. Because each region or each pixel has different disturbance in the alignment, the black shadow is viewed as roughness in a display, thus deteriorating the display quality.

Moreover, when the region with the alignment disturbance is darkened, the brightness of the whole pixels is lowered, compared to the case where the predetermined transmittance is maintained in all of the regions. As the result, the light utilization rate (the effective aperture rate) of the LCD is lowered.

LCDs have been improved year after year, in terms of resolution and gradient. Thus, demanded is an LCD that can display more gradient, even though an area per pixel is getting smaller. But, the deterioration of the effective aperture rate by the alignment disturbance results in a lower brightness during the white display, thereby making it difficult to improve the gradient. In addition, the brightness can be improved by enlarging the pixel area, but it makes it harder to improve the resolution.

On the contrary, in the arrangement of the present embodiment, where the circularly polarized light is introduced into the liquid crystal cell 11, only the liquid crystal molecules, in which both of the in-plane component and the normal direction component are aligned in the same direction as the viewing angle, cannot give the phase difference to the transmitted light, even though the wide angle of visibility is ensured by having the radiate and inclined alignment. Therefore, the number of the liquid crystal molecules, which make no contribution, is decreased, thus making it harder to see the shadow. Moreover, even if the transmittance is so deteriorated that the shadow is visualized, it is possible to give the phase difference as long as both of the in-plane component and the normal direction component are not aligned in the same direction as the viewing angle. Therefore, only the position of the slit 22 is the region in which the shadow is displayed, as shown in FIG. 5, thus significantly reducing the region showing the shadow. Furthermore, whether the shadow can be seen, or not, increased is the number of the liquid crystal molecules that can give the phase difference to the transmitted light. As the result, the transmittance is approximately doubled, compared to the conventional LCD 101 having no λ/4 plates 13a and 13b. Thus, the light utilization rate (the effective aperture rate) and the brightness can be improved.

Moreover, in the LCD 1, the lag phase axis SLa of the λ/4 plate 13a and the lag phase axis SLb of the λ/4 plate 13b cross each other at the right angle, thus wavelength dispersion of the refraction index anisotropy of the respective λ/4 plates 13a and 13b cancel out each other. As a result, the linear polarization film 12b is able to absorb the transmitted light in a much broader range during the black display, thereby realizing a good black display without color contamination in which the black display is deteriorated by mixing other colors into the black color of the black display.

Here, at the time of the black display, the liquid crystal molecules are vertically aligned, so that the liquid crystal cell 11 gives no phase difference to the light introduced in the substrate normal direction. However, especially a transmission type LCD receives more quantity of light introduced in a diagonal directions with respect to the liquid crystal cell 11, that is in a direction tilted from the substrate normal direction, compared to a reflection type LCD. Accordingly, not only the incident light from the substrate normal direction, but the incident light from the diagonal direction affect the display, even when the LCD is viewed from the substrate normal direction.

Here, the incident light from the diagonal direction is given the phase difference also by the liquid crystal layer 11c having the vertical alignment. Given in FIG. 6 is a comparative example, in which an LCD 51 has a structure same as the LCD 1 shown in FIG. 1, except that the LCD 51 lacks the liquid crystal compensation plates 14a and 14b, and the Rth compensation films 16a and 16b. In this case, light (elliptically polarized light) given a phase difference cannot be converted back into linearly polarized light even by passing through a λ/4 plate 13b. Thus, a part of the light is allowed to transmit through a linear polarization film 12b. As the result, even though a vertical alignment of the liquid crystal molecules supposes to ensure the black display, a light leakage may be caused, thereby deteriorating a contrast ratio of the display.

Furthermore, where a display screen of an LCD is viewed at an angle as shown in FIG. 7, the incident light from the diagonal direction with respect to the substrate affects the display to much larger extent, thus resulting in generation of a larger light leakage and further deterioration of the contrast ratio. As the result, for example, the contrast ratio is about 10 at maximum for the direction having an angle (a polar angle) with respect to the substrate normal direction of 60°, while, for a lot of the azimuths, the contrast ratio is less than 4. Note that, in FIG. 8, the graph plots the contrast ratio for all the directions by changing the in-plane component (the azimuths), where the polar angle is 60°.

On the contrary, in the LCD 1 of the present embodiment, the liquid crystal compensation plates 14a and 14b are provided for cancelling out the phase difference, which is given by the liquid crystal cell 11 having the vertical alignment, in accordance with the polar angle.

Additionally, in the LCD 1 of the present embodiment, the Rth compensation films 16a and 16b are provided for cancelling out the retardations of the λ/4 plates 13a and 13b, themselves, among the retardations in a perpendicular direction in the range from the linear polarization films 12a (12b) to the λ/4 plates 13a (13b), including the λ/4 plates 13a (13b). This can position the liquid crystal compensation plates 14a and 14b, which have the retardation in a perpendicular direction for the optical compensation of the liquid crystal cell 11, closer to the liquid crystal cell 11.

Especially, in the above arrangement, even when a negative film is provided within the range for some manufacturing reasons, the retardation can be equivalent to the case where the retardation in a perpendicular direction, which is effective to compensate the liquid crystal cell 11, exists only in the negative films (14a, 14b) that are in contact with the liquid crystal cell 11, because the retardation Rth1 within the range is substantially zero.

Figure 9:
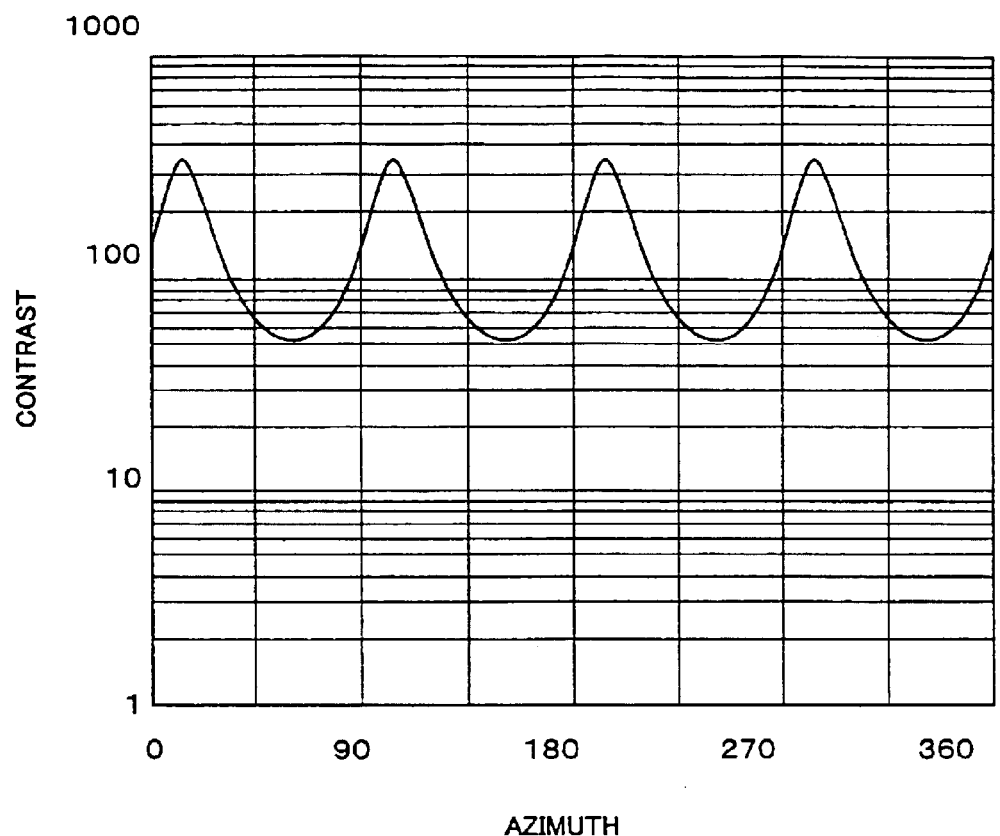
FIG. 9 is a graph showing the contrast ratio of the LCD of the embodiment.

As a result, as shown in FIG. 9, more than 50 is the contrast ratio for all the azimuths where the polar angle is 6020, thereby realizing the LCD 1 that has the broader angle of visibility than the LCD 51 shown in FIG. 6.

Furthermore, as shown in FIG. 9, the LCD 1 of the present embodiment has four directions, which show especially high contrast ratio, with a 90° interval. Each peak value is substantially equal to each other. Thereby, realized is the LCD 1 having a good balance among the viewing angle characteristics of the four directions.

Here, invariable is a sum S of the retardations in a perpendicular direction from the linear polarization film 12a to the liquid crystal cell 11, and from the liquid crystal cell 11 to the linear polarization film 12b, because it is necessary to set the sum S to cancel out the unwanted phase difference given by the liquid crystal cell 11 in accordance with the viewing angle.

Therefore, in order to confirm an effect of giving the position, which is closer to the liquid crystal cell 11, to the retardation (in the perpendicular direction) for the compensation of the liquid crystal layer, the contrast ratio was determined by a simulation while varying a constant K between the retardation Rth1 in a perpendicular direction within the range between the linear polarization films 12a (12b) to λ/4 plates 13a (13b), where the λ/4 plates 13a (13b) are inclusive, and the retardation Rth2 within the range between the λ/4 plates 13a (13b) to the liquid crystal cell 11 where the λ/4 plates 13a (13b) are exclusive.

It should be noted that the retardation Rth2 is, specifically speaking, the retardation until the liquid crystal layer 11c, not including the retardation in the liquid crystal layer 11c itself. However, even in an inside of the liquid crystal cell 11, if any layer, which exists until the liquid crystal layer 11c, for example, the respective substrates 11a and 11b or a thin film, generates a phase difference, the phase difference generated by the layer would be included in the retardation Rth2.

Result of the simulation and comparison using the respective comparative examples showed that the positions of the liquid crystal compensation plates 14a and 14b closer to the liquid crystal cell 11 gave a better contrast ratio, even if the sum S of the retardations in a perpendicular direction was constant.

Specifically, the contrast ratio was improved where the equation (1), which is listed below, is satisfied:

$$K = Rth2/(Rth1+Rth2) \geq 0.1 \tag{1}$$

Further, the constant K closer to 1.0 was better. When the constant K was 1.0, that is, Rth1 was zero, the display quality was optimized.

Figure 10:
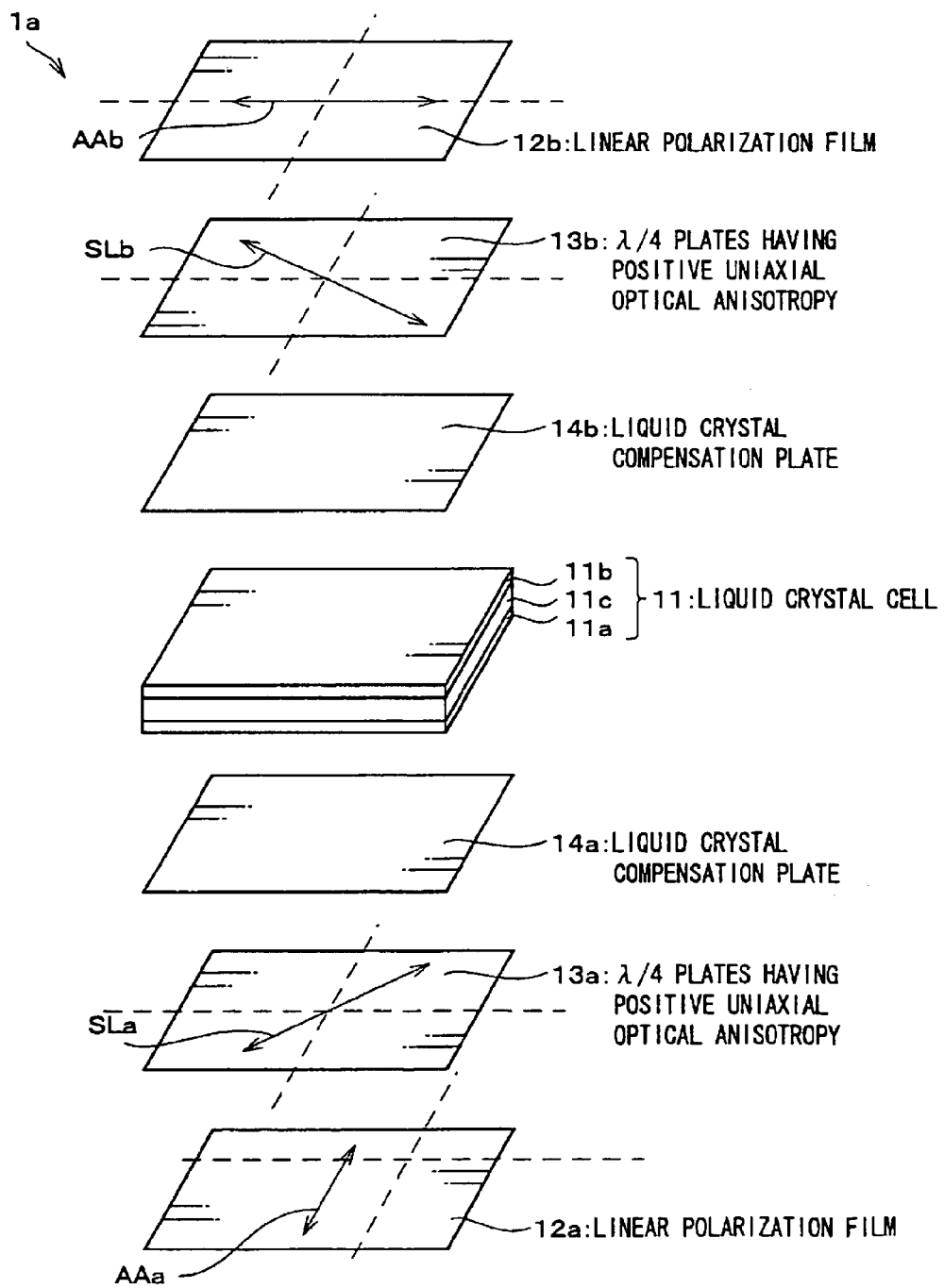
FIG. 10, explaining a modification example of the embodiment, is a schematic view showing an arrangement of main sections of an LCD.
Figure 11:
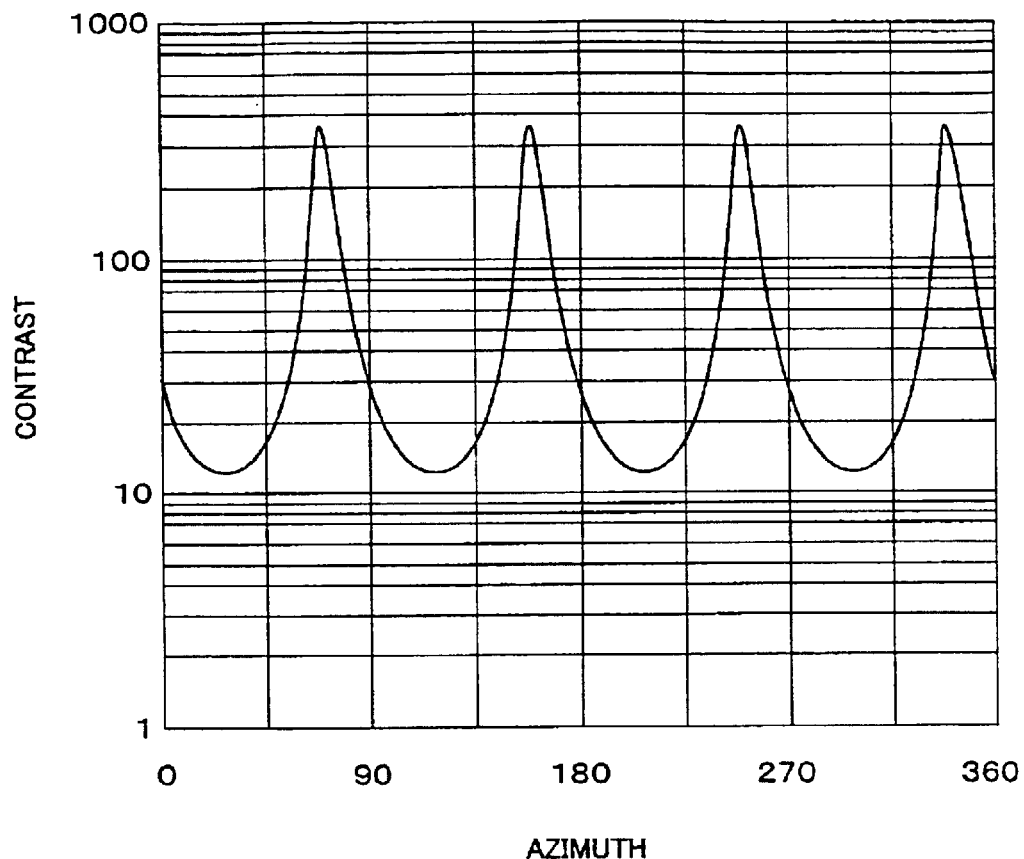
FIG. 11 is a graph showing the a contrast ratio of the LCD of the modification example.
Figure 12:
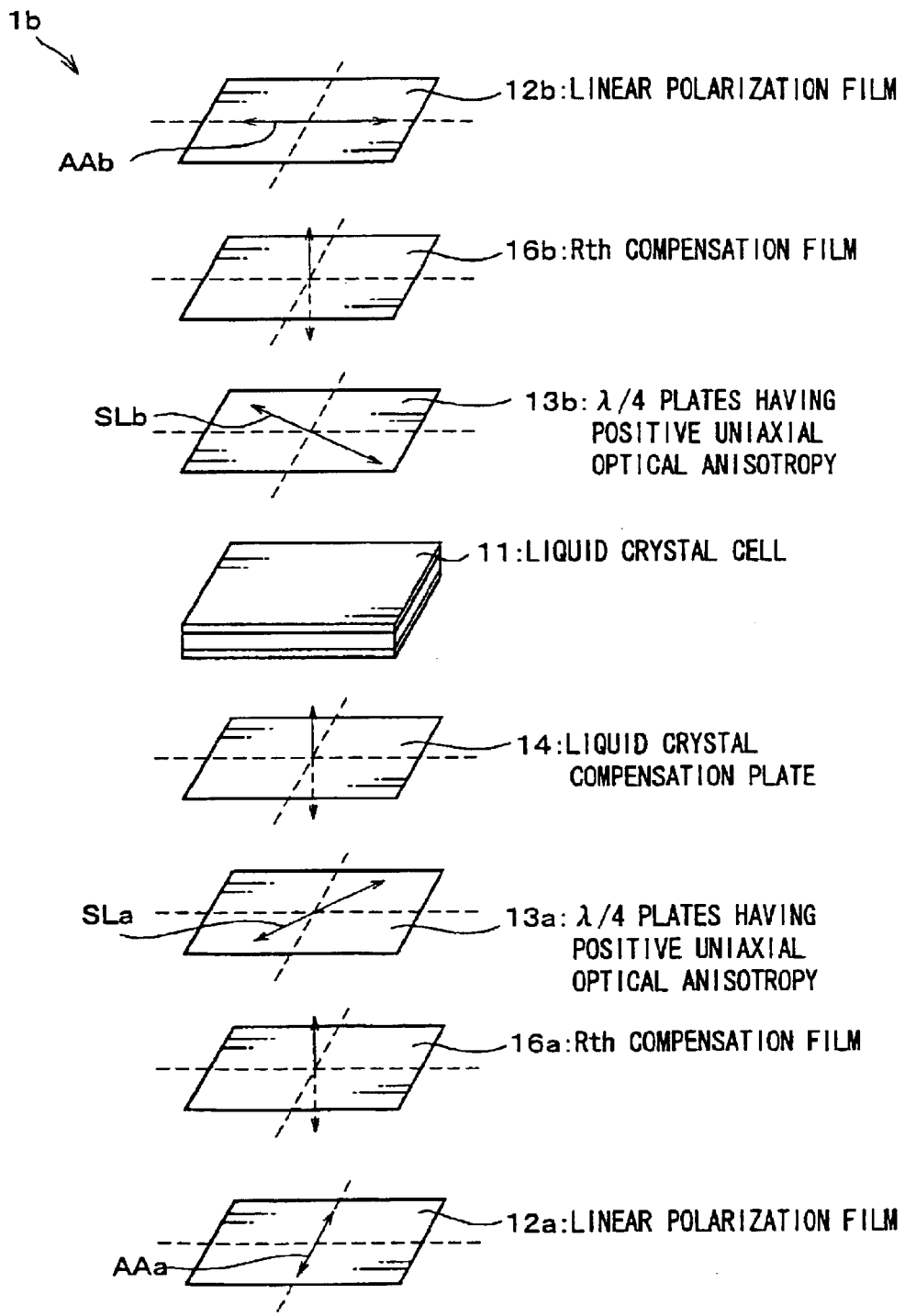
FIG. 12, explaining another modification example of the embodiment, is a schematic view showing an arrangement of main sections of an LCD.

For example, in an LCD 1a as a modification example of the present embodiment shown in FIG. 10, where the Rth compensation films 16a and 16b are omitted from the arrangement shown in FIG. 1, the retardation Rth in a perpendicular direction of the liquid crystal compensation plates 14a and 14b are respectively set at −60 nm, depending on the material and thickness of the film. The example also have the constant K more than 0.1, thus the contrast ratio has a value exceeding 10 for all the azimuths, where the polar angle is 60°. Therefore, realized is an LCD having broader angle of visibility than the LCD 51 shown in FIG. 6.

Explained above is the case where the liquid crystal compensation plates 14a and 14b are provided on both the sides of the liquid crystal cell 11. However, it should be noted that, as long as the sum S of the retardations in a perpendicular direction is constant, similar effect as the present embodiment can be attained, even if a liquid crystal compensation plate 14 having a two-time greater retardation (for example, Rth=200 nm) in the perpendicular direction is provided on one side of the liquid crystal cell 11, just like in an LCD 1b shown in FIG. 12. Further, even in this case, the inserting position of the negative film (the liquid crystal compensation plate) is better to be closer to the liquid crystal cell 11, for example, it is better to be positioned between the λ/4 plates 13a (13b) and the liquid crystal cell 11. Further, it is better to set the constant K at more than 0.1. It was confirmed that when the constant K is 1.0, that is, the Rth1 is zero, the display quality is optimized.

Figure 13:
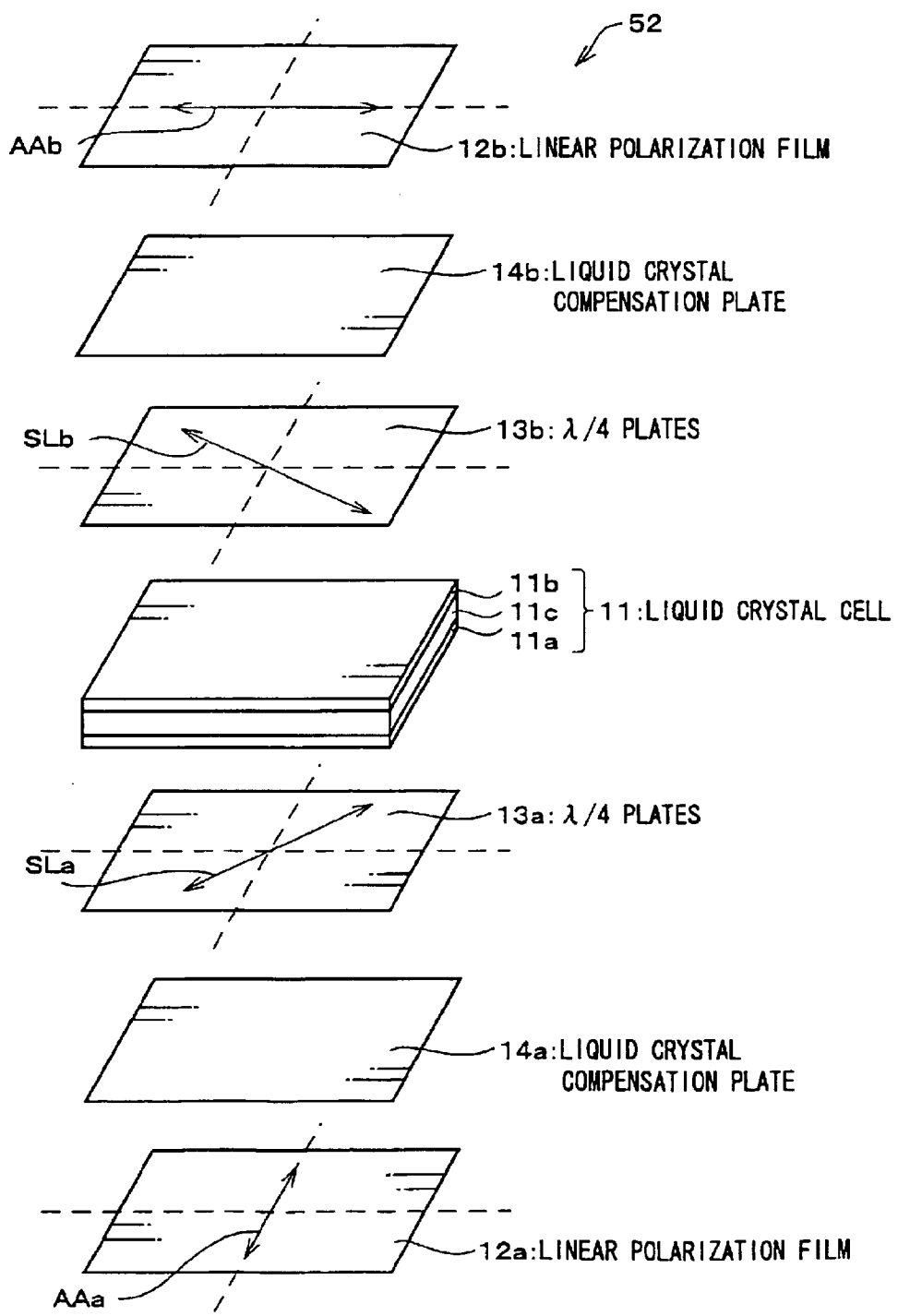
FIG. 13, explaining yet another comparative example of the present invention, is a schematic view showing an arrangement of main sections of an LCD.

For example, an LCD 52, shown in FIG. 13 as a comparative example, has the liquid crystal compensation plate 14a (14b) to add to the arrangement of the LCD 51 shown in FIG. 6. But, the liquid crystal compensation plate 14a (14b) is located between the λ/4 plate 13a (13b) and the linear polarization film 12a (12b), not like in FIG. 1 where the liquid crystal compensation plate 14a (14b) is disposed between the λ/4 plate 13a (13b) and the liquid crystal cell 11. Further, because of the lack of the Rth compensation films 16a and 16b, the retardation in a perpendicular direction of the liquid crystal compensation plate 14a (14b) is set to have smaller absolute value than the arrangement of FIG. 1, considering the retardation in the λ/4 plate 13a (13b). Thus, each retardation in the perpendicular direction of the liquid crystal compensation plate 14a (14b) is set at −60 nm.

In the present arrangement, measurement of the contrast ratio for all the azimuths where the polar angle was 60° showed, as shown in FIG. 14, the contrast ratio was improved, compared to the LCD 51 not having the liquid crystal compensation plates 14a and 14b, while the contrast ratio is lowered in comparison with the LCD 1 shown in FIG. 1. Some of the azimuths had the contrast ratio less than 5. Those results explained that, the inserting position of the liquid crystal compensation plate 14a (14b) between the λ/4 plate 13a (13b) and the liquid crystal cell 11, as shown in FIG. 1, gave much broader angle of visibility than the λ/4 plate 13a (13b) and the linear polarization film 12a (12b).

In addition, as another comparative example, the case where the Rth compensation films 16a and 16b, which are provided to the LCD 1 shown in FIG. 1, were disposed inside the λ/4 plates 13a and 13b, is given here. The comparison showed that disposition of the Rth compensation films 16a and 16b outside of the λ/4 plates 13a and 13b improved the contrast ratio for all the azimuths where the polar angle is 60°.

Furthermore, it was determined how close the position of the retardation (in the perpendicular direction) for the compensation of the liquid crystal layer to the liquid crystal cell 11, by a simulation in which considered is the value of the retardation Rth1, but not the constant K defined by the equation (1). The simulation revealed that an absolute value of the retardation Rth1 less than λ/8 showed an effect, while Rth1=0 is the best display quality, just as confirmed by the simulation for the constant K. Moreover, while the range less than λ/8 is preferable, it was found to be especially preferable that each of the absolute values of the Rth1 on both the sides of the liquid crystal 11c falls within a range between 550 nm and less than 11 nm of the wavelength, that is, within a range less than one fiftieth of the wavelength.

Figure 15:
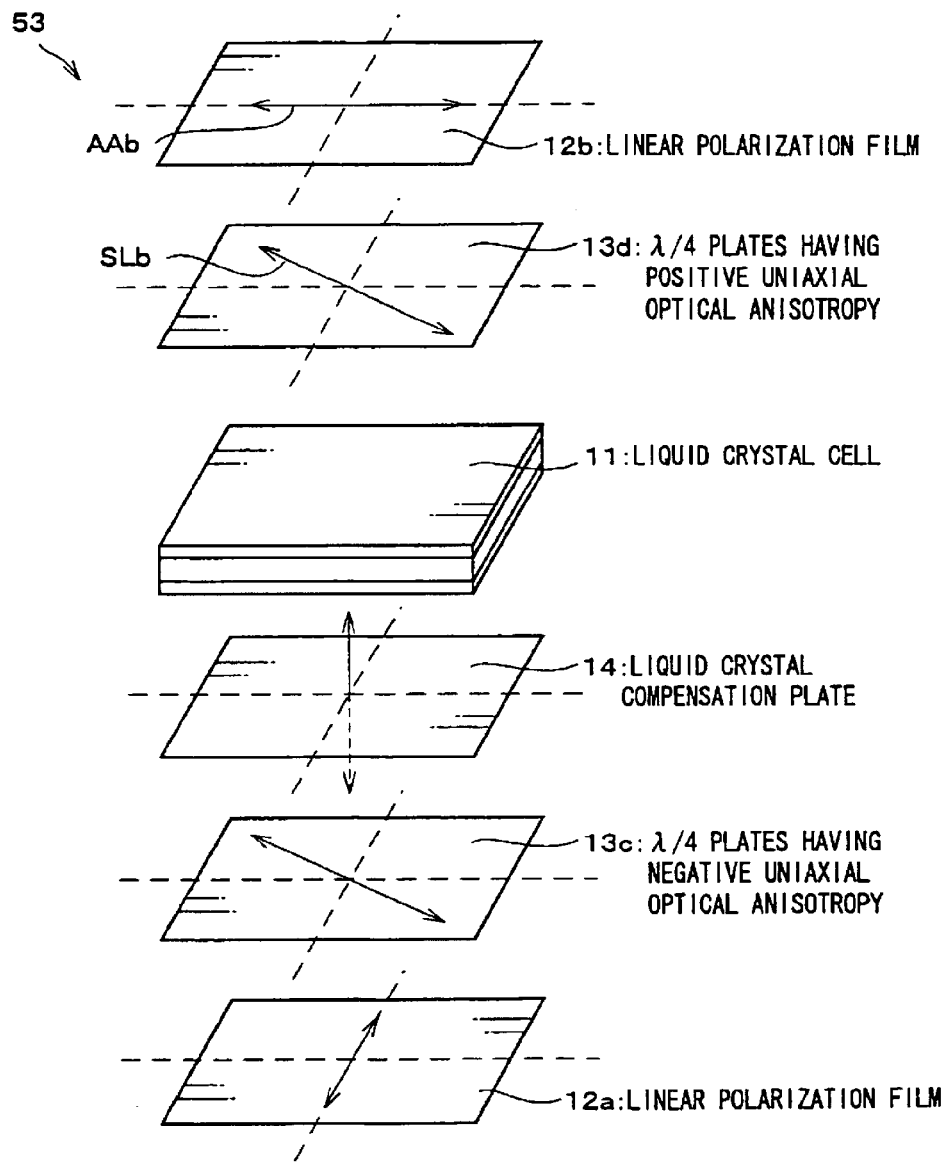
FIG. 15, explaining still another comparative example of the present invention, is a schematic view showing an arrangement of main sections of an LCD.

For example, given as still another comparative example is an LCD 53 shown in FIG. 15, where the λ/4 plates 13c and 13d, which respectively had negative and positive optical activities, were disposed between the linear polarization films 12a and 12b, which were similar to those in FIG. 1, while the liquid crystal cell 11, which was similar to the one shown in FIG. 1, was placed between the λ/4 plates 13c and 13d. Further, the liquid crystal compensation plate 14, which is identical with the one in FIG. 1, was disposed between the liquid crystal cell 11 and the λ/4 plate 13c having the negative optical activity. Here, both of the λ/4 plates 13c and 13d had the uniaxial optical anisotropy, while having the retardations of 68.75 nm and −68.75 nm in a perpendicular direction, respectively.

In the present arrangement, where the respective λ/4 plates 13c and 13d had the retardations in a perpendicular direction opposite to each other in terms of the sign, thereby cancelling out their retardations in a perpendicular direction each other. Thus, the sum S of the retardations in a perpendicular direction was equal to the one in the arrangement shown in FIG. 1. However, the constant K was zero on the side where the λ/4 plate 13d existed, while it was more than 1 on the side in which the λ/4 plate 13c was placed. Thus, the constant K was out of the range between 0.1 and 1.0 on both the sides. Further, the values of the retardations in a perpendicular direction of the λ/4 plates 13c and 13d were half of the in-plane direction retardations, that is, λ/8. Thus, no means to make the retardation Rth1 less than λ/8, where the best value is zero, for example, by providing the Rth compensation films 16a and 16b.

In this case, for example, shown in FIG. 16 is the contrast ratio for the direction where the angle (the polar angle) with respect to the substrate normal direction is 60°. As shown in FIG. 16, the contrast ratio was, for all the azimuths, lower than that shown in FIG. 9 which shows the contrast ratio of the arrangement shown in FIG. 1. Moreover, in this arrangement, not like in FIG. 9, the four peaks of the contrast ratio were not substantially equal. In the example shown in FIG. 16, the peaks in a vicinity of 0° and in the vicinity of 180° were significantly lower than the peaks in the vicinity of 90° and in the vicinity of 270°. This indicated that the contrast ratio of the vertical direction and that of the horizontal direction were not well balanced, in a practical condition where the peaks are arranged to be in the vertical or horizontal direction. Thus, it was possibly judged by a viewer that the display had a especially high contrast ratio in the vertical direction while its contrast ratio in the horizontal direction was poor compared to that in the vertical direction.

On the contrary, in the LCD 1 shown in FIG. 1, the retardation Rth1 in a perpendicular direction is set substantially at zero (or at least less than λ/8) at both of the side where the λ/4 plate 13a exists, and the side where the λ/4 plate 13b is located, by providing the Rth compensation films 16a and 16b. Therefore, as shown in FIG. 16, the four peaks of the contrast ratio have substantially equal values, thus realizing the LCD having a good balance between the constant ratio of the vertical direction and that of the horizontal direction.

Moreover, in the arrangement shown in FIG. 15, the λ/4 plates 13c and 13d, which had the positive or the negative characteristics, respectively, were different type of the phase difference film, which had different production conditions and processes. Thus, the λ/4 plates 13c and 13d may not be prepared uniformly. As a result, it was very hard to equalize their retardations in an in-plane direction exactly. This might result in the light leakage even at the time of the black display, especially deteriorate the contrast ratio in the forward direction, where the polar angel was zero, to a large extent.

On the contrary, in the arrangement shown in FIG. 1, provided are the λ/4 plates 13a and 13b that are the phase difference film of the same kind with same production condition and process. Because of this, their retardations in the in-plane direction can be exactly accorded with each other, even if they are not uniformly prepared. As a result, the light leakage during the black display can be avoided, while the contrast ratio in the front direction can be improved.

It should be noted that, in the above, the explanation is based on the example where the liquid crystal compensation plates 14a and 14b are made of the uniaxial oriented film which satisfies nx=ny>nz. But, it is also possible to use a negative film having main refraction indexes in in-plane directions nx and ny that are unequal to each other, when the liquid crystal compensation plates 14a and 14b are disposed on both the sides of the liquid crystal cell 11. In this case, a retardation in in-plane directions caused by the inequality between nx and ny can be cancelled out by disposing the respective x axes and y axes of the respective liquid crystal compensation plates 14a and 14b to cross each other at a right angle. As a result, an effect similar to that of the present embodiment can be attained.

Moreover, in the above, the explanation is based on the example where the retardation Rth1 in the perpendicular direction is set substantially at zero by setting the retardations in the perpendicular direction of the Rth compensation films 16a and 16b so as to cancel out the retardations in the perpendicular direction of the λ/4 plates 13a and 13b. However, for example, when a support for the linear polarization film 12a (12b) is provided as a section having a retardation in the perpendicular direction within the range from the linear polarization film 12a (12b) to the λ/4 plate 13a (13b) that is included, the Rth compensation film 16a (16b) is set so that the retardation Rth1 in the perpendicular direction is substantially zero, considering the retardation in the support. For example, where a film made of triacetyl cellulose (TAC) in which main refraction indexes are: nx=ny<nz, if the film has a retardation in a perpendicular direction is −30 nm, each retardation in the perpendicular direction of the respective Rth compensation films 16a and 16b is set at 98.75 nm, respectively. In this case, again, the retardation Rth1 in the perpendicular direction is substantially zero, thus providing the similar effect as that of the arrangement shown in FIG. 1.

[Second Embodiment]

Figure 17:
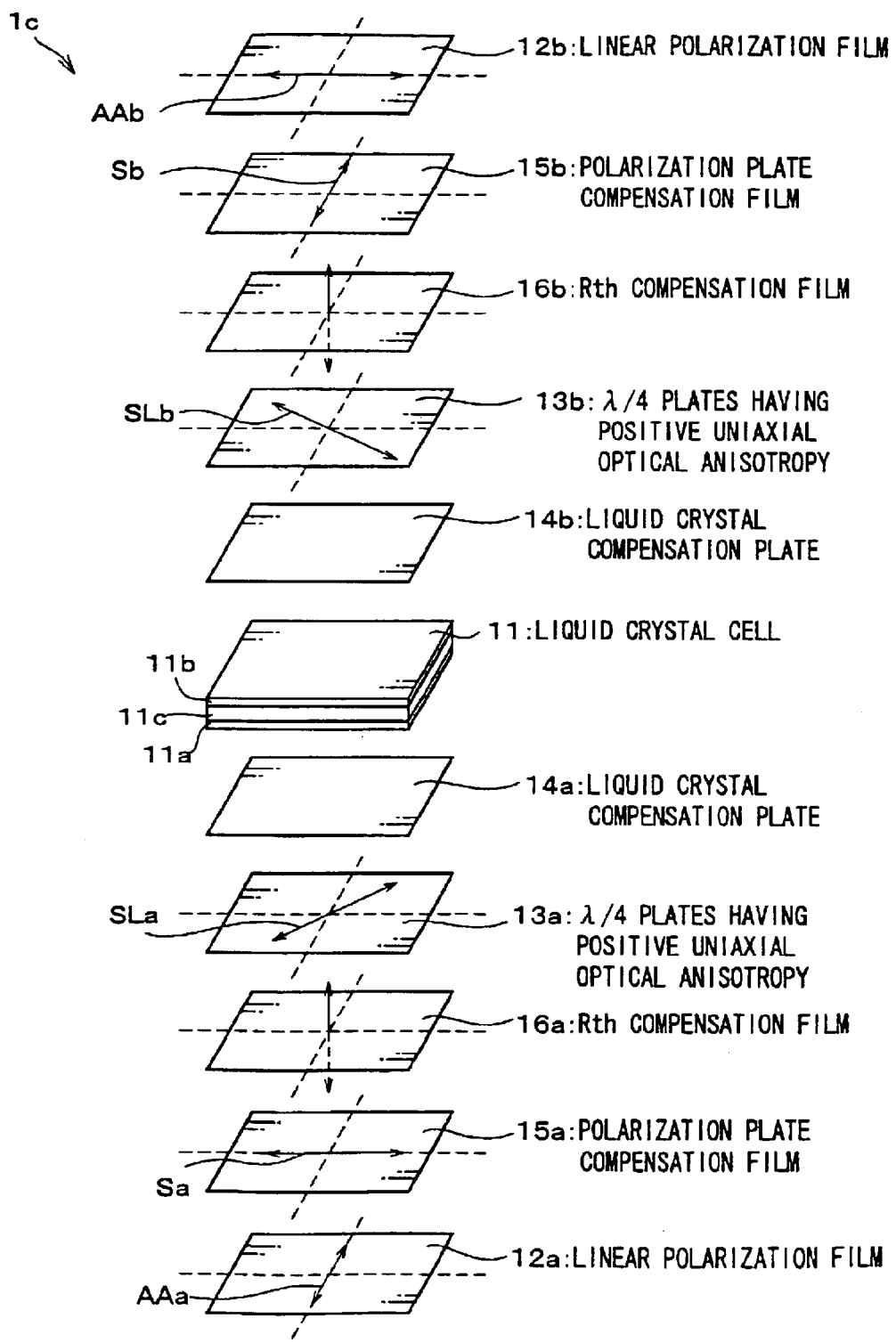
FIG. 17, explaining another embodiment of the present invention, is a schematic view showing an arrangement of main sections of an LCD.

An LCD 1c of the present embodiment, as shown in FIG. 17, in addition to the arrangement shown in FIG. 1, a polarization plate compensation film (polarizer compensation layer) 15a (15b) is provided between a linear polarization film 12a (12b) and a λ/4 plate 13a (13b) The polarization plate compensation film 15a (15b) has a lag phase axis to cross with an absorption axis AAa (AAb) of the linear polarization film 12a (12b). The polarization plate compensation film 15a (15b) has a retardation in a perpendicular direction opposite to that of the Rth compensation films 16a and 16b, just like the case of supports for the linear polarization films 12a and 12b, and the λ/4 plates 13a and 13b. The retardations in the perpendicular of the Rth compensation films 16a and 16b are set to cancel out the retardation in the perpendicular direction of the supports, the polarization plate compensation film 15a (15a) as well as that of the λ/4 plate 13a (13b).

Specifically, the polarization plate compensation film 15a (15b) is a uniaxial oriented film having retardation of 100 nm in in-plane directions. Therefore, the retardation in the perpendicular direction is −50 nm.

Moreover, a lag phase axis Sa (Sb) of the polarization plate compensation film 15a (15a) is crossed with the absorption axis AAa (AAb) of the linear polarization film 12a (12b), which is adjacent to the polarization plate compensation film, at a right angle. As a result, this prevents the light leakage that is caused when the LCD, which is provided with the linear polarization films 12a and 12b whose absorption axes AAa and AAb cross each other, is diagonally viewed in a direction of 45°.

Furthermore, in the present embodiment, just as the example mentioned previously, the linear polarization film 12a (12b) is supported by a support film having a retardation of −30 nm in a perpendicular direction. Further, each retardation of the perpendicular direction of the Rth compensation films 16a and 16b is set at 148.75 nm. Because of this, each retardation Rth1 in a perpendicular direction is set substantially at zero, respectively.

Figure 18:
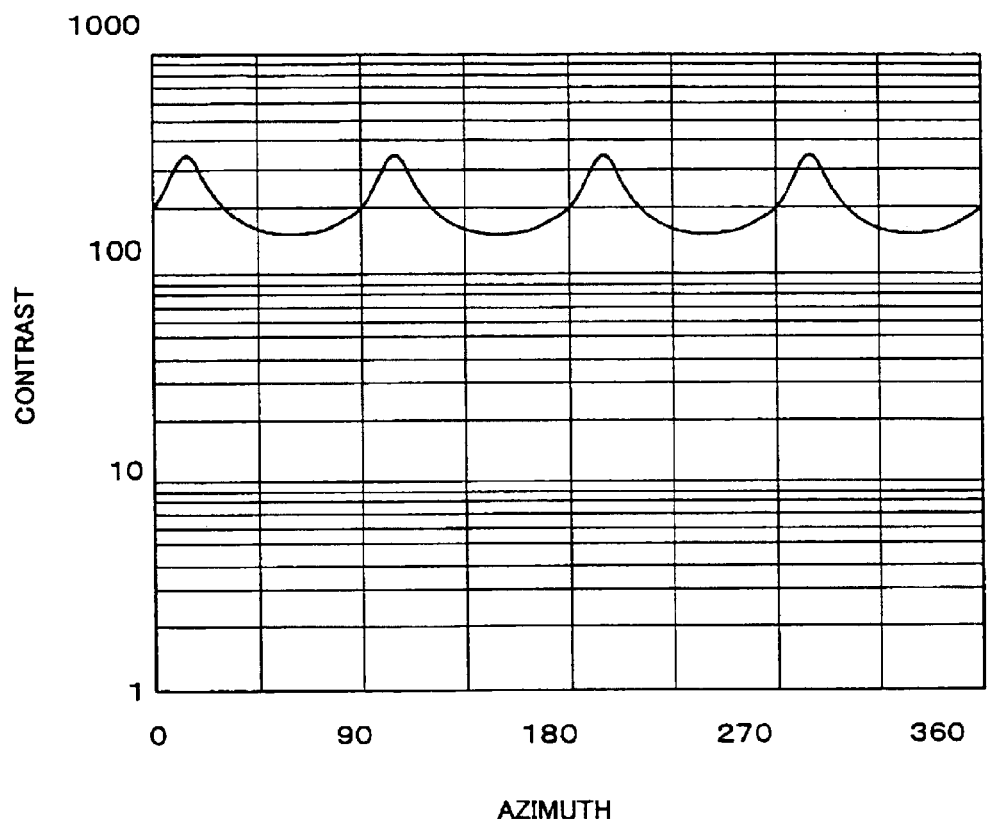
FIG. 18 is a graph showing the a contrast ratio of the LCD of the another embodiment.

In the arrangement, the retardation Rth1 in the perpendicular direction is set substantially at zero, even though a negative film is provided, for manufacturing reasons, in a range from the λ/4 plate 13a (13b) to the linear polarization film 12a (12b), in which the λ/4 plate 13a (13b) is included. This gives a contrast ratio of more than 100 for all the azimuths when a polar angle is 60°, as shown in FIG. 18, thus the contrast ratio is higher than that contrast ratio (see FIG. 9) of the arrangement shown in FIG. 1 for all the azimuths. In addition, the contrast ratio is improved especially at minimal values, thus realizing the LCD having the broader angle of visibility.

Figure 19:
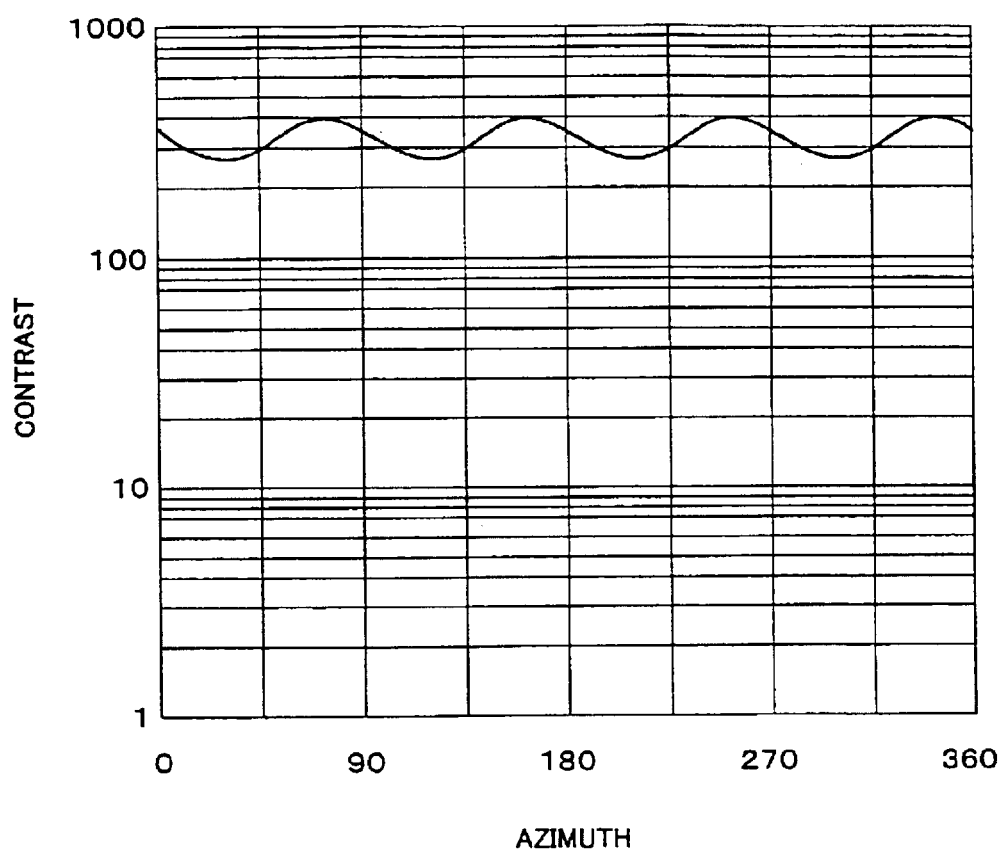
FIG. 19 is a graph, in which the a contrast ratio of the LCD of the another embodiment is shown by another numerical value as an example.

Furthermore, in an example with other numerical values, where −30 nm is given to the polarization plate compensation films 15a and 15b as well as the supporters for their retardations in the perpendicular direction of the liquid crystal compensation plates 14a and 14b are −130 nm, and those of the Rth compensation films 16a and 16b are 90 nm, the contrast ratio, when the polar angle is 60°, is evaluated as shown in FIG. 19, thereby realizing the LCD having broader angle of visibility.

Note that, in the above, explained is the case where the liquid crystal compensation plates 14a and 14b are provided on both the sides of the liquid crystal cell 11. However, similar effect can be attained by disposing, on one side of the liquid crystal cell 11, one liquid crystal compensation plate 14 having a retardation Rth two times greater than that of the liquid crystal compensation films 14a and 14b used in the case where two of the liquid crystal compensation films 14a and 14b are provided on both the sides.

[Third Embodiment]

By the way, in the arrangements shown in FIG. 1 and FIG. 2, the Rth compensation films 16a and 16b are provided for making the retardation Rth1 in the perpendicular direction substantially zero. But, in a present embodiment, explained is a case where a λ/4 plate 13a (13b) having a small retardation in a perpendicular direction is used, without providing the Rth compensation films 16a and 16b.

Figure 20:
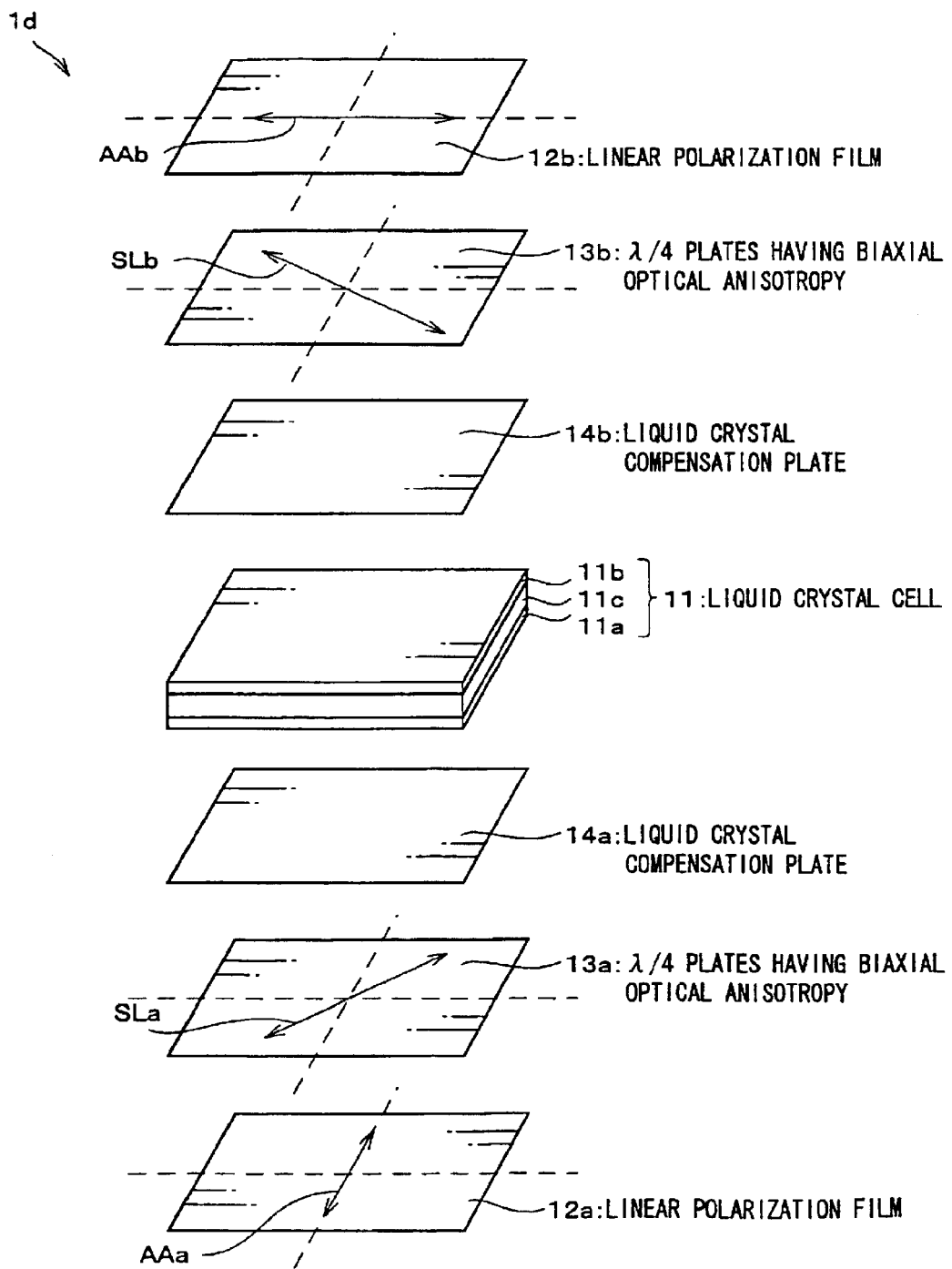
FIG. 20, explaining yet another embodiment of the present invention, is a schematic view showing an arrangement of main sections of an LCD.

As shown in FIG. 20, an LCD 1d of the present embodiment has an arrangement which is identical with that shown in FIG. 1, except the Rth compensation films 16a and 16b are omitted and the λ/4 plate 13a (13b) is replaced with a film whose characteristics can be described by a biaxial refraction ellipsoid that satisfies (nx+ny)/2 =nz.

Here, let d be thickness, where the retardation Rth in the perpendicular direction can be described by an equation Rth=d·{nz−(nx+ny)/2}, the retardation in the perpendicular direction of the film is 0 nm. On the other hand, because a retardation Re in an in-plane direction is defined as Re=d·(nx−ny), the retardation Re in the in-plane direction is set at a quarter wavelength, that is, Re=137.5 nm, by selecting the thickness and material of the film. Further, in the present embodiment, a film having a retardation of −100 nm in a perpendicular directions is used for the liquid crystal compensation layers 14a and 14b, respectively.

Figure 21:
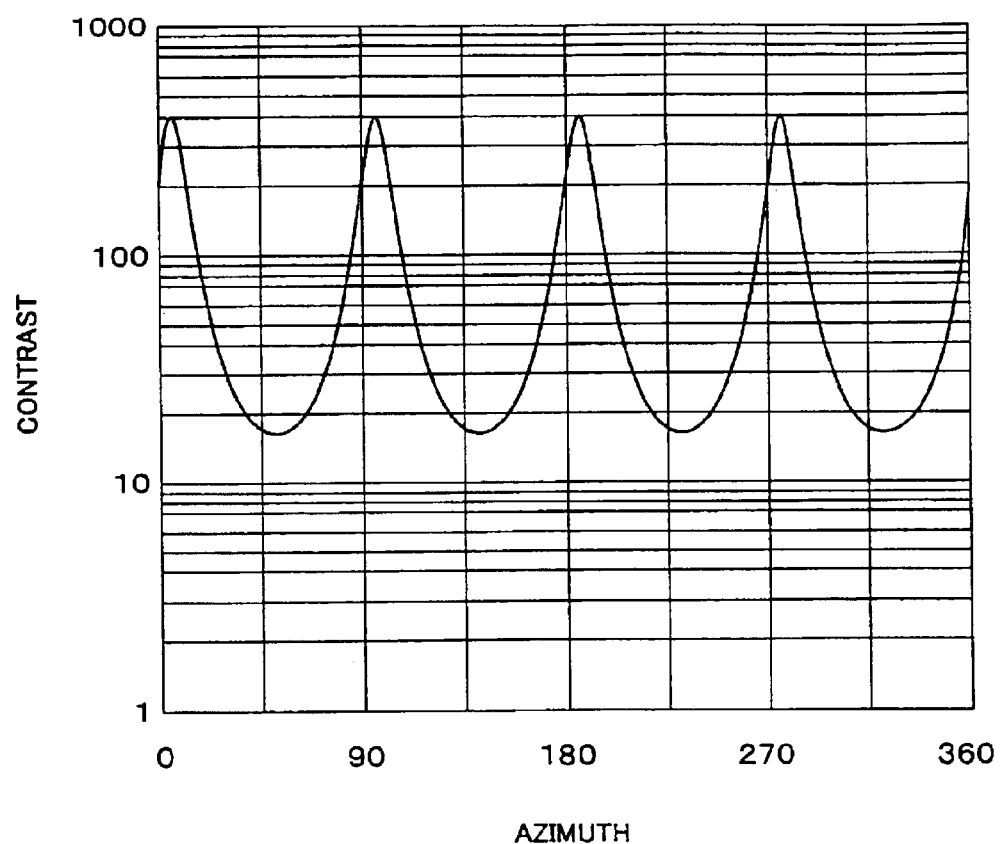
FIG. 21 is a graph showing the contrast ratio of the LCD of the yet another embodiment.

The arrangement also shows similar characteristics as that shown in FIG. 9 by measuring the contrast ratio for all the azimuths where an polar angle is 60°. Moreover, in an example having anther numerical value, a film having a retardation of −130 nm in a perpendicular direction is used for the liquid crystal compensation layers 14a and 14b, obtained is a contrast ratio shown in FIG. 21. It was confirmed that, in either cases, contrast ratios could attain high values, more than 10, for all the azimuths. In addition, in either case, four peaks of the contrast ratio have substantially equal values, thus realizing the LCD having a good balance between the vertical direction and the horizontal direction.

In this way, with the present embodiment, the retardation in the perpendicular direction can be provided in a position closer to a liquid crystal cell 11 by suppressing the retardation in the perpendicular direction of the λ/4 plate 13a (13b), thereby realizing the LCD having broader angle of visibility.

Note that, in the above, explained is the case where the liquid crystal compensation plates 14a and 14b are provided on both the sides of the liquid crystal cell 11. However, similar effect can be attained by disposing, on one side of the liquid crystal cell 11, one liquid crystal compensation plate 14 having a retardation Rth two times greater than that of the liquid crystal compensation films 14a and 14b used in the case where two of the liquid crystal compensation films 14a and 14b are provided on both the sides.

Figure 22:
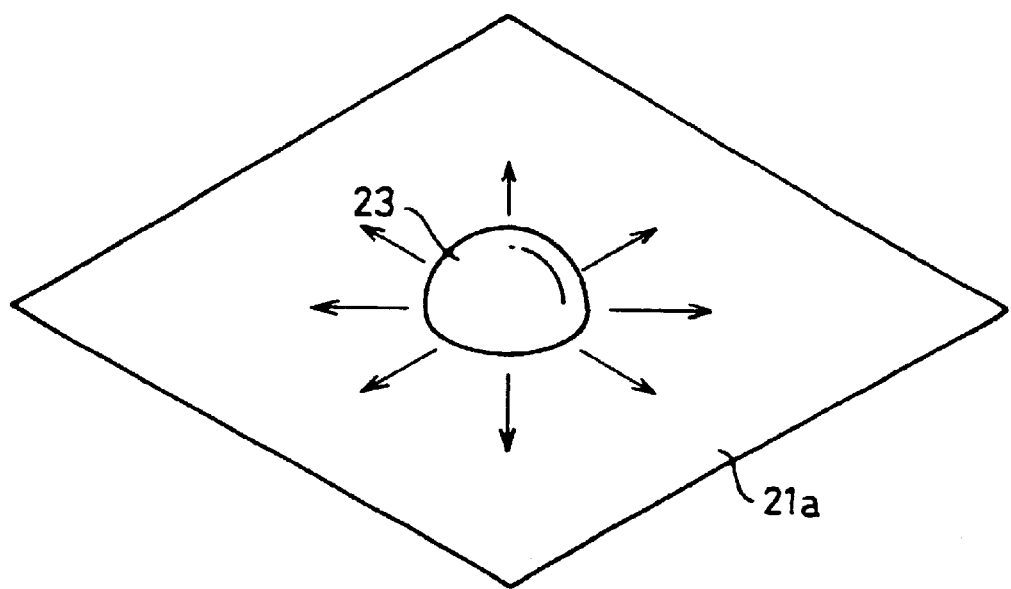
FIG. 22, explaining another constitutional example of the respective LCDs, is a perspective view showing a pixel electrode.

Here, in the first to third embodiments, explained is the case where use of the slit 22 gives the liquid crystal molecules the axial-symmetrical alignment, but they are not limited to this. For example, as shown in FIG. 22, instead of the slit 22, a substantially hemispherical protrudent section 23 can be provided. In this case, in a vicinity of the substantially hemispherical protrudent section 23, the liquid crystal molecules are aligned vertically with respect to a surface of the substantially hemispherical protrudent section 23. Additionally, when a voltage is applied, an electric field around the substantially hemispherical protrudent section 23 is tilted to be parallel to the surface of the substantially hemispherical protrudent section 23. As a result, when the liquid crystal molecules are inclined at application of the voltage, the liquid crystal molecules can be easily tilted and aligned radiately centered to the substantially hemispherical protrudent section 23 in in-plane directions. Therefore, each liquid crystal molecule can have a radiate and inclined alignment. Note that, the substantially hemispherical protrudent section 23 can be formed by applying a photosensitive resin on the pixel electrode 21a, subsequently by employing a photolithography process.

Figure 23:
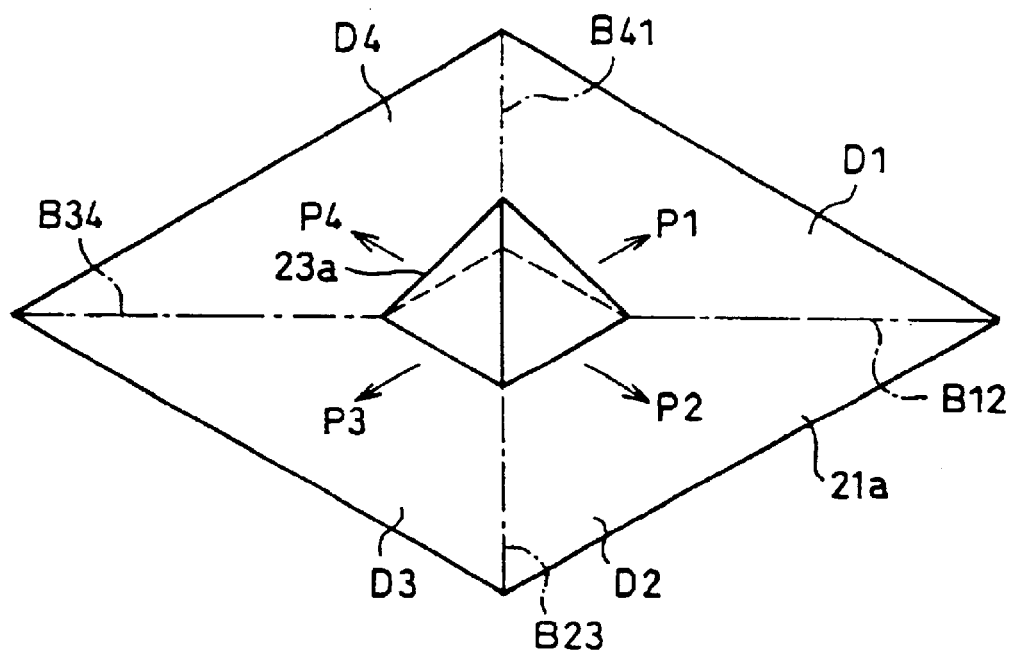
FIG. 23, explaining still another constitutional example of the respective LCDs, is a perspective view showing a pixel electrode.

Again, as to the alignment direction of the liquid crystal molecules, it is not limited to the axial-symmetrical alignment as the above arrangements. The pixel may be divided into a plurality of regions (domains), and each domain may have a different alignment of the liquid crystal molecules. For example, in an arrangement shown in FIG. 23, the substantially hemispherical protrudent section 23 is replaced with a quadrangular pyramid-shaped protrudent section 23a. In the arrangement, the liquid crystal molecules are aligned to be vertical to the respective slope surfaces (thus, surfaces except the bottom surfaces) of the pyramid in the vicinity of the quadrangular pyramid-shaped protrudent section 23a. In addition, application of the voltage give the parallel alignment to an electric field around the quadrangular pyramid-shaped protrudent section 23a. This results in that an in-plane component of the alignment angle of the liquid crystal molecules become equal to an in-plane component of a normal direction (either of directions P1, P2, P3 and P4) of the closest sloped surface, when the voltage is applied. Accordingly, the pixel region is divided into four domains D1 through D4, which have different alignment directions when the liquid crystal molecules are tilted. As a result, when the LCD is viewed in a direction of a certain domain, if transmittance in the domain is lowered, the other domain can maintain their transmittance, thereby making the brightness of the LCD less susceptible to the effect of the in-plane direction of the viewing angle.

Figure 24:
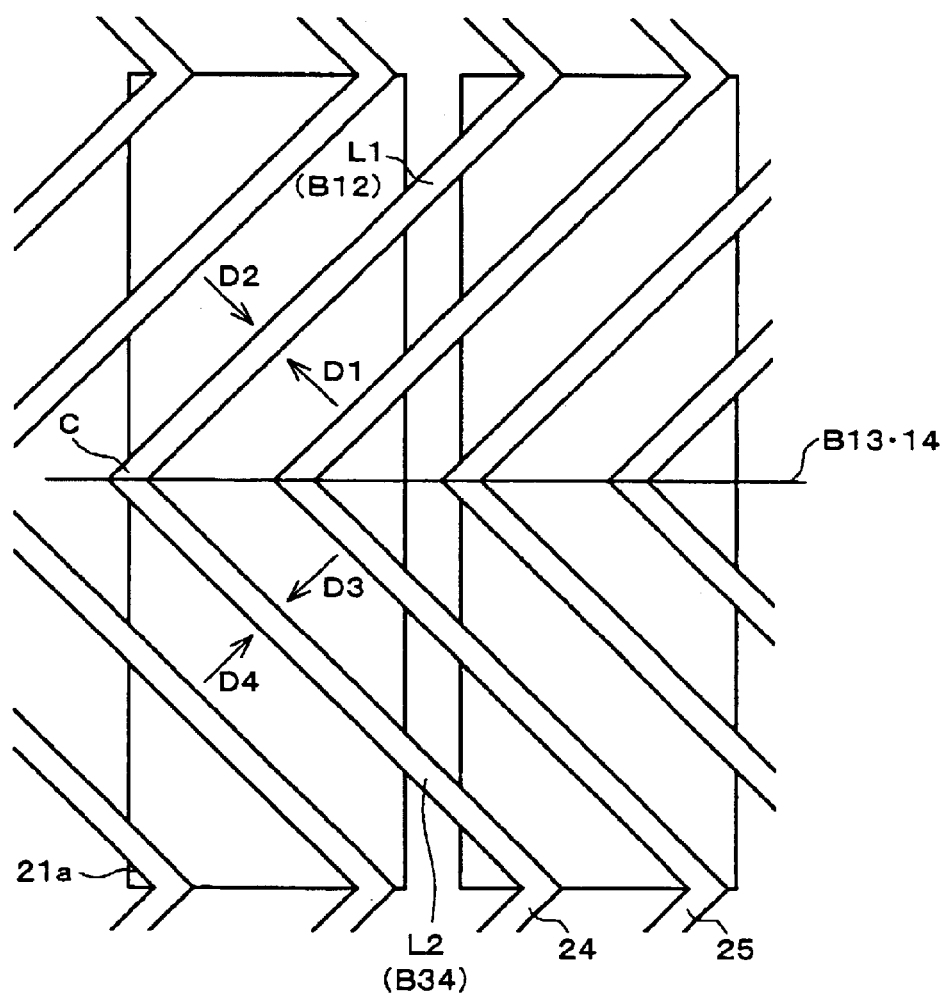
FIG. 24, explaining yet another constitutional example of the respective LCDs, is a plan view showing a vicinity of a pixel electrode.

Moreover, for example, as shown in FIG. 24, where a sectional view of the substrate across the normal direction shows an angle shape, provided on the pixel electrode 21a are raised sections 24, which are disposed in a stripe manner and has an in-plane zigzag shape that is bent substantially at a right angle. Meanwhile, the opposite electrode 21b is given raised sections 25, which have a similar shape as the sections 24. Those raised sections 24 and 25 have a gap in the in-plane direction in a manner that normal lines of the slopes of the raised sections 24 and those of the raised section 25 are identical. Moreover, the respective raised sections 24 and 25 can be formed in the same fashion as the protrudent section 23, thus can be prepared by applying the photosensitive resin on the pixel electrode 21a and the opposite electrode 21b, by subsequently employing the photolithography process.

In the above arrangement, the raised sections 24 have corner parts C and line parts L1 (L2), which occupies the raised section 24 leaving out the corner parts C. Domains D1 and D2 (D3 and D4), which locate in a vicinity of the line parts L1 (L2), have liquid crystal molecules aligned along the slopes on both the sides of the angle shape. In addition, both of the line sections L1 and L2 are crossed each other at a right angle. As a result, the pixels can be allotted to a plurality of the domains D1 and D2 (D3 and D4) that have different alignment directions to each other.

Figure 25:
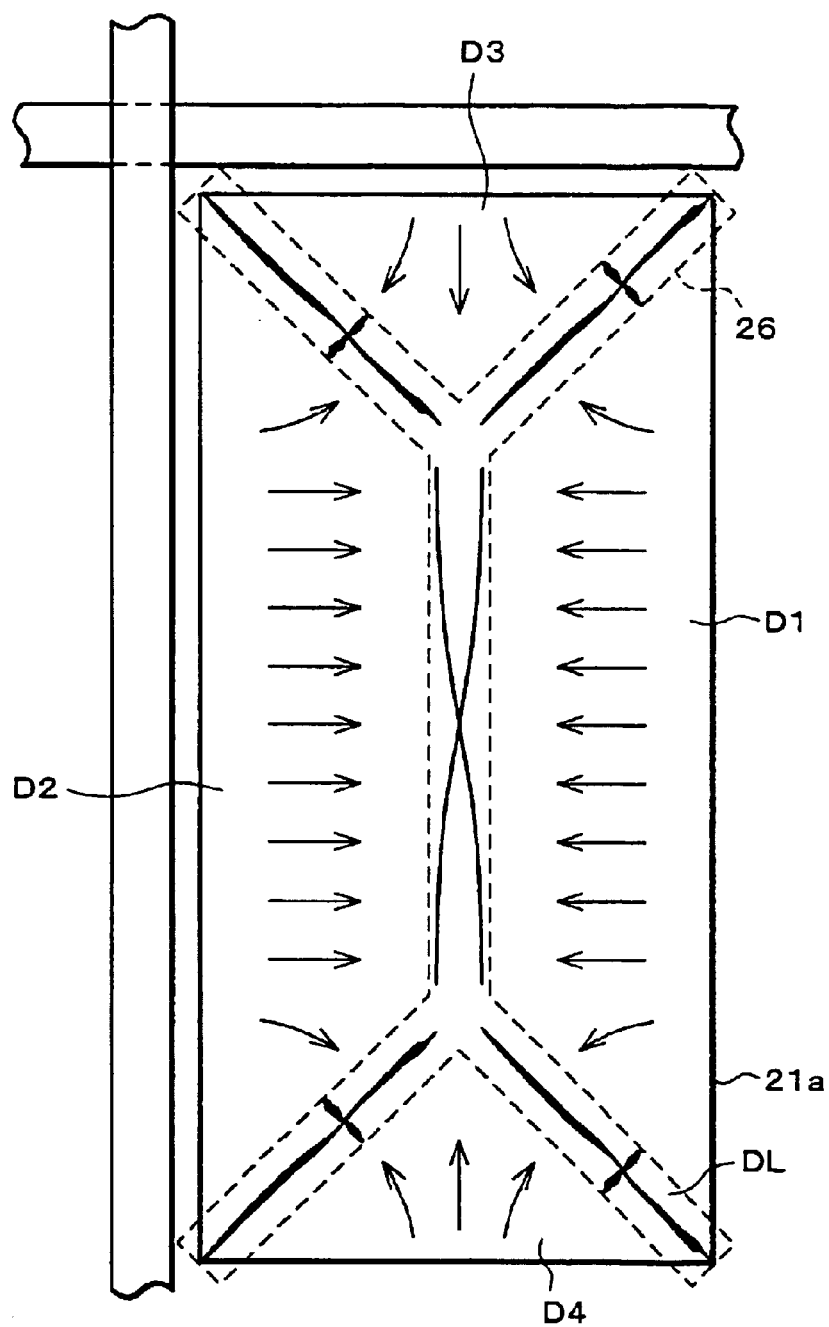
FIG. 25, explaining yet still another constitutional example of the respective LCDs, is a plan view showing a vicinity of a pixel electrode.

Moreover, for example as shown in FIG. 25, a multi-domain alignment can be realized also by providing an alignment control window 26 that is structured by connecting Y-shaped slits in a direction that is in plane and parallel to an edge of the pixel electrode 21a having a substantially quadrangular shape in a symmetrical manner on the opposite electrode 21b of the opposite substrate 11b.

The above arrangement also have the liquid crystal molecules aligned vertically, because, as the case that the slit 22 is provided, a region just below the alignment control window 26 within the surface of the opposite substrate 11b is not covered by an electric field that is strong enough to incline the liquid crystal molecules. On the other hand, in a vicinity of the alignment control window 26 on the surface of the surface of the opposite substrate 11b, an electric field is generated, which is spread as it is closer to the opposite substrate 11b, avoiding the alignment control window 26. As a result, the liquid crystal molecules are inclined in a manner that its major axis is vertical to the electric field, so that the in-plane component of the alignment direction of the liquid crystal molecules is substantially vertical to the each edges of the alignment control window 26, as indicated by arrows in FIG. 25.

In either of the cases, the multi-domain alignment divided into 4 parts have a limit in the in-plane component of the alignment direction. Therefore, even when the linearly polarized light is introduced, the liquid crystal molecules, which cannot give the phase difference to the transmitted light, can be reduced by arranging the directions P1 through P4 at 45° to the direction of the linearly polarized light, on the contrary to the case of the radiate and inclined alignment.

However, even with the above arrangement, the boundary region between the domains (such as B12) has a possibility that the liquid crystal molecules, which cannot give the phase difference to the transmitted light, may be increased by the disturbance of the alignment condition of the liquid crystal molecules, which matches the direction of the linearly polarized light and the in-plane component of the alignment direction, in a peripheral edge region of the pixel electrode 21a where the disturbance in the alignment of the liquid crystal molecules often occurs.

Specifically, in the boundary region, the liquid crystal molecules are so aligned that the liquid crystal molecules in the boundary region are supported by the liquid crystal molecules in the domains on both the sides. Thus, the liquid crystal molecules are not fixedly aligned, and are in an unstable condition. As a result, even a small influence can unbalance between the domain on both the sides in terms of power to control the alignment of the liquid crystal molecules in the boundary region, changing the alignment condition (that is, causing inclination) in the boundary region. Here, the balance may be altered not only by a slight unevenness in the power to control the alignment during the manufacturing process, but also by a lateral electric field by a voltage applied to a gate signal line or a source signal line, or by deterioration with age. Therefore, the change of the alignment condition is differed not only among the respective parts in the boundary region, but also among the respective pixels. As a result, there is a possibility that the introduction of the linearly polarized light may visualize roughness in the display. For example, when the linearly polarized light is introduced into the liquid crystal cell shown in FIG. 25, generated in the alignment control window 26 is a discrimination line DL, which is along the direction (the crossed Nicols) of the absorption axis of the linear polarization film 12a (12b). Because each region and each pixel have the discrimination line DL in different conditions, the roughness in the display may be visualized.

Furthermore, in the edge region, the alignment condition is continuously altered. Thus, the edge region is more susceptible to the influence from an outer electric field, such as the electric fields from the source signal line or the gate signal line, compared to the center area of the pixel electrode 21a. Further, when the alignment is controlled by a wall structure, a three-dimensional distortion is often caused. The edge region, which is susceptible to the influence from the surroundings, often lose the balance in the power to control the alignment, thereby changing the alignment condition (that is, causing the inclination) of the liquid crystal molecules. The change of the alignment condition is differed not only among the respective parts in the boundary region, but also among the respective pixels. As a result, there is a possibility that the introduction of the linearly polarized light into a liquid crystal layer of a multi-domain structure may visualize the disturbance of the alignment condition as the roughness in the display.

On the other hand, in the respective embodiments discussed above, the circularly polarized light is introduced into the liquid crystal cell having the multi-domain alignment via the λ/4 plate 13a. As a result, even with the disturbed alignment condition of the liquid crystal molecules, liquid crystal molecules M can contribute to the display, as long as the alignment direction of the liquid crystal molecules and the viewing angle are not matched with the substrate normal line component as well as the in-plane component, just like the case of the radiate and inclined alignment. This can make less visual the discrimination line DL in the alignment control window 26, even when used is the liquid crystal cell shown in FIG. 25, for example. Thereby, employment of the liquid crystal layer having multi-domain alignment for ensuring the broad angle of visibility can realize an LCD of a high display quality which has no roughness in the display even though there are the boundary region between the domains, as well as the edge region of the pixel electrode 21a.

Furthermore, in the above, the explanation is based on the use of the liquid crystal layer, as an example of the liquid crystal cell, having the negative dielectric constant anisotropy, in which an initial alignment is vertical with respect to the surface of the substrate, while the application of the voltage inclines the liquid crystal molecules in the pixel in a plurality of directions. However, the liquid crystal cell 11 may be structured by combination of the horizontal alignment film with nematic liquid crystal, smectic liquid crystal, or cholesteric liquid crystal, so that the initial alignment is horizontal with respect to the surface of the substrate and in a plurality of the directions.

In either of the cases, as long as used is such an LCD having a liquid crystal layer whose alignment direction is so controlled that each pixel respectively has different in-plane components of the alignment direction of the liquid crystal molecules when a voltage is applied, the alignment condition is often disturbed, thereby making the roughness in the display more visible at the introduction of the linearly polarized light. Therefore, similar effect can be attained as the present embodiments.

Furthermore, even when used is a liquid crystal layer in which the alignment direction of the liquid crystal molecules is so controlled that the liquid crystal molecules in the pixel are aligned in a single direction, the disturbance in the alignment direction may be caused in the edge part of the pixels, for example, by a slant electric field from the bus lines such as the source signal line or the gate signal line. Further, when the alignment is controlled by a wall structure, the three-dimensional distortion is often caused by, for example, a wire provided in the vicinity of the pixel, thereby disturbing the alignment condition and generating the roughness in the display. Hence, as long as used is such an LCD having the liquid crystal layer whose alignment direction is so controlled that each pixel respectively has different in-plane components of the alignment direction of the liquid crystal molecules have when a voltage is applied, an effect of a certain degree can be achieved.

However, a liquid crystal layer, in which the alignment direction is so controlled that each pixel respectively has different in-plane components of the alignment direction of the liquid crystal molecules when a voltage is applied, such as the multi-domain alignment or the radiate and inclined alignment, has a tendency to have a disturbed alignment condition, thus having a tendency to show a deteriorated display quality, compared to the liquid crystal layer in which the alignment direction is controlled in a single direction. Therefore, comparatively, the display quality is significantly improved when the circularly polarized light is introduced into the liquid crystal layer.

Furthermore, a liquid crystal cell of a vertical alignment method has higher display contrast and faster W/B level response speed than a liquid crystal cell of a twisted Nematic (TN) method. Further, application of the radiate and inclined alignment or the multi-domain alignment in the liquid crystal cell of the vertical alignment method can suppress the in-plane direction dependency of the viewing angle. Therefore, in the vertical alignment method, the introduction of the circularly polarized light into the liquid crystal cell having the multi-domain alignment or the radiate and inclined alignment can realize an LCD that is satisfactory all in the contrast, the response speed, the angle of visibility, the in-plane direction dependency of the viewing angle, and the display quality. Especially, the radiate and inclined alignment, compared with the multi-domain alignment, has a higher tendency to allow the roughness to be seen when the linearly polarized light is applied therein, but it has less in-plane direction dependency. Therefore, as the present embodiment, an LCD having less in-plane direction dependency can be realized, without lowering the display quality, by suppressing the roughness by introducing the substantially circularly polarized light.

Figure 26:
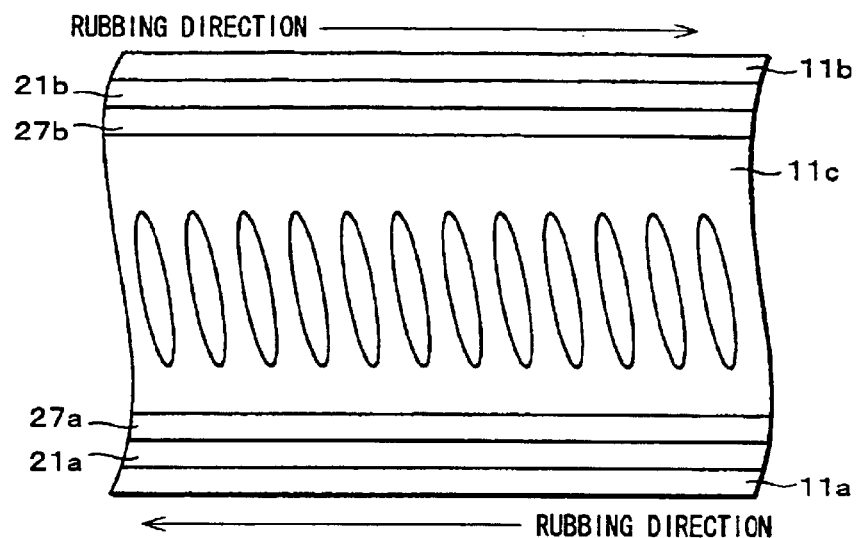
FIG. 26, explaining a further constitutional example of the respective LCDs, is a schematic view showing a liquid crystal cell at a time no voltage is applied.

In the following, discussed is a constitutional example having another alignment condition. In a case of a liquid crystal cell having mono-domain alignment in a vertical alignment mode, as shown in FIG. 26, a pixel electrode 21a and an opposite electrode 22b have no slit 22 and are formed in a flat shape, not like the cases shown in FIG. 2 and FIGS. 22 through 25. Note that, shown in FIG. 26 are vertical alignment films 27a and 27b, which are provided on a TFT substrate 11a and opposite substrate 11b, respectively.

Moreover, in the case of the liquid crystal cell having the mono-domain alignment, a rubbing step is included in the manufacturing process, not like the case the liquid crystal cells having the multi-domain alignment or the radiate and inclined alignment. Thus, it is arranged that rubbing of liquid crystal molecules in a liquid crystal 11c are carried out in parallel but opposite directions on both the substrates 11a and 11b. Furthermore, the liquid crystal cell 11 and the linear polarization films 12a and 12b are disposed so that the above rubbing directions make 45° with the absorption axis AAa (AAb) of the linear polarization film 12a (12b).

Figure 27:
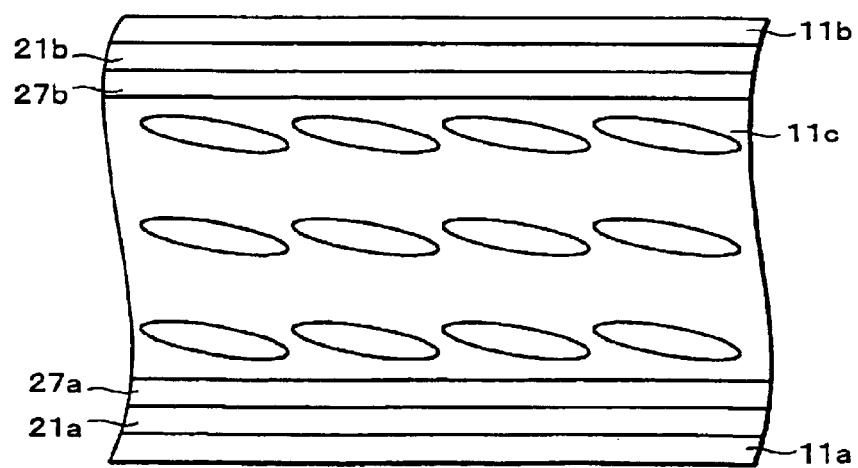
FIG. 27 is a schematic view showing the liquid crystal cell at a time a voltage is applied.
Figure 28:
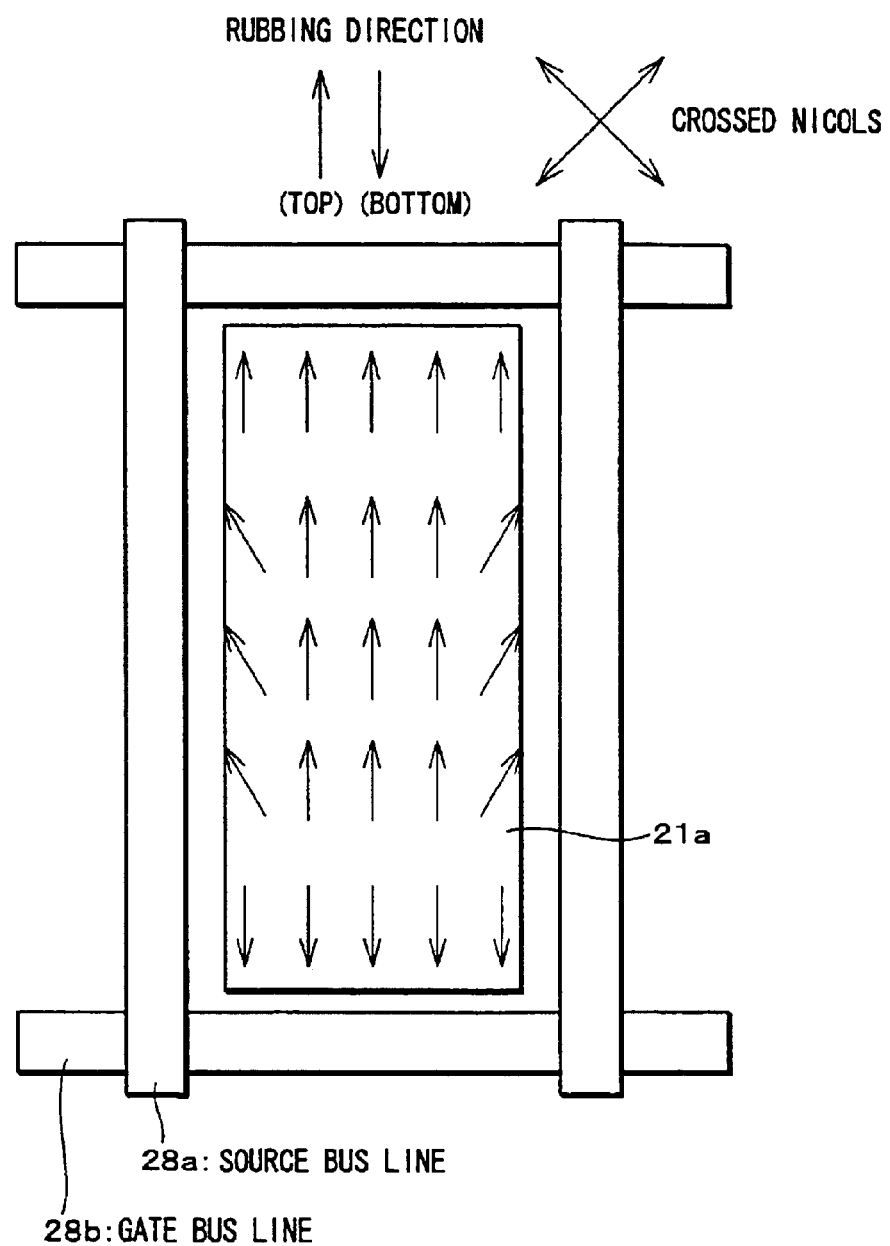
FIG. 28 is a plan view showing a vicinity of a pixel electrode of an LCD of the further constitutional example.

In the above arrangement, the liquid crystal molecules, which are aligned in the substrate normal direction (in the vertical direction) when no voltage is applied as shown in FIG. 26, are inclined as shown in FIG. 27 when a voltage is applied between the pixel electrode 21a and the opposite electrode 21b. Note that, this arrangement has mono-domain alignment. Thus, the respective liquid crystal molecules in the pixel are basically aligned only in a single direction, as shown in FIG. 28. It should be noted that, in FIG. 28, the alignment direction of the liquid crystal molecules are shown by arrows whose head indicates the lower end of the liquid crystal molecules.

Figure 29:
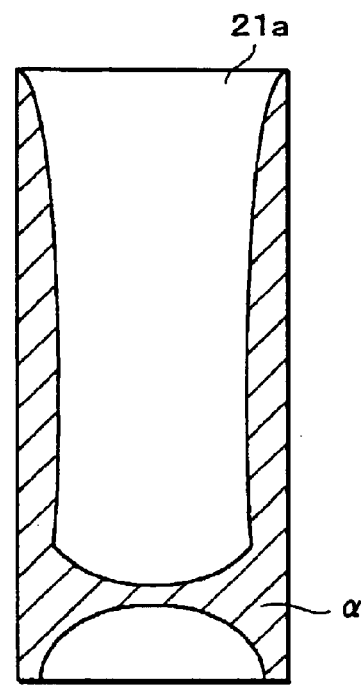
FIG. 29, showing a comparative example of the LCD of the further constitutional example, is an explanatory view illustrating a display example where no λ/4 plate is provided.

However, even with the mono-domain alignment, there is a possibility that, in a periphery of the pixel electrode 21a, an electric field is distorted by influence from a source bus line 28a or a gate bus line 28b, thereby disturbing the alignment direction of the liquid crystal molecules when a voltage is applied, thus forcing the alignment direction shifted from the rubbing direction. Here, as explained above, in the arrangement without the λ/4 plates 13a and 13b, a liquid crystal molecule, whose alignment direction matches with the absorption axis AAa (AAb) in terms of the in-plane direction component, blackens the region where it exists, thereby generating a black region α in the periphery of the pixel electrode 21a, as shown in FIG. 29.

Figure 30:
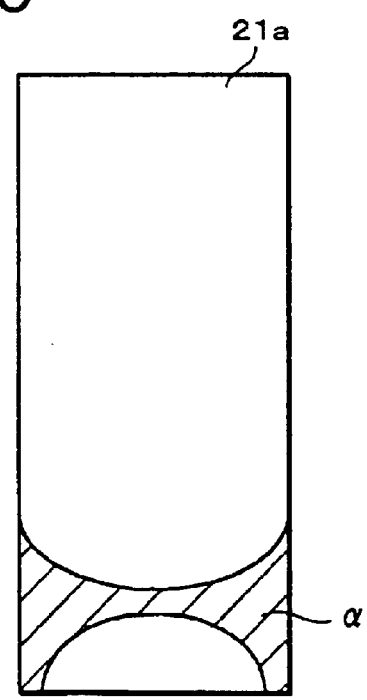
FIG. 30 is an explanatory view showing a display example of the LCD of the further arrangement example.

On the contrary, in the LCD of the present modification example, in which the λ/4 plates 13a and 13b are provided, the blackening occurs only when the alignment direction of the liquid crystal molecules and the absorption axis AAa (AAb) matches each other. Further, blackened is only a region, where a liquid crystal molecule remains vertically with respect to the substrate, in the boundary region between the regions having different alignment direction of the liquid crystal molecules from each other, as shown in FIG. 30. Therefore, an area of the blackened region α can be reduced dramatically.

Moreover, as the respective embodiments, set substantially at zero (or at least less than λ/8) is a retardation Rth1 of a perpendicular direction in a range from a linear polarization film 12a (12b) to a λ/4 plate 13a (13b) which is inclusive. Thereby, realized is an LCD, which can maintain a broad angle of visibility without losing the balance between viewing angle characteristics from the above position (or the bottom position) and those from the right position (or the left position), further which is able to prevent reduction of the contrast ratio in the front direction.

Figure 31:
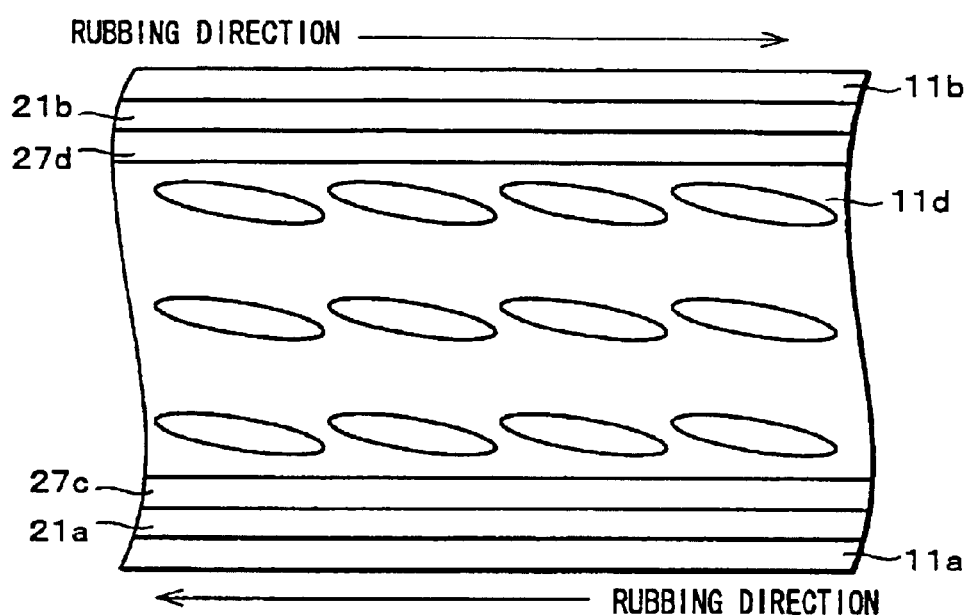
FIG. 31, explaining a still further constitutional example of the respective LCDs, is a schematic diagram showing a liquid crystal cell at a time no voltage is applied.

Moreover, as shown in FIG. 31, a liquid crystal cell 11 of an LCD, which has the mono-domain alignment and operates in a horizontal mode, uses a liquid crystal layer 11d made of liquid crystals having positive dielectric constant anisotropy, instead of the liquid crystal layer 11c. Further, a TFT substrate 11a and an opposite substrate 11b are provided with a horizontal alignment films 27c and 27d, instead of the vertical alignment films 27a and 27b, while a pixel electrode 21a and an opposite electrode 21b are formed in a flat shape and rubbing are performed on both the substrates 11a and 11b in parallel and in opposite directions, as shown in FIG. 25.

Figure 32:
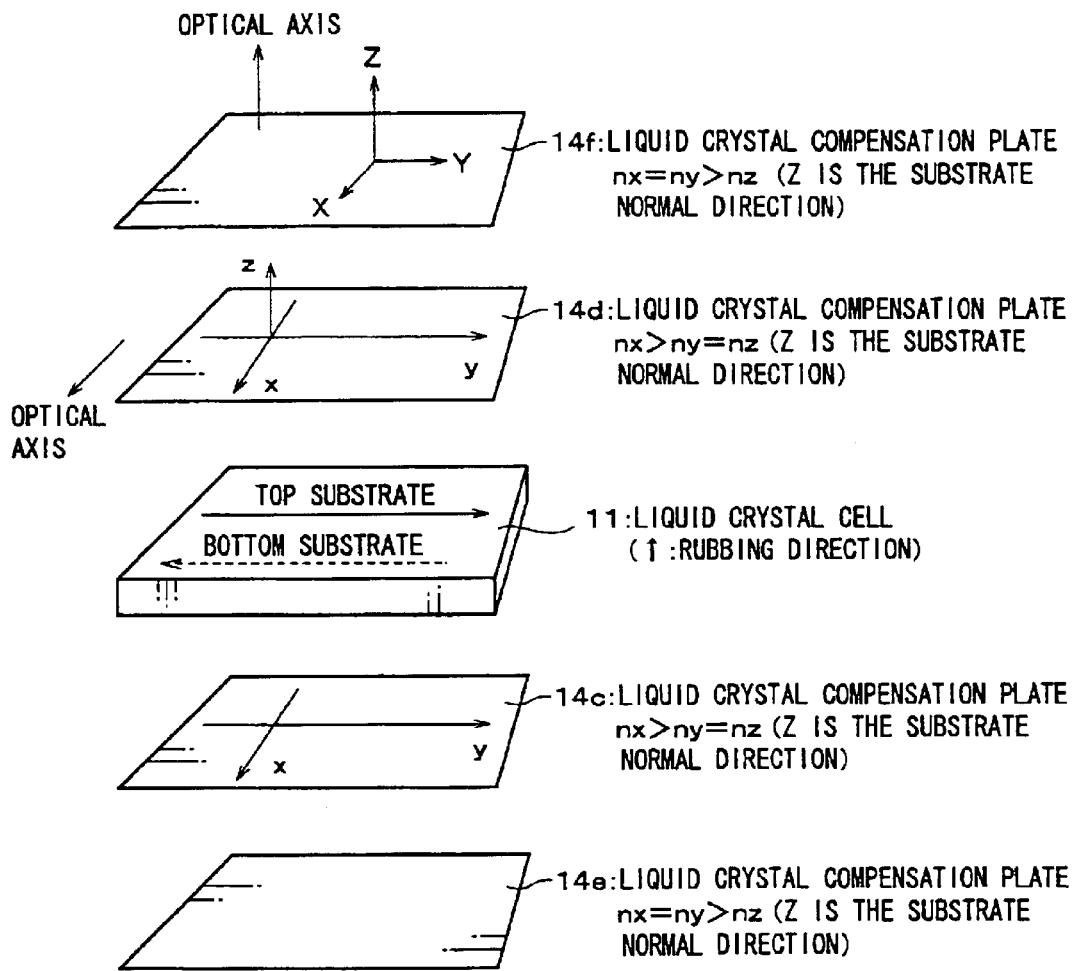
FIG. 32, illustrating the still further constitutional example, is a schematic diagram showing an arrangement of main sections of the LCD.

Moreover, in the LCD of a present modification example, as shown in FIG. 32, liquid crystal compensation plates 14c through 14f are provided instead of the liquid crystal compensation plates 14a and 14b or 14. The liquid crystal compensation plates 14c and 14d are formed so as to have a positive uniaxial optical anisotropy (nx>ny=nz), and are positioned to sandwich the liquid crystal cell 11 in-between. Meanwhile, the liquid crystal plates 14e and 14f are formed so as to possess negative uniaxial optical anisotropy (nx=ny>nz), and are disposed to further sandwich both the liquid crystal compensation plates in-between. Moreover, y axes of the respective liquid crystal compensation plates 14c through 14f are disposed so as to accord with rubbing directions.

In the present modification example, used is the liquid crystal cell 11, in which refraction index anisotropy Δn of a liquid crystal layer 11d is 0.09, cell thickness d=3.0 μm, and d·Δn=270 nm, as an example. Moreover, an in-plane retardation of the liquid crystal compensation plate 14c (14d) is so set that a sum of the retardations of the liquid crystal compensation plates 14c and 14d is d·(nx−ny)=15 nm, so that the remaining retardation value (15 nm) of the liquid crystal layer 11d can be cancelled out thereby when the black display is carried out, that is 5V is applied. Furthermore, a retardation in a perpendicular direction of the liquid crystal compensation plate 14e (14f) is so set that a sum of the retardations of the liquid crystal compensation plates 14e and 14f is d(nx −nx)=100 nm, because a good angle of visibility can be attained by compensating a retardation equivalent to about 70% of d·Δn of the liquid crystal cell 11. It should be noted that, the numerical value is determined, considering a case where a retardation (for example, of 40 nm, respectively) of the supports of the linear polarization films 12a and 12b are not compensated, just like in the third embodiment, also considering that 270×0.7−40×2 is approximately 100 nm.

Figure 33:
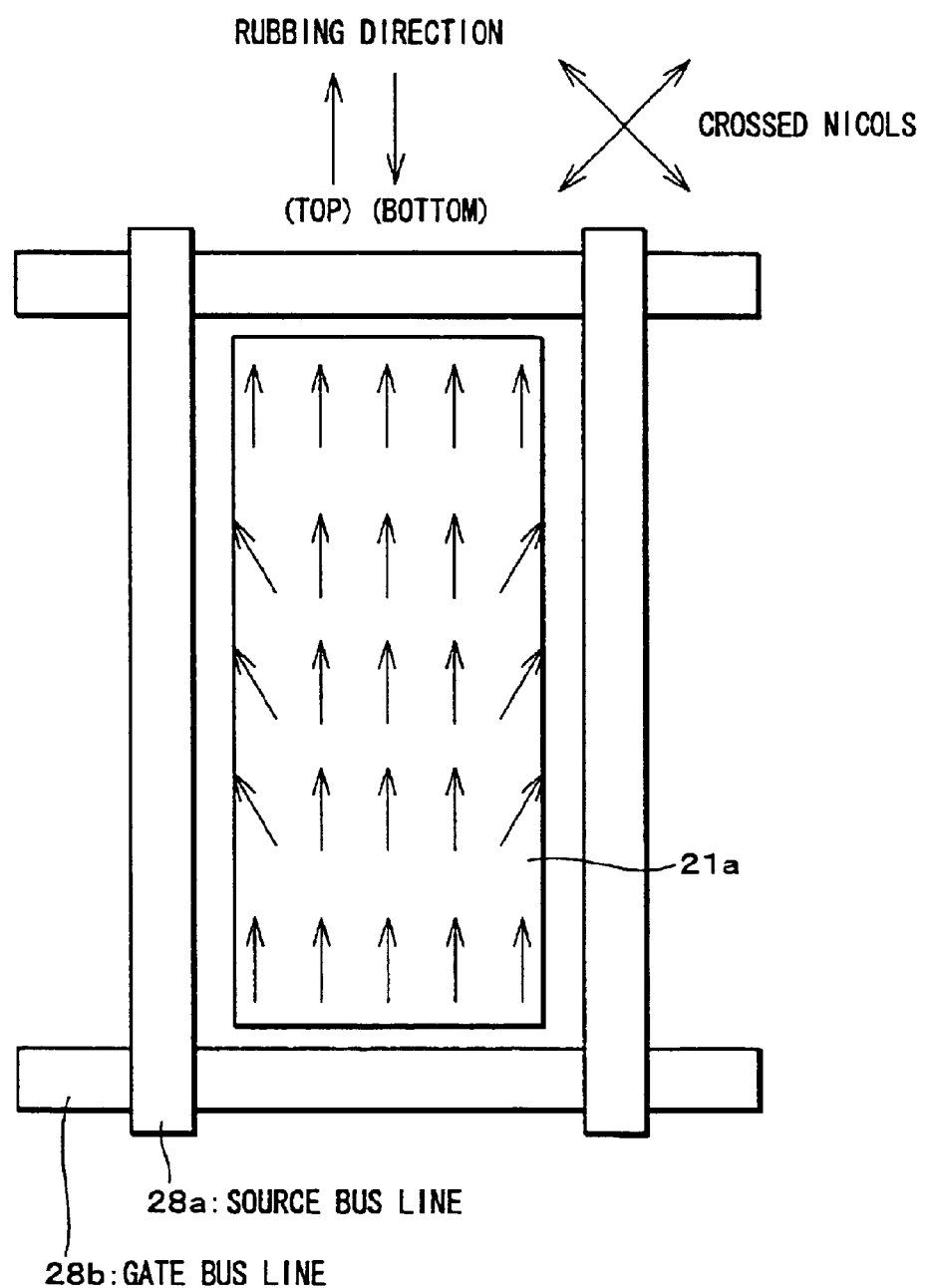
FIG. 33 is a plan view showing a vicinity of a pixel electrode of the LCD of the still further constitutional example.
Figure 34:
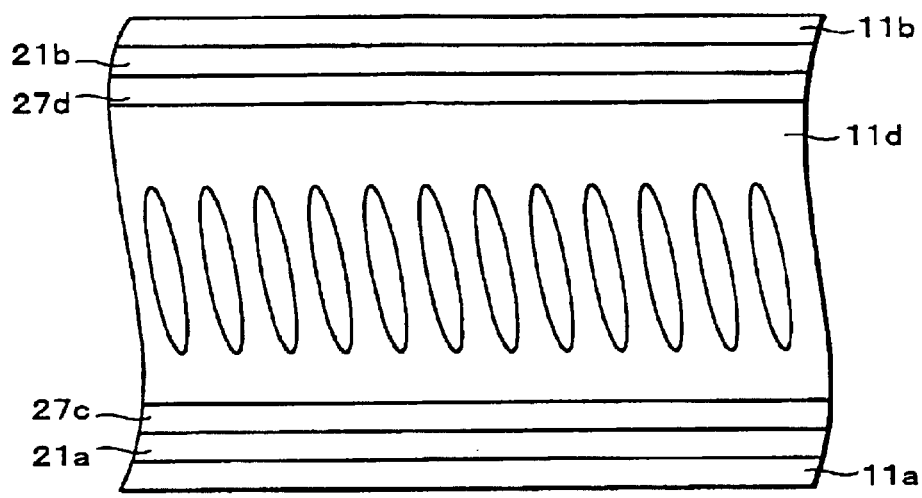
FIG. 34 is a schematic diagram illustrating the liquid crystal cell at a time that a voltage is applied.

In the above arrangement, liquid crystal molecules of the liquid crystal layer 11d are aligned along the rubbing direction and along the surfaces of the substrates 11a and 11b, as shown in FIG. 31, when no voltage is applied between both of the pixel electrode 21a and the opposite electrode 21b. However, as the case shown in FIG. 28, in a periphery of the pixel electrode 21a, an electric field is distorted by influence from the source bus line 28a or the gate bus line 28b, thereby forcing the alignment direction shifted from the rubbing direction, as shown in FIG. 33. On the contrary to the case of the vertical alignment, the alignment is along the rubbing direction so that alignment will not be opposite to the rubbing direction even in a vicinity of the gate bus line 28b. On the other hand, the liquid crystal molecules of the liquid crystal layer 11d is tilted in the substrate normal direction, as shown in FIG. 34, at the application of the voltage between the pixel electrode 21a and the opposite electrode 21b. In this way, the inclined direction of the liquid crystal molecules are altered in accordance with the voltage, thereby controlling the brightness of the pixels, just as the case of the vertical alignment.

Figure 35:
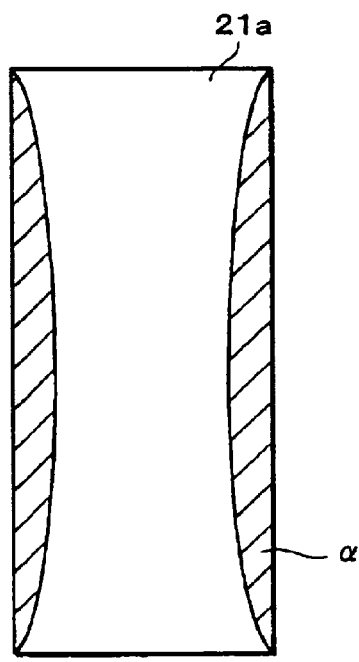
FIG. 35, explaining a comparative example of the LCD, is an explanatory view showing a display example where no λ/4 plate is provided.
Figure 36:
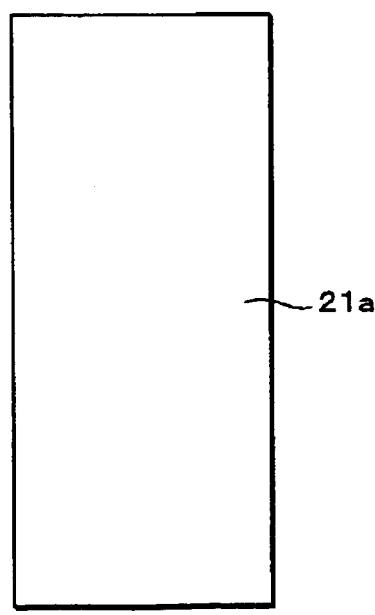
FIG. 36 is an explanatory view showing a display example of the LCD of a yet further constitutional example.

In this case, as the case shown in FIG. 29, no provision of the λ/4 plates 13a and 13b leads to the blackening of the region, where exists the liquid crystal molecule whose alignment direction matches with the absorption axis AAa (AAb) of the linear polarization film 12a (12b) in the in-plane direction, which is the region where the alignment of the liquid crystal molecules tends to be disturbed, such as the periphery of the pixel electrode 21a, as shown in FIG. 35. On the other hand, when the λ/4 plates 13a and 13b, the horizontal alignment mode has no blackened region, as shown in FIG. 36, because no liquid crystal molecules are vertically aligned when no voltage is applied, but the angle of visibility may be limited since the retardation (in the perpendicular direction) for the liquid crystal compensation cannot be close enough to the liquid crystal cell 11 due to the retardation Rth1 in the perpendicular direction.

On the contrary, the LCD of the present modification example, as the respective embodiment, has the retardation Rth1 that is set substantially at zero (or at least less than λ/8), thus is realized as the LCD, which can maintain the broad angle of visibility without losing the balance between the viewing angle characteristics from the above position (or the bottom position) and those from the right position (or the left position), further which is able to prevent the contrast ratio in the front direction from being lowered, even though the λ/4 plates 13a and 13b are provided therein.

It should be noted that, in the above, explained is the case where the liquid crystal cell 11 in the horizontal alignment mode is optically compensated by the liquid crystal compensation plates 14c through 14f. But, other phase difference layers can be used, as long as the phase difference layers can perform the optical compensation. For example, in an arrangement shown in FIG. 37, the liquid crystal compensation plates 14c through 14f are replaced by liquid crystal compensation plates 14g and 14h, which are made of a phase difference film of an inclined type, provided on both the sides of the liquid crystal cell 11.

The liquid crystal cell compensation plates 14g and 14h are so formed that an a axis is parallel to an x axis, while a b axis makes a predetermined angle of θ degree with a y axis, where the original refraction index ellipsoid is defined by an equation na=nb>nc, the x axis is a direction (within the surface of the substrate) crossing a rubbing direction at a right angle, the y axis is the rubbing direction (within the surface of the substrate), and a z axis is the substrate direction. In this case, the angle between a c axis and the z axis is also θ degree. In this example, the respective liquid crystal compensation plates 14g and 14h are prepared from a phase difference film of the inclined type, in which na=nb=1.5, nc=1.497, θ=35° and its film thickness d=50 μm. Again in this case, the liquid crystal cell 11 is optically compensated by the liquid crystal compensation plates 14g and 14h, thus providing a similar effect that is given by the arrangement shown in FIG. 32.

Figure 38:
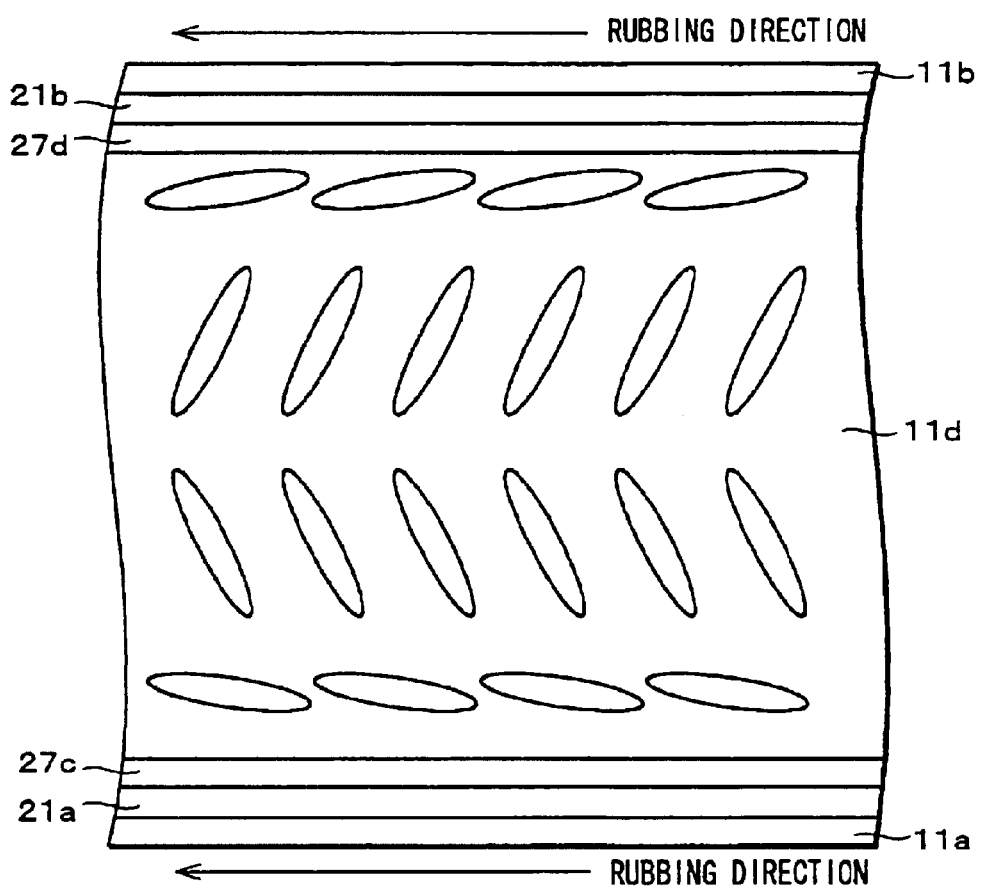
FIG. 38, illustrating a yet further constitutional example of the respective LCDs, is a schematic diagram showing the liquid crystal cell at a time that no voltage is applied.

Furthermore, explained in FIG. 38 is a case where used is a liquid crystal cell having the mono-domain alignment in Optically Compensated Bend (OCB) mode, as a yet further constitutional example. As shown in FIG. 38, the liquid crystal cell 11 of the present yet further example, as the one shown in FIG. 31, is provided with a liquid crystal layer lid having positive dielectric constant anisotropy, and horizontal alignment films 27c and 27d. Note that, the liquid crystal cell 11 is so formed that the rubbing directions are parallel to both the substrate 11a and 11b, on the contrary to the case shown in FIG. 31.

Further, an LCD having the above liquid crystal cell 11, as shown in FIG. 39, is provided with liquid crystal compensation plates 14i and 14j on both the sides of the liquid crystal cell 11, instead of the liquid crystal compensation plates 14c through 14f. The respective liquid crystal compensation plates 14i and 14j are made of a phase difference layer having biaxial optical anisotropy, where respective main refraction indexes satisfies nx>ny>nz. It is arranged in this example that d·((nx+ny)/2−nz)=230 nm for the purpose of the compensation of the retardation in the perpendicular direction of the liquid crystal cell 11, while it is also arranged that d·(nx−ny)=40 nm for cancelling out the remained retardation at the black display. Note that, those numerical values are determined by an optical simulation as a best value for the optical compensation for the liquid crystal cell 11. In addition, the liquid crystal cell 11 and the liquid crystal compensation plates 14i and 14j are provided in a manner that y axes of the liquid crystal compensation plates 14i and 14j are in accordance with a rubbing direction.

Figure 40:
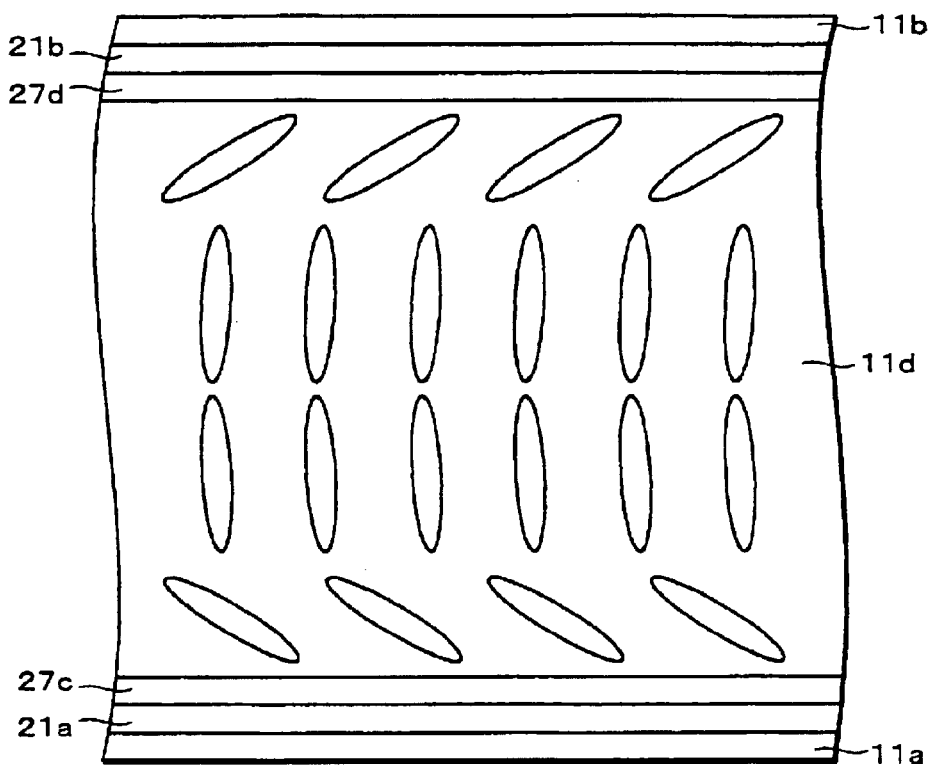
FIG. 40 is a schematic diagram illustrating the liquid crystal cell at a time that a voltage is applied.
Figure 42:
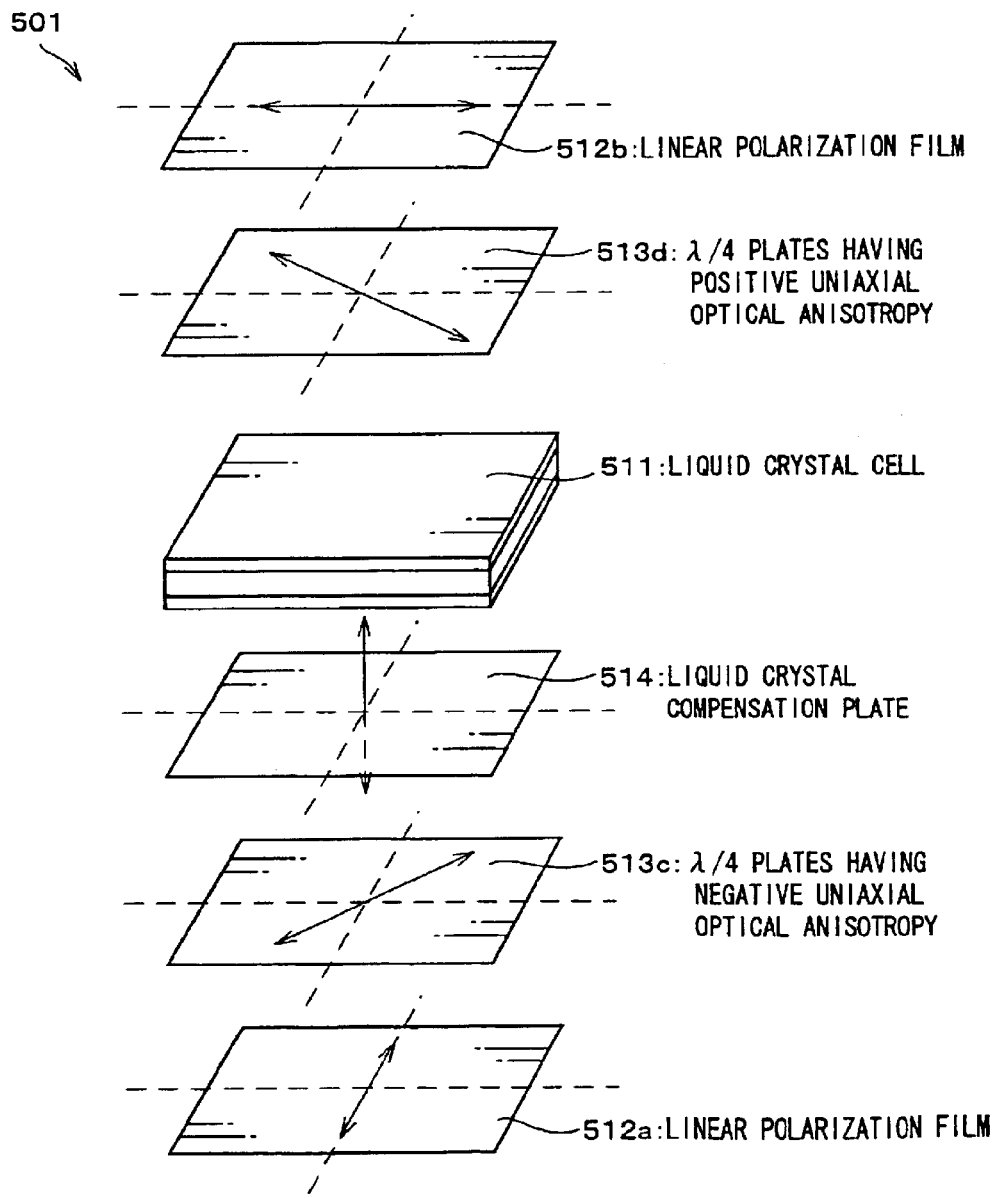
FIG. 42, illustrating a conventional technology, is a schematic diagram showing an arrangement of main sections of an LCD.

In the above arrangement, when no voltage is applied, the liquid crystal molecules of the liquid crystal layer lid are aligned so that the retardation to be given to the transmitted light is cancelled out between the side of the TFT substrate 11a and the side of the opposite electrode 21b within the liquid crystal cell 11, which are halves of the liquid crystal cell 11 evenly divided in the in-plane direction. As a result, the white display is attained, similar to the case of the horizontal alignment mode. It should be noted that, in this case again, the alignment of the liquid crystal molecules is disturbed in the periphery of the pixel electrode 21a, just like the case of the horizontal alignment mode. On the other hand, application of a voltage into the liquid crystal cell 11 gives a vertical alignment to the liquid crystal molecules in the liquid crystal layer 11d, as shown in FIG. 40, except in the vicinity of both the substrates 11a and lib, resulting in the black display just as the case of the horizontal alignment mode.

Again in this case, just like the case of the horizontal alignment mode, the λ/4 plates 13a and 13b prevent the generation of the blackened region due to the disturbed alignment. Further, just like the respective embodiments, set substantially at zero (or at least less than λ/8) is the retardation Rth1. Therefore, it is possible to realize the LCD that can maintain the broad angle of visibility without losing the balance between the viewing angle characteristics from the above position (or the bottom position) and those from the right position (or the left position), further which is able to prevent the reduction of the contrast ratio in the front direction.

Moreover, for the case of the OCB mode, just like the case of the horizontal alignment mode, the optical compensation of the liquid crystal cell 11 can be performed by providing liquid crystal compensation plates 14k and 14m made of the phase difference film of the inclined type, in lieu of the liquid crystal compensation plates 14i and 14j, as shown in FIG. 41. In this example, the respective liquid crystal compensation plates 14k and 14m are formed, based on the optical simulation, with a phase difference film of the inclined type, in which na=nb=1.5, nc=1.497, θ=350 and film thickness d=110 μm, for example. Again in this case, the liquid crystal cell 11 is optically compensated by the liquid crystal compensation plates 14k and 14m, thereby achieving an effect similar to the one obtained by the arrangement shown in FIG. 39.

It should be noted that, in the above, the retardations of the λ/4 plates 13a and 13b are set at ¼ of the wave length of the transmitted light, so that the incident light is circularly polarized. But, it is not limited to this arrangement. Even if the polarization is not perfectly circular, elliptically polarized light, which is substantially circularly polarized light, can be introduced with an arrangement that the retardation in the in-plane direction is set substantially at ¼ of the wavelength of the transmitted light, on condition that a shift of the substantially circularly polarized light is not big enough to lower the brightness significantly and to generate the roughness in the display. For example, when within 10% is a change ratio of the brightness at a wavelength (550 nm) which has highest visibility, in other words, transmittance is 0.9 or more, viewers hardly notice the reduction of the brightness and the roughness in the display. A range of the retardation, which can satisfy the above conditions, was determined by a simulation to measure the transmittance. The retardations of the λ/4 plates 13a and 13b were, with respect to light in a vicinity of 550 nm, most preferably at 135 nm and can offer the similar effect while the retardation falls in a range between 95 nm or higher and 175 nm or less, even though the polarization is not perfectly circular.

As discussed so far, a liquid crystal display apparatus (1, 1b, 1c) of the present invention is provided with a liquid crystal cell (11), polarizers (12a, 12b) provided on both sides of the liquid crystal cell, quarter wavelength layers (13a, 13b), provided between the respective polarizers and the liquid crystal cell, each of the quarter wavelength layers having a retardation in an in-plane direction that is substantially set at a quarter wavelength of a wavelength of transmitted light, a phase difference layer (14, 14a to 14m), which is provided between at least one of the quarter wavelength layers and the liquid crystal cell, which has a retardation in a perpendicular direction, and optically compensates the liquid crystal cell, and a compensation layer (16a, 16b) provided at least between the polarizer and the quarter wavelength layer on the side of the phase difference layer, wherein the compensation layer has a retardation in a perpendicular direction whose sign is reverse to a sum of the retardations in the perpendicular direction from the polarizer to the quarter wavelength layer, but excluding the compensation layer.

Meanwhile, a liquid crystal display apparatus (1, 1b, 1c) of the present invention is provided with a liquid crystal cell

(11) in a vertical alignment mode, polarizers (12a, 12b) provided on both sides of the liquid crystal cell, quarter wavelength layers (13a, 13b) provided between the respective polarizers and the liquid crystal cell, each of the quarter wavelength layers having a retardation in an in-plane direction that is substantially set at a quarter wavelength of a wavelength of transmitted light, a phase difference layer (14, 14a, 14b), provided between at least one of the quarter wavelength layers and the liquid crystal cell, which has main refraction index in a normal direction nz1 that is smaller than main refraction indexes in in-plane directions nx1 and ny1, and a compensation layer (16a, 16b), provided at least between the polarizer and quarter wavelength layer on the side of the phase difference layer, having main refraction index in a normal direction nz2 that is greater than main refraction indexes in in-plane directions nx2 and ny2.

Furthermore, a liquid crystal display apparatus (1, 1b, 1c) of the present invention operating in a horizontal alignment mode is provided with a liquid crystal cell (11) including liquid crystals of positive dielectric constant anisotropy, polarizers (12a, 12b) provided on both sides of the liquid crystal cell, quarter wavelength layers (13a, 13b) provided between the respective polarizers and the liquid crystal cell, each of the quarter wavelength layers having a retardation in an in-plane direction substantially set at a quarter wavelength of a wavelength of transmitted light, a positive uniaxial phase difference layer (14c, 14d) provided between at least one of the quarter wavelength layers and the liquid crystal cell, a negative uniaxial phase difference layer (14e, 14f) provided between at least one of the quarter wavelength layers and the liquid crystal cell, a compensation layer (16a, 16b), provided at least between the polarizer and the quarter wavelength layer on the side of the phase difference layer, having main refraction index in a normal direction nz2 that is greater than main refraction indexes in in-plane directions nx2 and ny2. It should be noted that, instead of the positive and negative uniaxial phase difference layers (14c through 14f), it is also preferable to provide an inclined phase difference layer (14g, 14h) between at least one of the quarter wavelength layers and the liquid crystal cell, in which an original refraction index ellipsoid satisfies na=nb>nc, and an na axis is identical to a direction orthogonal to a rubbing direction in an in-plane, while an nc axis is inclined to make a predetermined angle with respect to a normal direction.

Meanwhile, a liquid crystal display apparatus (1, 1b, 1c) of the present invention operating in an optically compensated bend mode is provided with a liquid crystal cell (11) having liquid crystals of a positive dielectric constant anisotropy, polarizers (12a, 12b) provided on both sides of the liquid crystal cell, quarter wavelength layers (13a, 13b) provided between the respective polarizers and the liquid crystal cell, each of the quarter wavelength layers having a retardation in an in-plane direction that is substantially set at a quarter wavelength of a wavelength of transmitted light, a phase difference layer (14i, 14j), provided between at least one of the quarter wavelength layers and the liquid crystal cell, having a main refraction index in an in-plane direction nx1>a main refraction index in an in-plane direction ny1>a main refraction index in a normal direction nz1, a compensation layer (16a, 16b), provided at least between the polarizer and quarter wavelength layer on the side of the phase difference layer, having main refraction index in a normal direction nz2 that is greater than main refraction indexes in in-plane directions nx2 and ny2. It should be noted that, in lieu of the phase difference layer (14i, 14j), it is also preferable to provide an inclined phase difference layer (14k, 14m) between at least one of the quarter wavelength layers and the liquid crystal cell, in which an original refraction index ellipsoid satisfies na=nb>nc, and an na axis is identical to a direction orthogonal to a rubbing direction in an in-plane, while an nc axis is inclined to make a predetermined angle with respect to a normal direction.

In those arrangements, introduced into the liquid crystal cell is the light, which has transmitted the polarizer and the quarter wavelength layer. Thus, the liquid crystal cell receives the substantially circularly polarized light, while the light emitted out of the liquid crystal cell obtains the phase difference of substantially quarter wavelength via the quarter wavelength layer, then is emitted via the polarizer.

Here, the liquid crystal cell gives the transmitted light the phase difference that is in accordance with the alignment condition of the liquid crystal molecules, when the voltage between the pixel electrode and the opposite electrode is at the predetermined voltage, for example when the voltage is applied, or in the initial alignment condition with no voltage applied. Thus, the circularly polarized light is converted into the elliptically polarized light. Therefore, even if the light transmitted through the quarter wavelength layer, the light would not be converted back to the linearly polarized light, thus a part of the emitted light from the quarter wavelength layer is emitted out of the polarizer. Because of this, the amount of the emitted light out of the polarizer can be controlled in accordance with the applied voltage, thereby attaining the gradient display.

Furthermore, because the substantially circularly polarized light is introduced, the liquid crystal molecules can give the phase difference to the transmitted light, even if the alignment of the liquid crystal molecules are disturbed, as long as the alignment direction of the liquid crystal molecules and the transmitted light are accorded with each other in terms of both of the in-plane component and the substrate normal direction. Thus, high light utilization rate can be achieved thereby.

On the other hand, when the liquid crystal molecules of the liquid crystal cell is aligned in the substrate normal direction (the vertical direction), the liquid crystal cell cannot give the phase difference to the transmitted light. As a result, the transmitted light is emitted out with the circularly polarized light maintained. The emitted light is converted into the linearly polarized light by the quarter wavelength layer, then is inputted into the polarizer, thereby limiting the transmission of the light. Therefore, the black display is attained by the LCD.

It should be noted that, even with the vertical alignment of the liquid crystal molecules, the alignment direction of the liquid crystal molecules and the direction of the transmitted light are not accorded with each other when the LCD is viewed in a diagonal direction, which is angled at a polar angle with respect to the substrate normal direction. Thus, the liquid crystal cell gives the transmitted light a phase difference in accordance with the polar angle. However, in the respective arrangements, with the provision of the phase difference layers having the retardation in the perpendicular direction, the liquid crystal cell can be optically compensated, thereby maintaining the broad angle of the visibility.

Furthermore, the arrangements are provided with the compensation layers, which have the retardation in the perpendicular direction with a sign reverse to the quarter wavelength layer and the phase difference layer. The compensation layer can cancel out those retardations that may be presented by a layer, which has optical characteristics of the same type as the phase difference layer, for example the support of the polarizer, or by the quarter wavelength layer that happens to have a retardation in the perpendicular direction.

As a result, even if a sum of the retardations in the perpendicular direction in a range from the polarizer to the liquid crystal cell and from the liquid crystal cell to the polarizer is constant, the retardation for the compensation of the liquid crystal cell (in the perpendicular direction) can be closer to the liquid crystal cell, because smaller is the absolute values of the retardation in the perpendicular direction from the polarizer to the quarter wavelength layer, including the quarter wavelength, compared to the case without the compensation layer. Therefore, the good black display can be attained by preventing the light leakage at the time of the black display. In addition, on the contrary to the case where used are the quarter wavelength layers having the optical activity with signs reverse to each other, it is possible to use the quarter wavelength layer of the same type, thereby making it easier to have the identical retardations in the in-plane direction between the respective quarter wavelength layer. Thereby, the contrast ratio in the front direction can be improved.

Moreover, the reduction of the retardation in the perpendicular direction within the range can maintain a peak of the contrast ratio at the same level when the contrast ratio of a predetermined angle from the normal direction is measured for all the azimuths. Therefore, it is easier to have the balance between the viewing angle characteristics from the above position (or the bottom position) and those from the right position (or the left position), further which is able to prevent the contrast ratio in the front direction from being lowered.

It should be noted that, in the arrangements, it is possible to use the quarter wavelength layer as a negative film if the quarter wavelength layer is made of the phase difference film, which can be described by the biaxial refraction index ellipsoid, thereby giving characteristics of the negative film to the quarter wavelength layer. This also can make the retardation for the compensation of the liquid crystal cell (in the perpendicular direction) to the liquid crystal cell. Thus, it is possible to attain the good black display.

Furthermore, it is preferable to provide polarizer compensation layers (15a and 15b), which have retardations in the perpendicular and in-plane directions and optically compensate the polarizers by the in-plane retardation, in a position at least between the polarizer and the quarter wavelength layer on the side of the phase difference layer, in addition to the phase difference layer for the optical compensation of the liquid crystal cell. Further, in case that provided is a compensation layer whose main refraction index nz2 is larger than other refraction indexes, it is preferable to provide polarizer compensation layers (15a, 15b) at least between the polarizer and said quarter wavelength layer on the side of said phase difference layer, wherein the polarizer compensation layer satisfies nx3>ny3, where main refraction indexes in in-plane directions are nx3 and ny3, while main refraction index in a perpendicular direction is nz3, and an ny3 axis is parallel to an absorption axis of said polarizer on the same side with respect to the liquid crystal cell.

With those arrangements, the polarizers can be optically compensated by the polarizer compensation layers. For example, when an absorption axis of the polarizer and a y axis of the polarizer compensation layers are disposed in parallel, prevented is a light leakage which is caused by viewing an LCD, which has polarizers having absorption axes crossing each other at a right angle, in a diagonal direction at 45° from the in-plane direction. Moreover, the compensation layer can cancel out retardation in a perpendicular direction of the polarizer compensation layer. Therefore, the retardation for the compensation of the liquid crystal cell (in the perpendicular direction) can be closer to the liquid crystal cell, even though the polarizer compensation layers are provided. As a result, the light leakage is prevented for all the azimuths, thus realizing the LCD with good black display.

Furthermore, in case that provided is a compensation layer whose main refraction index nz2 is larger than other refraction indexes, it is preferable that the respective main refraction indexes of the compensation layer satisfy nx2=ny2<nz2. In this arrangement, because the compensation layer has a retardation of 0 nm in the in-plane direction, it is possible to prevent a phenomenon of color contamination, which occurs at the existence of the retardation in the in-plane direction. Therefore, the high contrast ratio can be maintained.

Moreover, in lieu of the provision of the compensation layer (16a, 16b), as the quarter wavelength layer, it is also possible to use the quarter wavelength layers which have nz4 substantially equal to (nx4+ny4)/2, where main refraction indexes in in-plane directions are nx4 and ny4, while a main refraction index in a normal direction is nz4.

In the LCD (1d) of the arrangement, substantially set at zero is the retardation in the perpendicular direction of the quarter wavelength layer. Therefore, just like the cases of the respective LCDs discussed above, it is possible to reduce the retardation in the perpendicular direction in a range from the polarizer to the quarter wavelength layer, which is included in the range, even if the sum of the retardations in the perpendicular direction in a range from the polarizer to the liquid crystal cell and from the liquid crystal cell to the polarizer is constant. Because of this, it is possible to make the retardation (in the perpendicular direction) for the compensation of the liquid crystal cell closer to the liquid crystal cell. As a result, just like the case where the compensation layers are provided, it is possible to realize the LCD, which can maintain the board angle of visibility and can prevent the reduction of the contrast ratio in the front direction, without deteriorating the balance between the viewing angle characteristics from the above position (or the bottom position) and those from the right position (or the left position).

Furthermore, it may be possible that set at less than one eight of the wavelength of the transmitted light is the absolute value of the retardation in the perpendicular direction in the range from the polarizer to the quarter wavelength that is included in the range, whether the quarter wavelength substantially satisfies nz4=(nx4+ny4)/2, or not, and with or without the compensation layers.

Again in the LCDs (1, 1b, 1c, and 1d), it is possible to give the retardation in the perpendicular direction for the compensation of the liquid crystal cell a position closer to the liquid crystal cell. Therefore, just like the case of the respective LCDs discussed above, it is possible to realize the LCD, which can maintain the board angle of visibility and can prevent the reduction of the contrast ratio in the front direction, without deteriorating the balance between the viewing angle characteristics from the above position (or the bottom position) and those from the right position (or the left position).

Moreover, it is preferable that substantially set at zero are the respective absolute values of the retardation in the perpendicular direction in the range. In this arrangement, it is possible to give the retardation in the perpendicular direction that is effective for optically compensating the liquid crystal cell a closest position to the liquid crystal cell, thereby further improving the display quality of the LCD.

In addition to the respective arrangements discussed above, where the liquid crystal cell is provided with a first substrate having a pixel electrode that corresponds to a pixel, a second substrate having an opposite electrode, and a liquid crystal layer that is provided between the first and second substrates, it is preferable that the liquid crystal layer is controlled so that liquid crystal molecules have alignment directions different from each other in the pixel, at least when a voltage between the pixel electrode and the opposite electrode is a predetermined voltage.

In the above arrangement, because the alignment directions of the liquid crystal molecules are different from each other in the pixel, mutual optical compensation can be attain between regions having liquid crystal molecules in alignment directions different from each other. As a result, it is possible to improve the display quality when the LCD is viewed from the diagonal direction, while the angle of visibility is also broadened.

Here, in the liquid crystal layer, the alignment condition is often disturbed, because the liquid crystal molecules are so controlled to have the alignment directions different from each other in order to ensure the broad angle of the visibility. Therefore, in a case of the conventional LCD, where the linearly polarized light is introduced into the liquid crystal layers, and the emitted light out of the liquid crystal layers is introduced into a light analyzer, the alignment of the liquid crystal molecules is disturbed, so that the liquid crystal molecules cannot give the phase difference to the transmitted light when the in-plane component of the alignment direction is accorded with the absorption axis of the polarizer, regardless of the substrate normal direction component. Therefore, the region, in which such a liquid crystal molecules exist, cannot contribute to the improvement of the brightness, thus generating the roughness in the display. In addition, the light utilization rate (the effective aperture rate) is reduced, because the liquid crystal molecules, whose in-plane component of the alignment direction is accorded with the absorption axis of the light analyzer, cannot contribute to the improvement of the brightness. Those make it harder to ensure the contrast ratio, thereby making it difficult tot increase the gradation.

On the contrary, in the LCD of the above arrangement, circularly polarized light is introduced into the liquid crystal layer, the anisotropy of the alignment directions in the liquid crystal layer is disappeared. Therefore, the liquid crystal molecules can give the phase difference to the transmitted light, as long as the alignment direction of the liquid crystal molecules and the transmitted light are not accorded with each other in terms of the in-plane component and the substrate normal direction.

Because the liquid crystal molecules are so controlled to have different alignment directions from each other in the pixel for ensuring the broad angle of the visibility, the brightness can be improved, as long as the disturbed alignment directions of the liquid crystal molecules are not accorded with the viewing angle. As a result, the high light utilization rate can be ensured while the broad angle of visibility is maintained.

Furthermore, in addition to the above arrangement, it is preferable that the phase difference layer has respective main refraction indexes $nx1$ and $ny1$ so as to satisfy $nx1=ny1$. In this arrangement, where 0 nm is the retardation in the in-plane direction of the phase difference layer, it is possible to prevent the phenomenon of the color contamination, which is generated when the retardation in the in-plane direction exists, thereby maintaining the high contrast ratio.

On the other hand, instead of the condition satisfying $nx1=ny1$, it is also preferable that the phase difference layers are provided between the respective quarter wavelength layers and the liquid crystal cell, have different main refraction indexes $nx1$ and $ny1$, respectively, and the $nx1$ axes of the phase difference layers cross each other at a right angle, while the $ny1$ axes of the phase difference layers cross each other at a right angle.

In the arrangement, the phase difference layers provided on both the sides of the liquid crystal cell have the $nx1$ axis and $ny1$ axis, which cross with their counterparts, respectively. Therefore, the retardation in the in-plane direction, which has been generated in one of the phase difference layer, can be cancelled out by the other phase difference layer. As a result, it is possible to prevent the phenomenon of the color contamination, thereby maintaining the high contrast ratio.

In addition to the above respective arrangements, it is preferable that both the quarter wavelength layers have the retardation in the perpendicular direction identical with each other in terms of the sign. With the arrangement, it is possible to manufacture both the quarter wavelength layers in the same process, thus both the quarter wavelength layers can easily have similar characteristics, even if the quarter wavelength layers are not uniformly manufactured. As a result, productivity of the LCD is improved, compared to the case where used are the quarter wavelength layers having the retardation in the perpendicular direction reverse to each other in terms of the sign.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display apparatus, comprising:
   a liquid crystal cell;
   polarizers provided on both sides of said liquid crystal cell;
   quarter wavelength layers provided between said respective polarizers and said liquid crystal cell, each of said quarter wavelength layers having a retardation in an in-plane direction that is substantially set at a quarter wavelength of a wavelength of transmitted light; and
   a phase difference layer, provided between at least one of said quarter wavelength layers and said liquid crystal cell, which has a retardation in a perpendicular direction, and optically compensates said liquid crystal cell,
   wherein said quarter wavelength layers have $nz4$ substantially equal to $(nx4+ny4)/2$, where main refraction indexes in in-plane directions are $nx4$ and $ny4$, while a main refraction index in a normal direction is $nz4$.

2. The liquid crystal display apparatus as set forth in claim 1, wherein:
   said liquid crystal cell includes a first substrate having a pixel electrode that corresponds to a pixel, a second substrate having an opposite electrode, and a liquid crystal layer that is provided between said first and second substrates; and
   said liquid crystal layer is controlled so that liquid crystal molecules have alignment directions different from each other in the pixel, at least when a voltage between said pixel electrode and said opposite electrode is a predetermined voltage.

3. The liquid crystal display apparatus as set forth in claim 1, wherein said phase difference layer has respective main refraction indexes nx1 and ny1 so as to satisfy nx1=ny1.

4. The liquid crystal display apparatus as set forth in claim 1, wherein:
   said phase difference layers are provided between said respective quarter wavelength layers and The liquid crystal cell, have different main refraction indexes nx1 and ny1, respectively; and
   said nx1 axes of said phase difference layers cross each other at a right angle, while said ny1 axes of said phase difference layers cross each other at a right angle.

5. The liquid crystal display apparatus as set forth in claim 1, wherein both said quarter wavelength layers have the retardation in the perpendicular direction identical with each other in terms of a sign.

6. A liquid crystal display apparatus, comprising:
   a liquid crystal cell in a vertical alignment mode;
   polarizers provided on both sides of said liquid crystal cell;
   quarter wavelength layers provided between said respective polarizers and said liquid crystal cell, each of said quarter wavelength layers having a retardation in an in-plane direction that is substantially set at a quarter wavelength of a wavelength of transmitted light; and
   a phase difference layer, provided between at least one of said quarter wavelength layers and said liquid crystal cell, which has main refraction index in a normal direction nz1 that is smaller than main refraction indexes in in-plane directions nx1 and ny1,
   wherein said quarter wavelength layers have nz4 substantially equal to (nx4+ny4)/2, where main refraction indexes in in-plane directions are nx4 and ny4, while a main refraction index in a normal direction is nz4.

7. The liquid crystal display apparatus as set forth in claim 6, wherein:
   said liquid crystal cell includes a first substrate having a pixel electrode that corresponds to a pixel, a second substrate having an opposite electrode, and a liquid crystal layer that is provided between said first and second substrates; and
   said liquid crystal layer is controlled so that liquid crystal molecules have alignment directions different from each other in the pixel, at least when a voltage between said pixel electrode and said opposite electrode is a predetermined voltage.

8. The liquid crystal display apparatus as set forth in claim 6, wherein said phase difference layer has respective main refraction indexes nx1 and ny1 so as to satisfy nx1=ny1.

9. The liquid crystal display apparatus as set forth in claim 6, wherein:
   said phase difference layers are provided between said respective quarter wavelength layers and The liquid crystal cell, have different main refraction indexes nx1 and ny1, respectively; and
   said nx1 axes of said phase difference layers cross each other at a right angle, while said ny1 axes of said phase difference layers cross each other at a right angle.

10. The liquid crystal display apparatus as set forth in claim 6, wherein both said quarter wavelength layers have the retardation in the perpendicular direction identical with each other in terms of a sign.

11. A liquid crystal display apparatus operating in a horizontal alignment mode, comprising:
    a liquid crystal cell including liquid crystals of positive dielectric constant anisotropy;
    polarizers provided on both sides of said liquid crystal cell;
    quarter wavelength layers provided between said respective polarizers and said liquid crystal cell, each of said quarter wavelength layers having a retardation in an in-plane direction substantially set at a quarter wavelength of a wavelength of transmitted light;
    a positive uniaxial phase difference layer provided between at least one of said quarter wavelength layers and said liquid crystal cell; and
    a negative uniaxial phase difference layer provided between at least one of said quarter wavelength layers and said liquid crystal cell,
    wherein said quarter wavelength layers have nz4 substantially equal to (nx4+ny4)/2, where main refraction indexes in in-plane directions are nx4 and ny4, while a main refraction index in a normal direction is nz4.

12. The liquid crystal display apparatus as set forth in claim 11, wherein:
    said liquid crystal cell includes a first substrate having a pixel electrode that corresponds to a pixel, a second substrate having an opposite electrode, and a liquid crystal layer that is provided between said first and second substrates; and
    said liquid crystal layer is controlled so that liquid crystal molecules have alignment directions different from each other in the pixel, at least when a voltage between said pixel electrode and said opposite electrode is a predetermined voltage.

13. The liquid crystal display apparatus as set forth in claim 11, wherein said phase difference layer has respective main refraction indexes nx1 and ny1 so as to satisfy nx1=ny1.

14. The liquid crystal display apparatus as set forth in claim 11, wherein:
    said phase difference layers are provided between said respective quarter wavelength layers and The liquid crystal cell, have different main refraction indexes nx1 and ny1, respectively; and
    said nx1 axes of said phase difference layers cross each other at a right angle, while said ny1 axes of said phase difference layers cross each other at a right angle.

15. The liquid crystal display apparatus as set forth in claim 11, wherein both said quarter wavelength layers have the retardation in the perpendicular direction identical with each other in terms of a sign.

16. A liquid crystal display apparatus operating in a horizontal alignment mode, comprising:
    a liquid crystal cell including liquid crystals of positive dielectric constant anisotropy;
    polarizers provided on both sides of said liquid crystal cell;
    quarter wavelength layers provided between said respective polarizers and said liquid crystal cell, each of said quarter wavelength layers having a retardation in an in-plane direction substantially set at a quarter wavelength of a wavelength of transmitted light; and
    an inclined phase difference layer, provided between at least one of said quarter wavelength layers and said liquid crystal cell, in which an original refraction index ellipsoid satisfies na=nb>nc, and an na axis is identical to a direction orthogonal to a rubbing direction in an in-plane, while an nc axis is inclined to make a predetermined angle with respect to a normal direction,
    wherein said quarter wavelength layers have nz4 substantially equal to (nx4+ny4)/2, where main refraction indexes in in-plane directions are nx4 and ny4, while a main refraction index in a normal direction is nz4.

17. The liquid crystal display apparatus as set forth in claim 16, wherein:
said liquid crystal cell includes a first substrate having a pixel electrode that corresponds to a pixel, a second substrate having an opposite electrode, and a liquid crystal layer that is provided between said first and second substrates; and
said liquid crystal layer is controlled so that liquid crystal molecules have alignment directions different from each other in the pixel, at least when a voltage between said pixel electrode and said opposite electrode is a predetermined voltage.

18. The liquid crystal display apparatus as set forth in claim 16, wherein said phase difference layer has respective main refraction indexes nx1 and ny1 so as to satisfy nx1=ny1.

19. The liquid crystal display apparatus as set forth in claim 16, wherein:
said phase difference layers are provided between said respective quarter wavelength layers and The liquid crystal cell, have different main refraction indexes nx1 and ny1, respectively; and
said nx1 axes of said phase difference layers cross each other at a right angle, while said ny1 axes of said phase difference layers cross each other at a right angle.

20. The liquid crystal display apparatus as set forth in claim 16, wherein both said quarter wavelength layers have the retardation in the perpendicular direction identical with each other in terms of a sign.

21. A liquid crystal display apparatus operating in an optically compensated bend mode, comprising:
a liquid crystal cell having liquid crystals of a positive dielectric constant anisotropy;
polarizers provided on both sides of said liquid crystal cell;
quarter wavelength layers provided between said respective polarizers and said liquid crystal cell, each of said quarter wavelength layers having a retardation in an in-plane direction that is substantially set at a quarter wavelength of a wavelength of transmitted light; and
a phase difference layer, provided between at least one of said quarter wavelength layers and said liquid crystal cell, having main refraction indexes in an in-plane direction nx1>main refraction index in an in-plane direction ny1>main refraction index in a normal direction nz1,
wherein said quarter wavelength layers have nz4 substantially equal to (nx4+ny4)/2, where main refraction indexes in in-plane directions are nx4 and ny4, while a main refraction index in a normal direction is nz4.

22. The liquid crystal display apparatus as set forth in claim 21, wherein:
said liquid crystal cell includes a first substrate having a pixel electrode that corresponds to a pixel, a second substrate having an opposite electrode, and a liquid crystal layer that is provided between said first and second substrates; and
said liquid crystal layer is controlled so that liquid crystal molecules have alignment directions different from each other in the pixel, at least when a voltage between said pixel electrode and said opposite electrode is a predetermined voltage.

23. The liquid crystal display apparatus as set forth in claim 21, wherein said phase difference layer has respective main refraction indexes nx1 and ny1 so as to satisfy nx1=ny1.

24. The liquid crystal display apparatus as set forth in claim 21, wherein:
said phase difference layers are provided between said respective quarter wavelength layers and The liquid crystal cell, have different main refraction indexes nx1 and ny1, respectively; and
said nx1 axes of said phase difference layers cross each other at a right angle, while said ny1 axes of said phase difference layers cross each other at a right angle.

25. The liquid crystal display apparatus as set forth in claim 21, wherein both said quarter wavelength layers have the retardation in the perpendicular direction identical with each other in terms of a sign.

26. A liquid crystal display apparatus operating in an optically compensated bend mode, comprising:
a liquid crystal cell having liquid crystals of a positive dielectric constant anisotropy;
polarizers provided on both sides of said liquid crystal cell;
quarter wavelength layers provided between said respective polarizers and said liquid crystal cell, each of said quarter wavelength layers having a retardation in an in-plane direction that is substantially set at a quarter wavelength of a wavelength of transmitted light; and
an inclined phase difference layer, provided between at least one of said quarter wavelength layers and said liquid crystal cell, in which an original refraction index ellipsoid satisfies na=nb>nc, and an na axis is identical to a direction orthogonal to a rubbing direction in an in-plane, while an nc axis is inclined to make a predetermined angle with respect to a normal direction,
wherein said quarter wavelength layers have nz4 substantially equal to (nx4+ny4)/2, where main refraction indexes in in-plane directions are nx4 and ny4, while a main refraction index in a normal direction is nz4.

27. The liquid crystal display apparatus as set forth in claim 26, wherein:
said liquid crystal cell includes a first substrate having a pixel electrode that corresponds to a pixel, a second substrate having an opposite electrode, and a liquid crystal layer that is provided between said first and second substrates; and
said liquid crystal layer is controlled so that liquid crystal molecules have alignment directions different from each other in the pixel, at least when a voltage between said pixel electrode and said opposite electrode is a predetermined voltage.

28. The liquid crystal display apparatus as set forth in claim 26, wherein said phase difference layer has respective main refraction indexes nx1 and ny1 so as to satisfy nx1=ny1.

29. The liquid crystal display apparatus as set forth in claim 26, wherein:
said phase difference layers are provided between said respective quarter wavelength layers and The liquid crystal cell, have different main refraction indexes nx1 and ny1, respectively; and
said nx1 axes of said phase difference layers cross each other at a right angle, while said ny1 axes of said phase difference layers cross each other at a right angle.

30. The liquid crystal display apparatus as set forth in claim 26, wherein both said quarter wavelength layers have the retardation in the perpendicular direction identical with each other in terms of a sign.

31. A liquid crystal display apparatus, comprising:
a liquid crystal cell;
polarizers provided on both sides of said liquid crystal cell;
quarter wavelength layers provided between said respective polarizers and said liquid crystal cell, each of said quarter wavelength layers having a retardation in an in-plane direction that is substantially set at a quarter wavelength of a wavelength of transmitted light; and
a phase difference layer, provided between at least one of said quarter wavelength layers and said liquid crystal cell, which has a retardation in a perpendicular direction, and optically compensates said liquid crystal cell,
wherein set at less than one eighth of the wavelength of the transmitted light is each absolute value of a retardation in a perpendicular direction from said polarizer to said quarter wavelength layer.

32. The liquid crystal display apparatus as set forth in claim 31, wherein set substantially at zero is each of the absolute values of the retardation in the perpendicular direction in the range.

33. The liquid crystal display apparatus as set forth in claim 31, wherein:
said liquid crystal cell includes a first substrate having a pixel electrode that corresponds to a pixel, a second substrate having an opposite electrode, and a liquid crystal layer that is provided between said first and second substrates; and
said liquid crystal layer is controlled so that liquid crystal molecules have alignment directions different from each other in the pixel, at least when a voltage between said pixel electrode and said opposite electrode is a predetermined voltage.

34. The liquid crystal display apparatus as set forth in claim 31, wherein said phase difference layer has respective main refraction indexes nx1 and ny1 so as to satisfy nx1=ny1.

35. The liquid crystal display apparatus as set forth in claim 31, wherein:
said phase difference layers are provided between said respective quarter wavelength layers and The liquid crystal cell, have different main refraction indexes nx1 and ny1, respectively; and
said nx1 axes of said phase difference layers cross each other at a right angle, while said ny1 axes of said phase difference layers cross each other at a right angle.

36. The liquid crystal display apparatus as set forth in claim 31, wherein both said quarter wavelength layers have the retardation in the perpendicular direction identical with each other in terms of a sign.

37. A liquid crystal display apparatus, comprising:
a liquid crystal cell in a vertical alignment mode;
polarizers provided on both sides of said liquid crystal cell;
quarter wavelength layers provided between said respective polarizers and said liquid crystal cell, each of said quarter wavelength layers having a retardation in an in-plane direction that is substantially set at a quarter wavelength of a wavelength of transmitted light; and
a phase difference layer, provided between at least one of said quarter wavelength layers and said liquid crystal cell, having main refraction index in a normal direction nz1 that is smaller than main refraction indexes of in-plane directions nx1 and ny1,
wherein set at less than one eighth of the wavelength of the transmitted light is each absolute value of a retardation in a perpendicular direction from said polarizer to said quarter wavelength layer.

38. The liquid crystal display apparatus as set forth in claim 37, wherein set substantially at zero is each of the absolute values of the retardation in the perpendicular direction in the range.

39. The liquid crystal display apparatus as set forth in claim 37, wherein:
said liquid crystal cell includes a first substrate having a pixel electrode that corresponds to a pixel, a second substrate having an opposite electrode, and a liquid crystal layer that is provided between said first and second substrates; and
said liquid crystal layer is controlled so that liquid crystal molecules have alignment directions different from each other in the pixel, at least when a voltage between said pixel electrode and said opposite electrode is a predetermined voltage.

40. The liquid crystal display apparatus as set forth in claim 37, wherein said phase difference layer has respective main refraction indexes nx1 and ny1 so as to satisfy nx1=ny1.

41. The liquid crystal display apparatus as set forth in claim 37, wherein:
said phase difference layers are provided between said respective quarter wavelength layers and The liquid crystal cell, have different main refraction indexes nx1 and ny1, respectively; and
said nx1 axes of said phase difference layers cross each other at a right angle, while said ny1 axes of said phase difference layers cross each other at a right angle.

42. The liquid crystal display apparatus as set forth in claim 37, wherein both said quarter wavelength layers have the retardation in the perpendicular direction identical with each other in terms of a sign.

43. A liquid crystal display apparatus operating in a horizontal alignment mode, comprising:
a liquid crystal cell including liquid crystals of positive dielectric constant anisotropy;
polarizers provided on both sides of said liquid crystal cell;
quarter wavelength layers provided between said respective polarizers and said liquid crystal cell, each of said quarter wavelength layers having a retardation in an in-plane direction set substantially at a quarter wavelength of a wavelength of transmitted light;
a positive uniaxial phase difference layer provided between at least one of said quarter wavelength layers and said liquid crystal cell; and
a negative uniaxial phase difference layer provided between at least one of said quarter wavelength layers and said liquid crystal cell,
wherein set at less than one eighth of the wavelength of the transmitted light is each absolute value of a retardation in a perpendicular direction from said polarizer to said quarter wavelength layer.

44. The liquid crystal display apparatus as set forth in claim 43, wherein set substantially at zero is each of the absolute values of the retardation in the perpendicular direction in the range.

45. The liquid crystal display apparatus as set forth in claim 43, wherein:
said liquid crystal cell includes a first substrate having a pixel electrode that corresponds to a pixel, a second substrate having an opposite electrode, and a liquid crystal layer that is provided between said first and second substrates; and said liquid crystal layer is controlled so that liquid crystal molecules have alignment directions different from each other in the pixel, at least when a voltage between said pixel electrode and said opposite electrode is a predetermined voltage.

46. The liquid crystal display apparatus as set forth in claim 43, wherein said phase difference layer has respective main refraction indexes nx1 and ny1 so as to satisfy nx1=ny1.

47. The liquid crystal display apparatus as set forth in claim 43, wherein:

said phase difference layers are provided between said respective quarter wavelength layers and The liquid crystal cell, have different main refraction indexes nx1 and ny1, respectively; and said nx1 axes of said phase difference layers cross each other at a right angle, while said ny1 axes of said phase difference layers cross each other at a right angle.

48. The liquid crystal display apparatus as set forth in claim 43, wherein both said quarter wavelength layers have the retardation in the perpendicular direction identical with each other in terms of a sign.

49. A liquid crystal display apparatus operating in a horizontal alignment mode, comprising:

a liquid crystal cell including liquid crystals of positive dielectric constant anisotropy;

polarizers provided on both sides of said liquid crystal cell;

quarter wavelength layers provided between said respective polarizers and said liquid crystal cell, each of said quarter wavelength layers having a retardation in an in-plane direction set substantially at a quarter wavelength of a wavelength of transmitted light; and an inclined phase difference layer, provided between at least one of said quarter wavelength layers and said liquid crystal cell, in which an original refraction index ellipsoid satisfies na=nb>nc, and an na axis is identical to a direction orthogonal to a rubbing direction in an in-plane, while an nc axis is inclined to make a predetermined angle with respect to a normal direction, wherein set at less than one eighth of the wavelength of the transmitted light is each absolute value of a retardation in a perpendicular direction from said polarizer to said quarter wavelength layer.

50. The liquid crystal display apparatus as set forth in claim 49, wherein set substantially at zero is each of the absolute values of the retardation in the perpendicular direction in the range.

51. The liquid crystal display apparatus as set forth in claim 49, wherein:

said liquid crystal cell includes a first substrate having a pixel electrode that corresponds to a pixel, a second substrate having an opposite electrode, and a liquid crystal layer that is provided between said first and second substrates; and said liquid crystal layer is controlled so that liquid crystal molecules have alignment directions different from each other in the pixel, at least when a voltage between said pixel electrode and said opposite electrode is a predetermined voltage.

52. The liquid crystal display apparatus as set forth in claim 49, wherein said phase difference layer has respective main refraction indexes nx1 and ny1 so as to satisfy nx1=ny1.

53. The liquid crystal display apparatus as set forth in claim 49, wherein:

said phase difference layers are provided between said respective quarter wavelength layers and The liquid crystal cell, have different main refraction indexes nx1 and ny1, respectively; and said nx1 axes of said phase difference layers cross each other at a right angle, while said ny1 axes of said phase difference layers cross each other at a right angle.

54. The liquid crystal display apparatus as set forth in claim 49, wherein both said quarter wavelength layers have the retardation in the perpendicular direction identical with each other in terms of a sign.

55. A liquid crystal display apparatus operating in an optically compensated bend mode, comprising:

a liquid crystal cell having liquid crystals of a positive dielectric constant anisotropy;

polarizers provided on both sides of said liquid crystal cell;

quarter wavelength layers provided between said respective polarizers and said liquid crystal cell, each of said quarter wavelength layers having a retardation in an in-plane direction that is set substantially at a quarter wavelength of a wavelength of transmitted light; and a phase difference layer, provided between at least one of said quarter wavelength layers and said liquid crystal cell, having main refraction indexes in an in-plane direction nx1>main refraction index in an in-plane direction ny1>main refraction index in a normal direction nz1, wherein set at less than one eighth of the wavelength of the transmitted light is each absolute value of a retardation in a perpendicular direction from said polarizer to said quarter wavelength layer.

56. The liquid crystal display apparatus as set forth in claim 55, wherein set substantially at zero is each of the absolute values of the retardation in the perpendicular direction in the range.

57. The liquid crystal display apparatus as set forth in claim 55, wherein:

said liquid crystal cell includes a first substrate having a pixel electrode that corresponds to a pixel, a second substrate having an opposite electrode, and a liquid crystal layer that is provided between said first and second substrates; and said liquid crystal layer is controlled so that liquid crystal molecules have alignment directions different from each other in the pixel, at least when a voltage between said pixel electrode and said opposite electrode is a predetermined voltage.

58. The liquid crystal display apparatus as set forth in claim 55, wherein said phase difference layer has respective main refraction indexes nx1 and ny1 so as to satisfy nx1=ny1.

59. The liquid crystal display apparatus as set forth in claim 55, wherein:

said phase difference layers are provided between said respective quarter wavelength layers and The liquid crystal cell, have different main refraction indexes nx1 and ny1, respectively; and said nx1 axes of said phase difference layers cross each other at a right angle, while said ny1 axes of said phase difference layers cross each other at a right angle.

60. The liquid crystal display apparatus as set forth in claim 55, wherein both said quarter wavelength layers have the retardation in the perpendicular direction identical with each other in terms of a sign.

61. A liquid crystal display apparatus operating in an optically compensated bend mode, comprising:
- a liquid crystal cell having liquid crystals of a positive dielectric constant anisotropy;
- polarizers provided on both sides of said liquid crystal cell;
- quarter wavelength layers provided between said respective polarizers and said liquid crystal cell, each of said quarter wavelength layers having a retardation in an in-plane direction that is set substantially at a quarter wavelength of a wavelength of transmitted light; and
- an inclined phase difference layer, provided between at least one of said quarter wavelength layers and said liquid crystal cell, in which an original refraction index ellipsoid satisfies na=nb>nc, and an na axis is identical to a direction orthogonal to a rubbing direction in an in-plane, while an nc axis is inclined to make a predetermined angle with respect to a normal direction,
- wherein set at less than one eighth of the wavelength of the transmitted light is each absolute value of a retardation in a perpendicular direction from said polarizer to said quarter wavelength layer.

62. The liquid crystal display apparatus as set forth in claim 61, wherein set substantially at zero is each of the absolute values of the retardation in the perpendicular direction in the range.

63. The liquid crystal display apparatus as set forth in claim 61, wherein:
- said liquid crystal cell includes a first substrate having a pixel electrode that corresponds to a pixel, a second substrate having an opposite electrode, and a liquid crystal layer that is provided between said first and second substrates; and
- said liquid crystal layer is controlled so that liquid crystal molecules have alignment directions different from each other in the pixel, at least when a voltage between said pixel electrode and said opposite electrode is a predetermined voltage.

64. The liquid crystal display apparatus as set forth in claim 61, wherein said phase difference layer has respective main refraction indexes nx1 and ny1 so as to satisfy nx1=ny1.

65. The liquid crystal display apparatus as set forth in claim 61, wherein:
- said phase difference layers are provided between said respective quarter wavelength layers and The liquid crystal cell, have different main refraction indexes nx1 and ny1, respectively; and
- said nx1 axes of said phase difference layers cross each other at a right angle, while said ny1 axes of said phase difference layers cross each other at a right angle.

66. The liquid crystal display apparatus as set forth in claim 61, wherein both said quarter wavelength layers have the retardation in the perpendicular direction identical with each other in terms of a sign.

* * * * *